United States Patent
Kitamura et al.

(10) Patent No.: US 6,253,025 B1
(45) Date of Patent: Jun. 26, 2001

(54) IMAGE INFORMATION ENCODING/DECODING SYSTEM

(75) Inventors: Tetsuya Kitamura, Komae; Tae Aoki, Tokyo; Toshiaki Shirasuna, Fuchu; Hideki Mimura, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/934,130

(22) Filed: Sep. 19, 1997

Related U.S. Application Data

(63) Continuation of application No. 08/597,505, filed on Feb. 2, 1996, now Pat. No. 5,758,007.

(30) Foreign Application Priority Data

Feb. 3, 1995 (JP) .................................... 7-016304

(51) Int. Cl.[7] ............................. H04N 5/781; H04N 5/85
(52) U.S. Cl. ............................ 386/125; 386/46; 386/109
(58) Field of Search ................................. 386/46, 45, 52, 386/92, 109, 111, 112, 124, 125, 126, 105, 106, 27, 33, 40; 360/32; H04N 5/781, 5/85

(56) References Cited

U.S. PATENT DOCUMENTS

| | | |
|---|---|---|
| 4,763,207 | 8/1988 | Podolak . |
| 4,811,113 | 3/1989 | Ozeki et al. . |
| 4,989,097 | 1/1991 | Yoshio . |
| 5,010,417 | 4/1991 | Yoshio . |
| 5,016,113 | 5/1991 | Yamashita . |
| 5,043,826 | 8/1991 | Yoshio . |
| 5,063,551 | 11/1991 | Yoshio et al. .................... 369/48 |
| 5,065,252 | 11/1991 | Yoshio . |
| 5,097,349 | 3/1992 | Nomura . |
| 5,122,875 | 6/1992 | Raychaudhuri et al. . |
| 5,138,925 | 8/1992 | Koguchi . |
| 5,208,679 | 5/1993 | Yamauchi et al. ................ 358/342 |
| 5,233,434 | 8/1993 | Furuki et al. .................... 358/310 |
| 5,233,438 | 8/1993 | Funahashi . |
| 5,280,572 | 1/1994 | Case . |
| 5,336,844 | 8/1994 | Yamauchi . |
| 5,359,582 | 10/1994 | Kim . |
| 5,400,077 | 3/1995 | Cookson . |
| 5,455,684 | 10/1995 | Fujinami et al. ................. 358/335 |
| 5,495,343 | 2/1996 | Ogura ............................. 358/342 |
| 5,506,370 | 4/1996 | Nakai et al. ..................... 84/637 |
| 5,513,010 | 4/1996 | Kori et al. . |
| 5,526,134 | 6/1996 | Furuki et al. .................... 358/335 |
| 5,535,008 | 7/1996 | Yamagishi et al. .............. 358/342 |

(List continued on next page.)

FOREIGN PATENT DOCUMENTS

| | | |
|---|---|---|
| 325 325 | 7/1989 | (EP) . |
| 381 807 | 8/1990 | (EP) . |

(List continued on next page.)

OTHER PUBLICATIONS

Patent Abstracts of Japan, 08037641, Feb. 1996, Satoru et al., Image Information Reproducing Device.
Patent Abstracts of Japan, 07282543, Oct. 1995, Setsuo et al., Recording Medium, Recorder and Reproducing Device therefor.

(List continued on next page.)

*Primary Examiner*—Robert Chevalier
(74) *Attorney, Agent, or Firm*—Pillsbury Winthrop LLP

(57) ABSTRACT

A sub-picture packet is encoded using a packet header containing a time stamp, sub-picture data containing compressed pixel data, one or more display control sequences, and a sub-picture unit header. The time stamp indicates the playback start time of the sub-picture packet. The display control sequence defines the order of display of the sub-picture data. The sub-picture unit header indicates the size of the sub-picture packet and the location of the display control sequence. The encoded sub-picture packet is decoded, and displayed based on the display control sequence.

28 Claims, 47 Drawing Sheets

U.S. PATENT DOCUMENTS

| | | | |
|---|---|---|---|
| 5,543,925 | 8/1996 | Timmermans | 358/310 |
| 5,557,331 | 9/1996 | Honjo | 348/410 |
| 5,574,569 | 11/1996 | Utsumi et al. | 386/95 |
| 5,596,564 | 1/1997 | Fukushima et al. | 369/275.3 |
| 5,621,660 | 4/1997 | Chaddha et al. | 364/514 |
| 5,627,657 | 5/1997 | Park | 386/70 |
| 5,627,936 | 5/1997 | Prasad et al. | |
| 6,044,175 * | 3/2000 | Kikuchi et al. | 382/232 |

FOREIGN PATENT DOCUMENTS

| | | |
|---|---|---|
| 459 157 | 12/1991 | (EP) . |
| 521 487 | 1/1993 | (EP) . |
| 0 546 189 | 6/1993 | (EP) . |
| 546 189 A1 | 6/1993 | (EP) . |
| 558 848 | 9/1993 | (EP) . |
| 558 853 | 9/1993 | (EP) . |
| 0 633 560 | 1/1995 | (EP) . |
| 635 560 A1 | 1/1995 | (EP) . |
| 0 661 888 | 7/1995 | (EP) . |
| 661 888 A2 | 7/1995 | (EP) . |
| 1-221072 | 9/1989 | (JP) . |
| 1-241083 | 9/1989 | (JP) . |
| 1-273275 | 11/1989 | (JP) . |
| 5-12831 | 1/1993 | (JP) . |
| 6-044691 | 2/1994 | (JP) . |
| 6-314092 | 11/1994 | (JP) . |
| WO94/30014 | 12/1994 | (WO) . |

OTHER PUBLICATIONS

Patent Abstracts of Japan, 07284060, Oct. 1995, Masaki, Recording Medium and its Reproducing Device.

Patent Abstracts of Japan 07334938, Dec. 1995, Shinichi et al., System for Grouping Data and Device for Reproducing Recording Medium.

Abstract of JP 4–67470, Mar. 1992, Yamauchi, Information Storing Device and Information Reproducing Device.

Abstract of JP 6–44691, Mar. 1992, Takase, Video Disk Player.

* cited by examiner

COMPRESSION RULE 1 (FOR CONTINUOUS 1-3 PIXELS)

| CODING HEADER (0 BITS) | NUMBER OF PIX FOLLOWD (2 BITS) | PIXEL DATA (2 BITS) |

COMPRESSION RULE 2 (FOR CONTINUOUS 4-15 PIXELS)

| CODING HEADER (2 BITS) | NUMBER OF PIX FOLLOWD (4 BITS) | PIXEL DATA (2 BITS) |

COMPRESSION RULE 3 (FOR CONTINUOUS 16-63 PIXELS)

| CODING HEADER (4 BITS) | NUMBER OF PIX FOLLOWD (6 BITS) | PIXEL DATA (2 BITS) |

COMPRESSION RULE 4 (FOR CONTINUOUS 64-255 PIXELS)

| CODING HEADER (6 BITS) | NUMBER OF PIX FOLLOWD (8 BITS) | PIXEL DATA (2 BITS) |

COMPRESSION RULE 5
(FOR CONTINUOUS PIXELS UP TO THE END OF LINE)

| CODING HEADER(14 BITS) | PIXEL DATA (2 BITS) |

COMPRESSION RULE 6 (FOR BYTE-ALIGNING)

| COMPRESSED DATA (NOT BYTE-ALIGNED) | DUMMY (4 BITS) |

RUN-LENGTH COMPRESSION RULES FOR 2-BIT PIXEL DATA

FIG. 5

COMPRESSION RULE 11 (FOR CONTINUOUS 1-7 PIXELS)

| CODING HEADER (0 BITS) | NUMBER OF PIX FOLLOWD (3 BITS) | PIXEL DATA (1 BIT) |

COMPRESSION RULE 12 (FOR CONTINUOUS 8-15 PIXELS)

| CODING HEADER (3 BITS) | NUMBER OF PIX FOLLOWD (4 BITS) | PIXEL DATA (1 BIT) |

COMPRESSION RULE 13 (FOR CONTINUOUS 16-127 PIXELS)

| CODING HEADER (4 BITS) | NUMBER OF PIX FOLLOWD (7 BITS) | PIXEL DATA (1 BIT) |

COMPRESSION RULE 14
(FOR CONTINUOUS PIXELS UP TO THE END OF LINE)

| CODING HEADER (7 BITS) | PIXEL DATA (1 BIT) |

COMPRESSION RULE 15 (FOR BYTE-ALIGNING)

| COMPRESSED DATA (NOT BYTE-ALIGNED) | DUMMY (4 BITS) |

RUN-LENGTH COMPRESSION RULES FOR 1-BIT PIXEL DATA

BEFORE COMPRESSED

| | LINE START ... LINE END |
|---|---|
| 1ST LINE | · · · o # o · · · o # # # # o · |
| 2ND LINE | · · o # # # o · · o # o o o # o |
| 3RD LINE | · o # # o # # o · o # o o o # o |
| 4TH LINE | · o # o o o # o · o # # # # o · |
| 5TH LINE | · o # # # # o · o # o o o # o |
| 6TH LINE | · o # o o o # o · o # o o o # o |
| 7TH LINE | · o # o · o # o · o # # # # o · |
| 8TH LINE | · o o o · o o o · o o o o o · · |
| 9TH LINE | · · · · · · · · · · · · · · · · |

· = BACKGROUND COLOR PIXEL 2-BIT (00)

# = CHARACTER COLOR PIXEL 2-BIT (01)

o = EMPHASIZING COLOR PIXEL 2-BIT (10)

| | LINE START ... LINE END |
|---|---|
| 1ST LINE | · *3/ o *1/ # *1/ o *1/ · *3/ o *1/ # *4/ o *1/ · *1 |
| 2ND LINE | · *2/ o *1/ # *3/ o *1/ · *2/ o *1/ # *1/ o *3/ # *1/ o *1 |
| ⋮ | ⋮ |
| 8TH LINE | · *1/ o *3/ · *1/ o *3/ · *1/ o *5/ · *2 |
| 9TH LINE | · *16 |

| | LINE START ... LINE END |
|---|---|
| 1ST LINE | 1100 0110 0101 0110 1100 0110 00010001 0110 0100 |
| 2ND LINE | 1000 0110 1101 0110 1000 0110 0101 1110 0101 0110 |
| ⋮ | ⋮ |
| 8TH LINE | 0100 1110 1101 1110 0100 00010110 1000 |
| 9TH LINE | 0000 0000 0000 0000 |

AFTER COMPRESSED

FIG. 7

ENCODED DATA (RUN-LENGTH COMPRESSED)

| 1ST LINE | 1100 0110 0101 0110 1100 |
| --- | --- |
| 2ND LINE | 1000 0110 1101 0110 1000 |
| ⋮ | ⋮ |
| 8TH LINE | 0100 1110 1101 1110 0100 |
| 9TH LINE | 0000 0000 0000 0000 |

| 1ST LINE | · · · o # o · · · |
| --- | --- |
| 2ND LINE | · · o # # # o · · |
| 3RD LINE | · o # # o # # o · |
| 4TH LINE | · o # o o o # o · |
| 5TH LINE | · o # # # # # o · |
| 6TH LINE | · o # o o o # o · |
| 7TH LINE | · o # o · o # o · |
| 8TH LINE | · o o o · o o o · |
| 9TH LINE | · · · · · · · · · |

NON-INTERLACED DISPLAY
OF DECODED DATA

| LINE#01<br>LINE#10 | · · · o # o · · ·<br>· · · o # o · · · |
| --- | --- |
| LINE#02<br>LINE#11 | · · o # # # o · ·<br>· · o # # # o · · |
| LINE#03<br>LINE#12 | · o # o # # o ·<br>· o # # o # # o · |
| LINE#04<br>LINE#13 | · o # o o o # o ·<br>· o # o o o # o · |
| LINE#05<br>LINE#14 | · o # # # # # o ·<br>· o # # # # # o · |
| LINE#06<br>LINE#15 | · o # o o o # o ·<br>· o # o o o # o · |
| LINE#07<br>LINE#16 | · o # o · o # o ·<br>· o # o · o # o · |
| LINE#08<br>LINE#17 | · o o o · o o o ·<br>· o o o · o o o · |
| LINE#09<br>LINE#18 | · · · · · · · · ·<br>· · · · · · · · · |

INTERLACED DISPLAY
OF DECODED DATA

FIG. 8

PICTURE DATA (PXD) BEFORE COMPRESSED
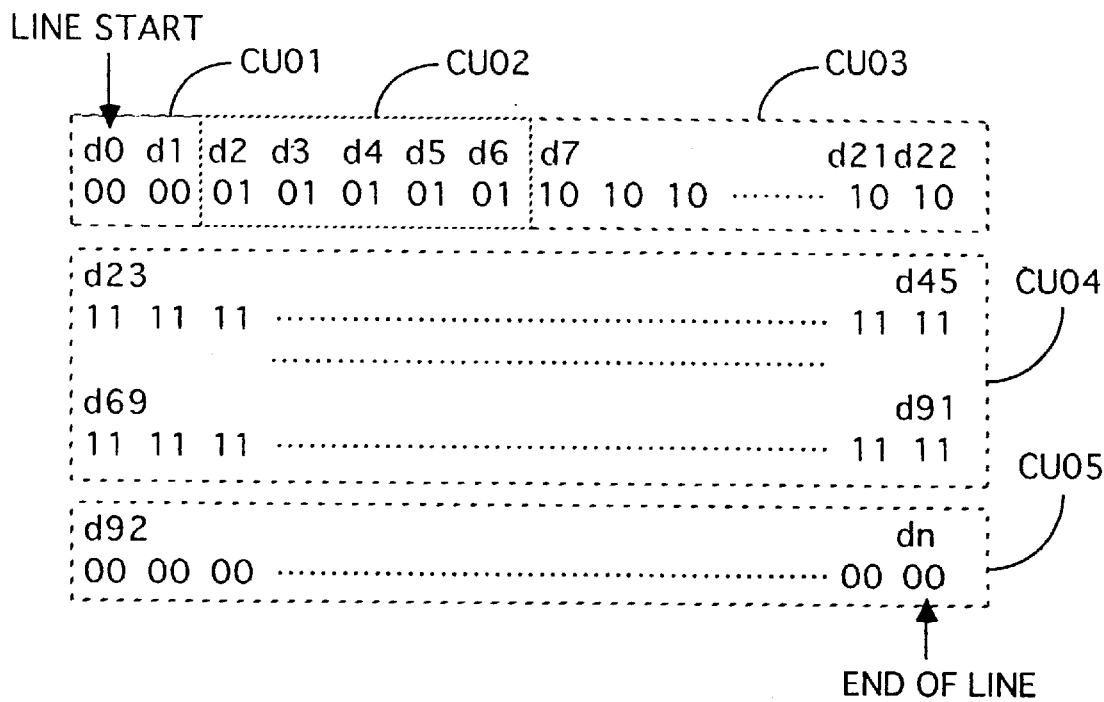
PXD AFTER COMPRESSED
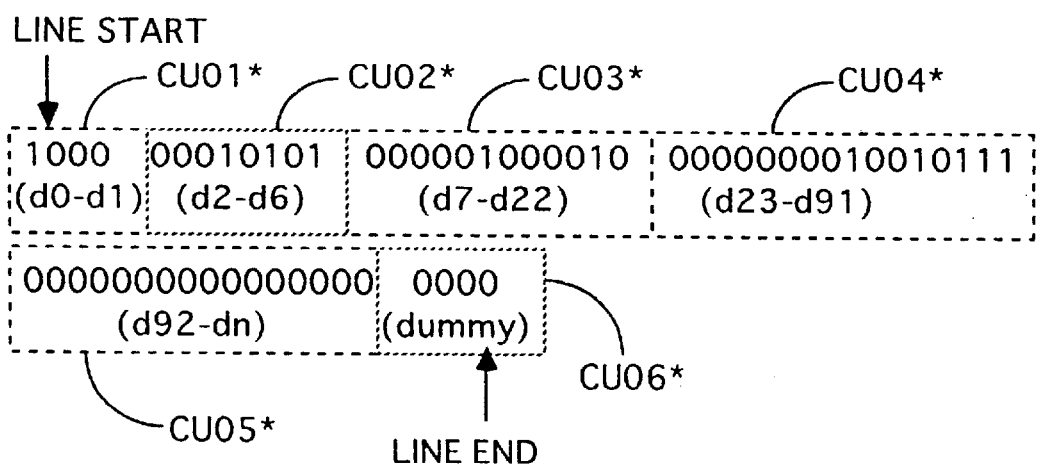
FIG. 9

SUB-PICTURE UNIT HEADER SPUH

| PARAMETER | CONTENTS | NUMBER OF BYTES |
|---|---|---|
| SPDSZ | SIZE OF SP UNIT | 2 BYTES |
| SPDCSQTA | START ADDRESS OF DISPLAY CONTROL SEQUENCE TABLE (RELATIVE BYTE NUMBER FROM 1ST BYTE OF SP UNIT) | 2 BYTES |
| | TOTAL | 4 BYTES |

SUB-PICTURE DISPLAY CONTROL SEQUENCE TABLE
DCSQT (OR SPDCSQT)

| PARAMETER | CONTENTS |
|---|---|
| DCSQ 0 | DISPLAY CONTROL SEQUENCE "0" |
| DCSQ 1 | DISPLAY CONTROL SEQUENCE "1" |
| ⋮ | ⋮ |
| ⋮ | ⋮ |
| DCSQ n | DISPLAY CONTROL SEQUENCE "n" |

FIG. 32

CONTENTS OF RESPECTIVE DCSQ

| PARAMETER | CONTENTS | NUMBER OF BYTES |
|---|---|---|
| SPDCTS | DISPLAY CONTROL START TIME | 2 BYTES |
| SPNDCSQA | ADDRESS OF NEXT OR FOLLOWING DISPLAY CONTROL SEQUENCE | 2 BYTES |
| SPDCCMD 1 | DISPLAY CONTROL COMMAND 1 | 0 TO 6 BYTES OR PIXEL CONTROL DATA PCD + 2 BYTES |
| SPDCCMD 2 | DISPLAY CONTROL COMMAND 2 | |
| ⋮ | ⋮ | |

FIG. 33

DISPLAY CONTROL COMMAND FOR SUB-PICTURE SPDCCMD

| COMMAND NAME | CONTENTS | CODE | NUMBER OF EXTENDED FIELDS |
|---|---|---|---|
| FSTA DSP | FORCEDLY SET DISPLAY START TIMING OF PIXEL DATA | 00h | 0 BYTE |
| STA DSP | SET DISPLAY START TIMING OF PIX. DATA | 01h | 0 BYTE |
| STP DSP | SET DISPLAY STOP TIMING OF PIX. DATA | 02h | 0 BYTE |
| SET COLOR | SET COLOR CODE OF PIXEL DATA | 03h | 2 BYTES |
| SET CONTR | SET CONTRAST BETWEEN PIX. DATA AND MAIN PICTURE | 04h | 2 BYTES |
| SET DAREA | SET DISPLAY AREA OF PIXEL DATA | 05h | 6 BYTES |
| SET DSPXA | SET DISPLAY START ADR. OF PIXEL DATA | 06h | 4 BYTES |
| CHG COLCON | SET CHANGE OF COLOR & CONTRAST FOR PIXEL DATA | 07h | PIX. CONTROL DATA PCD + 2 BYTES |
| CMD END | END OF DISPLAY CONTROL COMMAND | FFh | 0 BYTE |

FIG. 34

PIXEL CONTROL DATA PCD

| PARAMETER | CONTENTS | NUMBER OF BYTES |
|---|---|---|
| LCINF1 | LINE CONTROL INFO. #1 | 4 BYTES |
| PCINF1 | PIXEL CONTROL INFO. #1 | 6 BYTES |
| ⋮ | ⋮ | ⋮ |
| PCINFi | PIXEL CONTROL INFO. #i | 6 BYTES |
| LCINF2 | LINE CONTROL INFO. #2 | 4 BYTES |
| PCINF1 | PIXEL CONTROL INFO. #1 | 6 BYTES |
| ⋮ | ⋮ | ⋮ |
| PCINFj | PIXEL CONTROL INFO. #j | 6 BYTES |
| ⋮ | ⋮ | ⋮ |
| ⋮ | ⋮ | ⋮ |
| LCINFm-1 | LINE CONTROL INFO. #m-1 | 4 BYTES |
| PCINF1 | PIXEL CONTROL INFO. #1 | 6 BYTES |
| ⋮ | ⋮ | ⋮ |
| PCINFk | PIXEL CONTROL INFO. #k | 6 BYTES |
| LCINFm | LINE CONTROL INFO. #m (TERMINATION CODE) | 4 BYTES |

FIG. 35

COMMAND "FSTA DSP(00h)" FOR FORCEDLY SETTING
DISPLAY START TIMING OF PIXEL DATA

| b7 | b6 | b5 | b4 | b3 | b2 | b1 | b0 |
|---|---|---|---|---|---|---|---|
| 0 | 0 | 0 | 0 | 0 | 0 | 0 | 0 |

FIG. 36

COMMAND "STA DSP(01h)" FOR SETTING
DISPLAY START TIMING OF PIXEL DATA

| b7 | b6 | b5 | b4 | b3 | b2 | b1 | b0 |
|---|---|---|---|---|---|---|---|
| 0 | 0 | 0 | 0 | 0 | 0 | 0 | 1 |

FIG. 37

COMMAND "STP DSP(02h)" FOR SETTING
DISPLAY STOP TIMING OF PIXEL DATA

| b7 | b6 | b5 | b4 | b3 | b2 | b1 | b0 |
|---|---|---|---|---|---|---|---|
| 0 | 0 | 0 | 0 | 0 | 0 | 1 | 0 |

FIG. 38

COMMAND "SET COLOR(03h)" FOR SETTING
COLOR CODE OF PIXEL DATA

| b23 | b22 | b21 | b20 | b19 | b18 | b17 | b16 |
|---|---|---|---|---|---|---|---|
| 0 | 0 | 0 | 0 | 0 | 0 | 1 | 1 |

| b15 | b14 | b13 | b12 | b11 | b10 | b9 | b8 |
|---|---|---|---|---|---|---|---|
| EMPH. PIX. 2 COLOR CODE | | | | EMPH. PIX. 1 COLOR CODE | | | |

| b7 | b6 | b5 | b4 | b3 | b2 | b1 | b0 |
|---|---|---|---|---|---|---|---|
| PATTERN PIX. COLOR CODE | | | | BACKGND PIX. COLOR CODE | | | |

FIG. 39

CONTRAST OF MAIN PICTURE = (16 - k)/16
CONTRAST OF SUB-PICTURE = K /16
k = DESCRIBED VALUE (= 0); OR
k = DESCRIBED VALUE (NOT 0) +1

COMMAND "SET DSPXA(06h)" FOR SETTING
DISPLAY START ADDRESS OF PIXEL DATA

| b39 | b38 | b37 | b36 | b35 | b34 | b33 | b32 |
|-----|-----|-----|-----|-----|-----|-----|-----|
| 0 | 0 | 0 | 0 | 0 | 1 | 1 | 0 |

| b31 | b30 | b29 | b28 | b27 | b26 | b25 | b24 |
|-----|-----|-----|-----|-----|-----|-----|-----|
| HEAD ADDRESS OF PIXEL DATA FOR TOP FIELD (UPPER BITS) ||||||||

| b23 | b22 | b21 | b20 | b19 | b18 | b17 | b16 |
|-----|-----|-----|-----|-----|-----|-----|-----|
| HEAD ADDRESS OF PIXEL DATA FOR TOP FIELD (LOWER BITS) ||||||||

| b15 | b14 | b13 | b12 | b11 | b10 | b9 | b8 |
|-----|-----|-----|-----|-----|-----|-----|-----|
| HEAD ADDRESS OF PIXEL DATA FOR BOTTOM FIELD (UPPER BITS) ||||||||

| b7 | b6 | b5 | b4 | b3 | b2 | b1 | b0 |
|-----|-----|-----|-----|-----|-----|-----|-----|
| HEAD ADDRESS OF PIXEL DATA FOR BOTTOM FIELD (LOWER BITS) ||||||||

FIG. 43

COMMAND "CHG COLCON(07h)" FOR CHANGING
COLOR/CONTRAST FOR PIXEL DATA

| bm | bm-1 | bm-2 | bm-3 | bm-4 | bm-5 | bm-6 | bm-7 |
|---|---|---|---|---|---|---|---|
| 0 | 0 | 0 | 0 | 0 | 1 | 0 | 1 |

| bm-8 | bm-9 | bm-10 | bm-11 | bm-12 | bm-13 | bm-14 | bm-15 |
|---|---|---|---|---|---|---|---|
| EXTENDED FIELD SIZE (UPPER BITS) ||||||||

| bm-16 | bm-17 | bm-18 | bm-19 | bm-20 | bm-21 | bm-22 | bm-23 |
|---|---|---|---|---|---|---|---|
| EXTENDED FIELD SIZE (LOWER BITS) ||||||||

| bm-24 | bm-25 | bm-26 | bm-27 | bm-28 | bm-29 | bm-30 | bm-31 |
|---|---|---|---|---|---|---|---|
| PIXEL CONTROL DATA PCD (START) ||||||||

⋮

| b7 | b6 | b5 | b4 | b3 | b2 | b1 | b0 |
|---|---|---|---|---|---|---|---|
| PIXEL CONTROL DATA PCD (END) ||||||||

FIG. 44

COMMAND "CMD END(FFh)" FOR ENDING
DISPLAY CONTROL OF PIXEL DATA

| b7 | b6 | b5 | b4 | b3 | b2 | b1 | b0 |
|---|---|---|---|---|---|---|---|
| 1 | 1 | 1 | 1 | 1 | 1 | 1 | 1 |

FIG. 45

LINE CONTROL INFORMATION LCINF

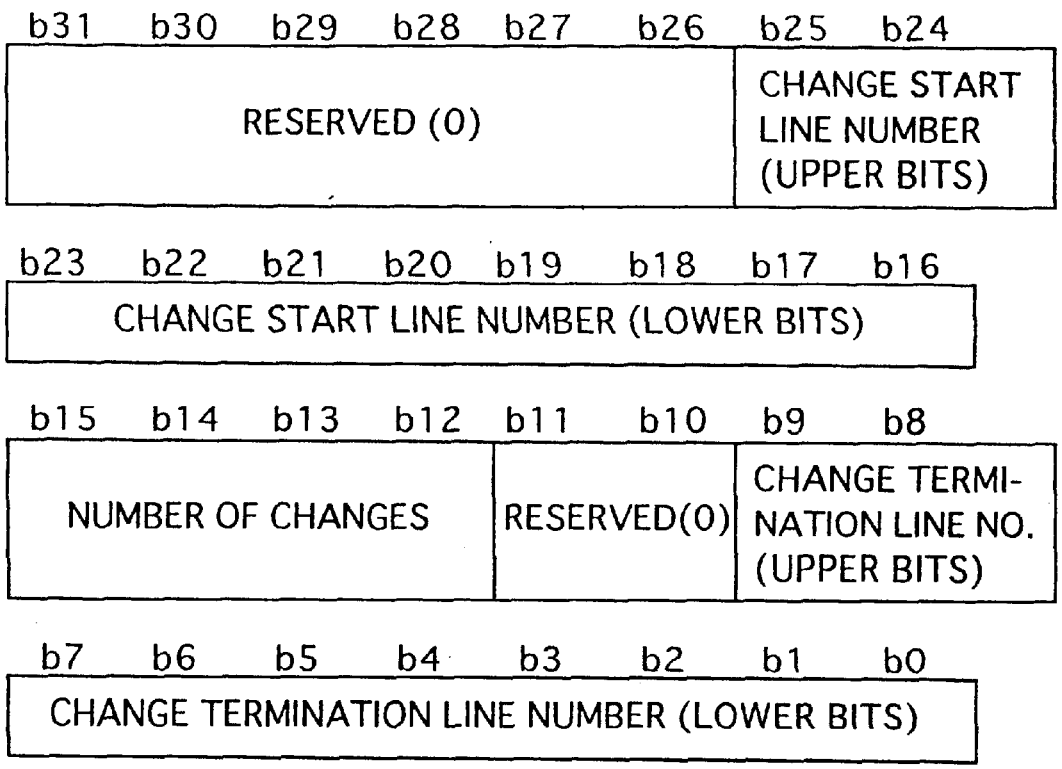

CHANGE START LINE NUMBER; NUMBER OF LINE FROM WHICH
CONTENT OF PIXEL CONTROL
STARTS TO CHANGE;
DESCRIBED BY LINE NUMBER
OF VIDEO DISPLAY

NUMBER OF CHANGES; NUMBER OF CHANGE POINTS
(NUMBER OF PCINFs) SPREAD
EVENLY ON LINES TO BE CHANGED
COULD BE DESCRIBED WITH
NUMBERS BETWEEN 1 AND 8.

CHANGE TERMINATION LINE NO.; NUMBER OF LINE AT WHICH
CONTENT OF PIXEL CONTROL
TERMINATES THE CHANGE;
DESCRIBED BY LINE NUMBER
OF VIDEO DISPLAY

FIG. 46

PIXEL CONTROL INFORMATION PCINF

| b47 | b46 | b45 | b44 | b43 | b42 | b41 | b40 |
|---|---|---|---|---|---|---|---|
| \multicolumn{6}{|c|}{RESERVED (0)} | | CHANGE START PIXEL NUMBER (UPPER BITS) | |

| b47 | b46 | b45 | b44 | b43 | b42 | b41 | b40 |
|---|---|---|---|---|---|---|---|
| RESERVED (0) | | | | | | CHANGE START PIXEL NUMBER (UPPER BITS) | |
| b39 | b38 | b37 | b36 | b35 | b34 | b33 | b32 |
| CHANGE START PIXEL NUMBER (LOWER BITS) | | | | | | | |
| b31 | b30 | b29 | b28 | b27 | b26 | b25 | b24 |
| NEW EMPH. PIX.2 COL. CODE | | | | NEW EMPH. PIX.1 COL. CODE | | | |
| b23 | b22 | b21 | b20 | b19 | b18 | b17 | b16 |
| NEW PATRN PIX. COL. CODE | | | | NEW BKGND PIX. COL. CODE | | | |
| b15 | b14 | b13 | b12 | b11 | b10 | b9 | b8 |
| NEW EMPH. PIX.2 CONTR. | | | | NEW EMPH. PIX.1 CONTR. | | | |
| b7 | b6 | b5 | b4 | b3 | b2 | b1 | b0 |
| NEW PATRN PIX. CONTR. | | | | NEW BKGND PIX. CONTR. | | | |

CHANGE START PIX. NO.; NUMBER OF PIX. FROM WHICH CONTENT OF PIX. CONTROL STARTS TO CHANGE, & DESCRIBED BY PIX. NO. OF VIDEO DISPLAY
NEW EMPH. PIX.1&2 COLOR; DESCRIBES PALETTE CODE FOR EMPHASIS PIXEL 1&2 ON CHANGE START PIXEL & FOLLOWING PIXELS
NEW PATRN PIX. COLOR; DESCRIBES PALETTE CODE FOR PATTERN PIXEL ON CHANGE START PIXEL & FOLLOWING PIXELS
NEW CONTRAST OTHER THAN BACKGROUND PIXELS; DESCRIBES CONTRAST FOR EMPHASIS PIXELS 1&2 AND FOR PATTERN PIXEL ON CHANGE START PIXEL & FOLLOWING PIXELS
NEW CONTRAST FOR BACKGROUND PIXELS; DESCRIBES CONTRAST FOR BACKGROUND PIXEL ON CHANGE START PIXEL & FOLLOWING PIXELS
NOTE; ENTER SAME CODE AS INITIAL VALUE IF NO CHANGE IS REQUIRED

FIG. 47

PIXEL CONTROL DATA PCD

| PARAMETER | CONTENTS | POSI-TION |
|---|---|---|
| LCINF1 | CHANGE LINE NO. (04 TO 11) | |
| PCINF1 | CHANGE START PIX. NO. 11 (LINE08) | C |
| PCINF2 | CHANGE START PIX. NO. 14 (LINE04) | B |
| PCINF3 | CHANGE START PIX. NO. 17 (LINE11) | A |
| LCINF2 | CHANGE LINE NO. (12) | |
| PCINF1 | CHANGE START PIX. NO. 09 (LINE12) | D |
| PCINF2 | CHANGE START PIX. NO. 12 (LINE12) | E |
| ⋮ | ⋮ | ⋮ |
| LCINFm-1 | CHANGE LINE NO. (14) | |
| PCINF1 | CHANGE START PIX. NO. 09 (LINE14) | D |
| PCINF2 | CHANGE START PIX. NO. 11 (LINE14) | C |
| PCINF3 | CHANGE START PIX. NO. 12 (LINE14) | E |
| PCINF4 | CHANGE START PIX. NO. 17 (LINE14) | A |
| LCINFm | CNAGE LINE NO. (14) (TERMINATION CODE) | |

FIG. 49

IMAGE INFORMATION ENCODING/DECODING SYSTEM

This is a continuation of application Ser. No. 08/597,505, filed Feb. 2, 1996 now U.S. Pat. No. 5,758,007.

BACKGROUND OF THE INVENTION

1. Field of the Invention

The present invention relates to an improvement of a system for encoding and decoding image information such as a sub-picture which is reproduced or played back simultaneously with a main picture.

The present invention also relates to a recording medium, such as an optical disk, and a data recording scheme for recording sub-picture data supplied together with picture data on the recording medium and simultaneously reproduced with the picture data from the recording medium.

2. Description of the Related Art

Sub-pictures superimposed on main pictures, such as titles in a movie, and image contents to be displayed as a set value of the television volume level are mainly realized by two schemes, i.e., a character code scheme and a bit map data scheme.

In the character code scheme, characters, such as pre-registered and prepared characters and patterns, are held in a character recording area of a character generator. A code assigned to each character is input to the character generator to display a desired character.

According to this scheme, dedicated hardware, such as a character generator is required, but the volume of data to be sent to a display system can be smaller than that of a scheme for directly sending character bit map data to the display system so as to display a sub-picture, because a code is input to display a character. However, the applications of display of sub-pictures according to this scheme are limited since only the pre-registered and prepared characters can be displayed.

To the contrary, in the bit map data scheme, dedicated hardware for generating a sub-picture from a code need not be used, because the bit map data of the sub-picture is directly sent to a display system. The sub-pictures can be used in a variety of display applications since the form of the sub-picture to be displayed is not fixed.

According to this method, sub-picture color data, sub-picture outline color data required for superimposing a sub-picture on a main picture, and superimposing mixing ratio data of the main picture and the sub-picture must be provided for each pixel. Therefore, the volume of data to be sent to a display system is inevitably very large. In addition, in the bit map data scheme, data associated with all pixels on a display screen (to be referred to a frame hereinafter) must be sent to the display system regardless of the size of a sub-picture (see FIG. 50). For this reason, a large amount of wasteful data are present in respect of display space.

In either the character code scheme or the bit map data scheme, even if the shape of a sub-picture being currently displayed does not change, sub-picture data must be basically kept supplied for each display frame period, and a large amount of wasteful data are present with respect to the display time.

SUMMARY OF THE INVENTION

The present invention has been made to solve the conventional problems described above, and has its object to provide a data recording method and a recording medium, in which sub-picture data wasteful in respect of both display space and display time can be greatly reduced, the degree of freedom in sub-picture expressions is large, and a variety of applications of sub-pictures can be assured.

In order to achieve the above object, according to the first invention, there is provided a data recording method of forming, in a predetermined unit, a packet of sub-picture data simultaneously reproducible with main picture data, and recording the sub-picture data packet on a recording medium, wherein the sub-picture data packet includes at least packet header information (PH) including a playback start time of the sub-picture data packet which is expressed using a reference time, sub-picture content data (PXD) representing the display contents of a sub-picture, at least one portion of display control sequence information (DCSQT) representing a control sequence for displaying the sub-picture using the sub-picture content data, and sub-picture header information (SPUH) including a size of the sub-picture data packet and a recording position of the display control sequence information, and the sub-picture data packet is recorded on the recording medium.

According to the second invention, there is provided a data recording method of forming, in predetermined units, packets of sub-picture data of a plurality of channels simultaneously reproducible with main picture data, respectively, and recording a plurality of data packets of a selected one of the plurality of channels as one sub-picture data block on a recording medium, wherein the sub-picture data packet includes at least packet header information (PH) including a playback start time of the sub-picture data packet which is expressed using a reference time, sub-picture content data (PXD) representing the display contents of a sub-picture, at least one display control sequence information (DCSQT) representing a control sequence for displaying the sub-picture using the sub-picture content data, and sub-picture header information (SPUH) including a size of the sub-picture data packet and a recording position of the display control sequence information, the sub-picture data packet is recorded on the recording medium, and the playback start time (PTS) of the sub-picture data packet in the packet header information is recorded only for a start sub-picture data packet in the sub-picture data block.

According to the third invention, there is provided a data recording method as defined in the first or second invention, wherein the display control sequence information (cf. DCSQ in FIG. 33) has at least a sub-picture display start time, a sub-picture display end time, the recording position of the sub-picture content data to be displayed, and a group of display control information for the sub-picture content data recorded at the recording position.

According to the fourth invention, there is provided a data recording method as defined in the third invention, wherein the sub-picture display start time and the sub-picture display end time are defined as times relative to the playback start time of the sub-picture data packet.

According to the fifth invention, there is provided a data recording method as defined in the third invention, wherein display start control information (cf. STA_DSP in FIG. 34) for controlling a start of display of the sub-picture content data is recorded as the display control information on the basis of the display start time included in the display control sequence information.

According to the sixth invention, there is provided a data recording method as defined in-the third invention, wherein display end control information (cf. STP_DSP in FIG. 34) for controlling an end of display of the sub-picture content data is recorded as the display control information on the basis of the display end time included in the display control sequence information.

According to the seventh invention, there is provided a data recording method as defined in the third invention, wherein color setting information (cf. SET_COLOR in FIG. 34) for setting a color of the sub-picture content data for each pixel type is recorded as the display control information.

According to the eighth invention, there is provided a data recording method as defined in the third invention, wherein mixing ratio setting information (cf. SET_CONTR in FIG. 34) for setting a mixing ratio of the main picture and the sub-picture content data for each pixel type is recorded as the display control information.

According to the ninth invention, there is provided a data recording method as defined in the third invention, wherein display area setting information (cf. SET_DAREA in FIG. 34) for setting a display area of the sub-picture content data on the main picture is recorded as the display control information.

According to the tenth invention, there is provided a data recording method as defined in the third invention, wherein use range setting information (cf. SET_DSPXA in FIG. 34) for setting a range to be used in a display in the sub-picture content data is recorded as the display control information.

According to the eleventh invention, there is provided a data recording method as defined in the third invention, wherein color/mixing ratio change setting information (cf. CHG_COLCON in FIG. 34) for setting, in units of pixels, changes in a color of the sub-picture content data for each pixel type and in a mixing ratio of the main picture and the sub-picture content data for each pixel type is recorded as the display control information.

According to the twelfth invention, there is provided a data recording method as defined in the third invention, wherein display control end setting information (cf. CMD_END in FIG. 34) for setting an end of display control for the sub-picture content data is recorded as the display control information.

According to the thirteenth invention, there is provided a recording medium on which a packet of sub-picture data simultaneously reproducible with main picture data is formed in a predetermined unit and recorded, wherein the sub-picture data packet includes at least packet header information (PH) including a playback start time of the sub-picture data packet which is expressed using a reference time, sub-picture content data(PXD) representing the display contents of a sub-picture, at least one display control sequence information (DCSQT) representing a control sequence for displaying the sub-picture using the sub-picture content data, and sub-picture header information (SPUH) including a size of the sub-picture data packet and a recording position of the display control sequence information.

According to the fourteenth invention, there is provided a recording medium on which packets of sub-picture data of a plurality of channels simultaneously reproducible with main picture data are formed in predetermined units, respectively, and a plurality of data packets of a selected one of the plurality of channels are recorded as one sub-picture data block, wherein the sub-picture data packet includes at least packet header information (PH) including a playback start time of the sub-picture data packet which is expressed using a reference time, sub-picture content data (PXD) representing the display contents of a sub-picture, at least one display control sequence information (DCSQT) representing a control sequence for displaying the sub-picture using the sub-picture content data, and sub-picture header information (SPUH) including a size of the sub-picture data packet and a recording position of the display control sequence information, and the playback start time (PTS) of the sub-picture data packet in the packet header information is recorded only for a start sub-picture data packet in the sub-picture data block.

According to the present invention, since one or more pieces of the display control sequence information (DCSQT) is used, sub-picture data wasteful in respect of both display space and display time can be greatly reduced. At the same time, the degree of freedom in sub-picture expressions equivalent to the bit map data scheme can be achieved, and a variety of applications of the sub-pictures can be assured.

More specifically, according to the present invention, the use range setting information (SET_DSPXA) for setting the range to be used for a display in the sub-picture content data is recorded so as not to display data falling outside the use range. Wasteful data in respect of display space, which are created in transmitting one-frame data to the display system, can be greatly reduced.

In addition, according to the present invention, the color setting information (SET_COLOR) and the mixing ratio setting information (SET_CONTR) for each pixel type of sub-picture content data, such as a pattern pixel, an outline, and a background, are recorded to obtain sub-picture content data as information representing the shape of a sub-picture image. A sub-picture shape expression almost equivalent to the conventional scheme for providing color information and mixing ratio information for each pixel can be guaranteed in a smaller volume of data.

Furthermore, according to the present invention, the color/mixing ratio change setting information (CHG_COLCON) for setting, in units of pixels, change in the color of the sub-picture content data for each pixel type and in the mixing ratio of the main picture and the sub-picture content data for each pixel type is recorded. A sub-picture can be dynamically displayed with an accuracy equal to that of the conventional bit map data scheme, but in a smaller volume of data than that.

Incidentally, the color information of a sub-picture rarely changes in units of pixels, and the data volume of the color/mixing ratio change setting information is not expected to increase excessively.

In addition, according to the present invention, even if the color of a sub-picture image changes, the sub-picture can be displayed across a plurality of frame times using the same sub-picture content data as long as the shape does not change. As compared with the conventional scheme wherein the sub-picture data is kept supplied to the display system at the frame period regardless of changes in color and shape of the sub-picture, wasteful sub-picture data in respect of display space can be greatly reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a view for explaining compression rules 1 to 6 used in an encoding method according to an embodiment of the present invention in a case wherein image data constituting the sub-picture data portion in FIG. 4 consists of a plurality of bits (2 bits in this case);

FIG. 6 is a view for explaining compression rules 11 to 15 used in an encoding method according to another embodiment of the present invention in a case wherein image data constituting the sub-picture data portion in FIG. 4 consists of 1 bit;

FIG. 7 is a view for explaining a detailed example of how the pixel data of each line is encoded (run-length compressed) in a case wherein pixel data constituting the sub-picture data portion in FIG. 4 consists of, e.g., first to ninth lines, 2-bit pixels (a maximum of four types) are arranged on each line, and character patterns "A" and "B" are expressed by the 2-bit pixels on the respective lines;

FIG. 8 is a view for explaining two examples (non-interlaced display and interlaced display) of how the character pattern "A" of the pixel data (sub-picture data) encoded as shown in FIG. 7 is decoded;

FIG. 9 is a view for explaining compression rules 1 to 6, in detail, which are used in an encoding method according to an embodiment of the present invention in a case wherein image data constituting the sub-picture data in FIG. 4 consists of 2 bits;

FIG. 32 explains a configuration of a sub-picture display control sequence table (SPDCSQT);

FIG. 33 explains contents of respective parameters (DCSQ) constituting the table (SPDCSQT) of FIG. 32;

FIG. 34 explains contents of display control command (SPDCCMD) of sub-picture;

FIG. 35 explains contents of pixel control data (PCD);

FIG. 36 shows a bit-configuration of command FSTA_DSP, which is one of the commands exemplified in FIG. 34, for forcibly setting the display start timing of the pixel data of sub-picture;

FIG. 37 shows a bit-configuration of command STA_DSP, which is one of the commands exemplified in FIG. 34, for setting the display start timing of the pixel data of sub-picture;

FIG. 38 shows a bit-configuration of command STP_DSP, which is one of the commands exemplified in FIG. 34, for setting the display stop timing of the pixel data of sub-picture;

FIG. 39 shows a bit-configuration of command SET_COLOR, which is one of the commands exemplified in FIG. 34, for setting the color code of the pixel data of sub-picture;

FIG. 43 shows a bit-configuration of command SET_DSPXA, which is one of the commands exemplified in FIG. 34, for setting the display start address of the pixel data of sub-picture;

FIG. 44 shows a bit-configuration of command CHG_COLCON, which is one of the commands exemplified in FIG. 34, for setting the display area of the pixel data of sub-picture;

FIG. 45 shows a bit-configuration of command CMD_END, which is one of the commands exemplified in FIG. 34, for terminating the display control of sub-picture;

FIG. 46 shows a bit-configuration of line control information LCINF for pixel lines, which is one of the parameters exemplified in FIG. 35;

FIG. 47 shows a bit-configuration of line control information LCINF for pixel lines, which is one of the parameters exemplified in FIG. 35;

FIG. 49 shows contents of respective parameters of pixel control data (PCD) of FIG. 35, when the display frame of sub-picture includes a pixel pattern as shown in FIG. 48;

DETAILED DESCRIPTION OF THE PREFERRED EMBODIMENTS

Figure 1:
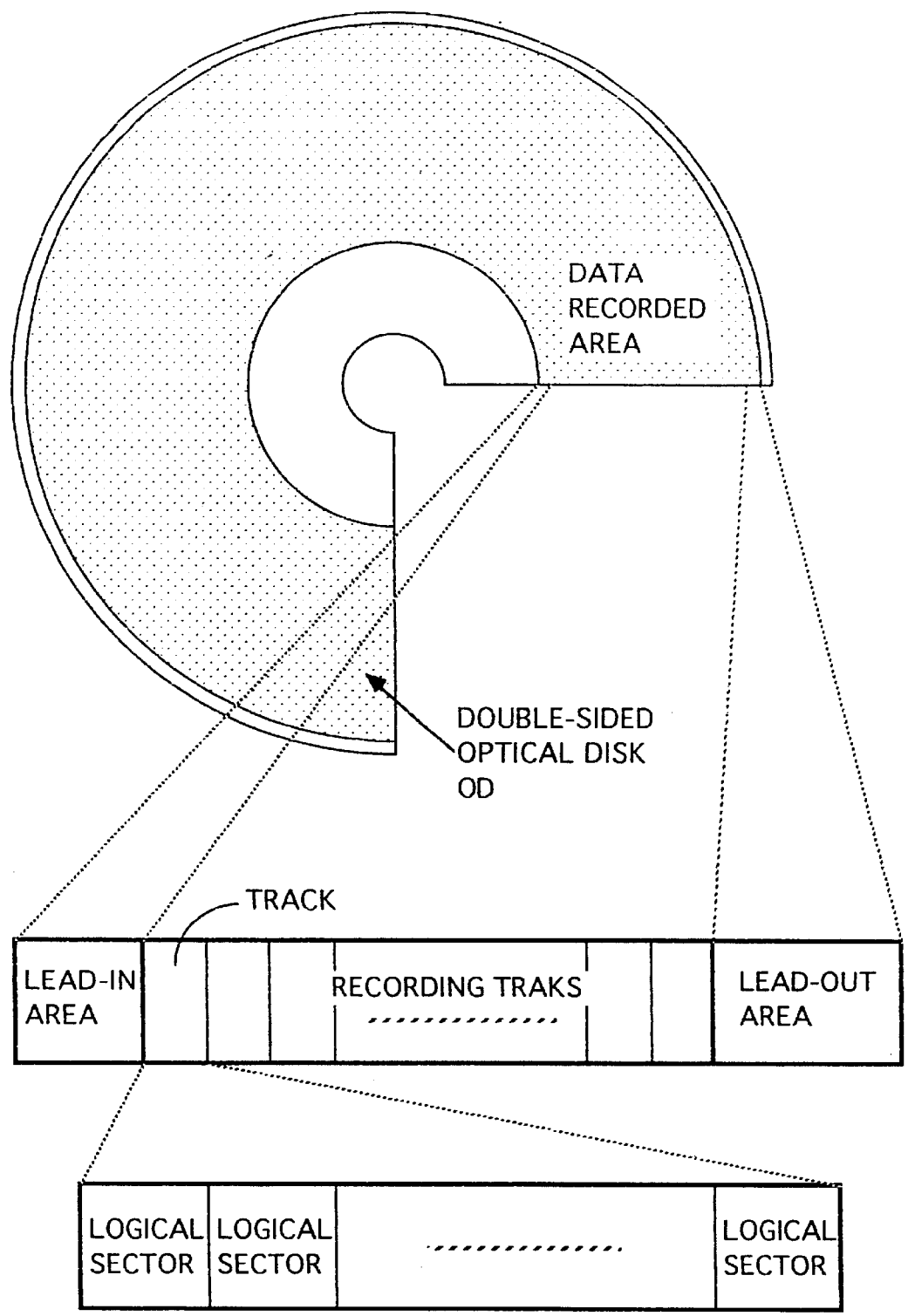
FIG. 1 is a view showing the structure of data recorded on an optical disk as an information holding medium to which the present invention can be applied.

Encoding and decoding methods according to an embodiment of the present invention will be described below with reference to the accompanying drawings. In order to avoid a repetitive description, the same or similar reference numerals/symbols denote parts having the same or similar functions throughout the drawings.

Figure 59:
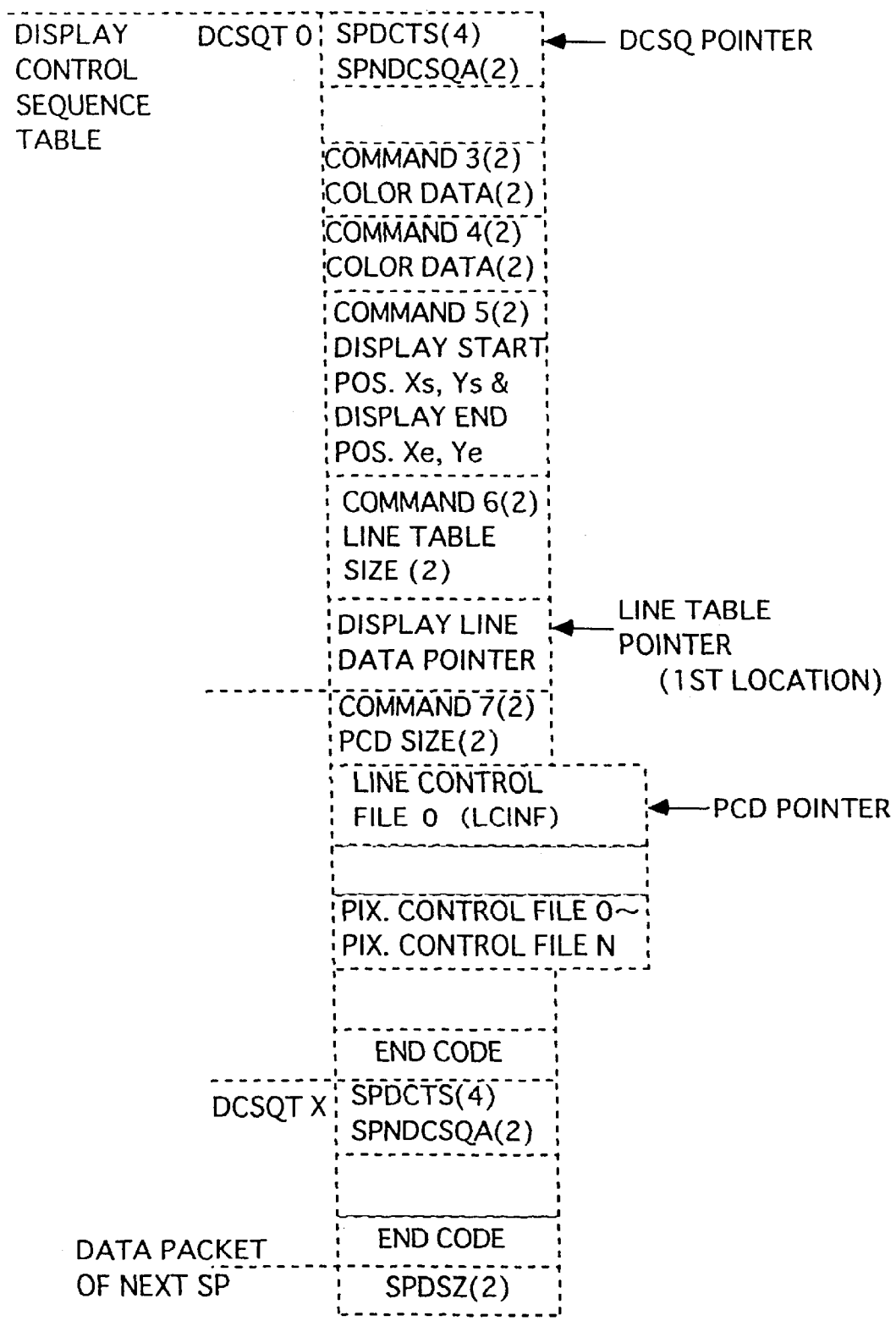
FIG. 59 shows an example of the display control sequence table in the packet of FIG. 29.

FIGS. 1 to 59 explain the image information encoding/decoding system according to an embodiment of the present invention.

FIG. 1 schematically shows the structure of data recorded on double-sided optical disk OD as an information holding medium to which the present invention can be applied.

Optical disk OD is a double-sided optical disk. Each surface of this optical disk has a storage capacity of about 5 Gbytes. Many recording tracks are arranged between the lead-in area on the inner peripheral side of the disk and the lead-out area on the outer peripheral side of the disk. Each track is constituted by many logical sectors. Various pieces of information (compressed digital data) are stored in the respective sectors.

Figure 2:
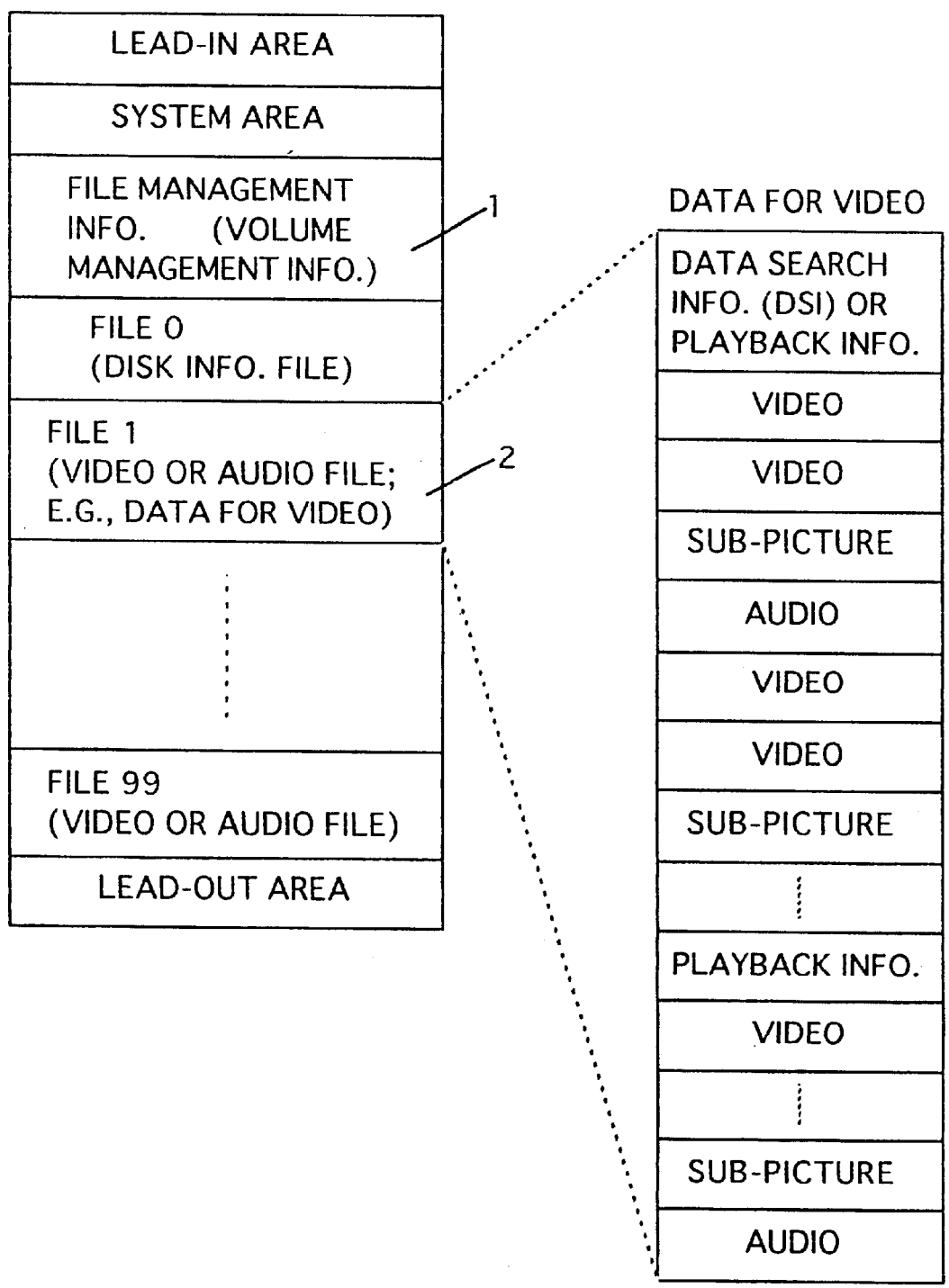
FIG. 2 is a view showing the logical structure of data to be recorded on the optical disk in FIG. 1.

FIG. 2 shows an example of the data structure of a picture file (data for video) to be recorded in optical disk OD shown in FIG. 1.

As shown in FIG. 2, this video file comprises file management information 1 and picture (video) data 2. Video data 2 comprises video data blocks, audio data blocks, sub-picture data blocks, and DSI blocks in which pieces of information (DSI; Disk Search Information) necessary to control data playback are respectively recorded. Each block is divided into packets having a predetermined data size for, e.g., each data type. The video data blocks, audio data blocks, and sub-picture data blocks are reproduced or played back in synchronism with the DSIs located before these blocks.

More specifically, a system area in which system data used by disk OD is stored, a volume management information area, and a plurality of file areas are formed in the aggregate of logical sectors in FIG. 1.

Of the plurality of file areas, for example, file 1 contains main picture information ("VIDEO" in FIG. 2), sub-picture information ("SUB-PICTURE" in FIG. 2) having contents supplementary to the main picture information, audio information ("AUDIO" in FIG. 2), playback information ("PLAYBACK INFO." in FIG. 2), and the like.

Figure 3:
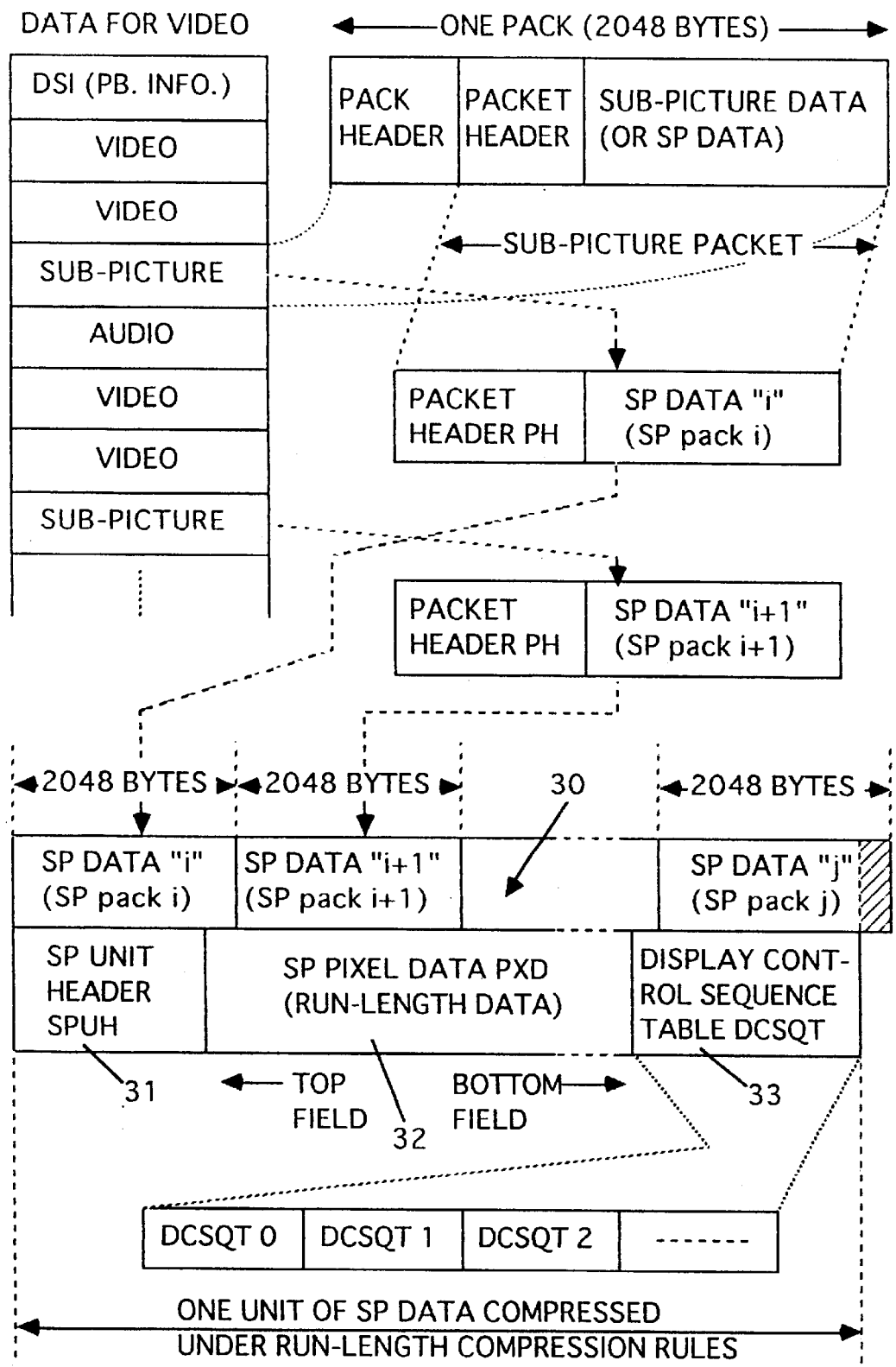
FIG. 3 is a view showing the logical structure of a sub-picture pack to be encoded (run-length compressed and supplied with a display control sequence table), of the data structure shown in FIG. 2.

FIG. 3 shows an example of the logical structure of a sub-picture information pack being subjected to the encoding (or the run-length compression).

As shown at the upper portion of FIG. 3, one pack of the sub-picture information contained in the video data is constituted by, for example, 2048 bytes (or 2 k bytes). This one pack sub-picture information includes one or more sub-picture packets subsequent to the header of the leading pack. The first sub-picture packet is provided with run-length-compressed sub-picture data (SP DATA1) after its packet header. Similarly, the second sub-picture packet is provided with run-length-compressed sub-picture data (SP DATA2) after its packet header.

Sub-picture unit header 31 is assigned to sub-picture data unit 30 which is obtained by gathering a plurality of sub-picture data pieces (SP DATA1, SP DATA2, . . . ). Here, the gathered sub-picture data pieces constitute one unit of the run-length compression. Following after sub-picture unit header 31 is pixel data 32 obtained by run-length-compressing the picture data of one unit which is, for example, image data on one horizontal (scanning) line of a two-dimensional display screen, and table 33 containing display control sequence information of respective sub-picture packs.

In other words, one unit of run-length-compressed data 30 is formed of a group of the sub-picture data pieces (SP DATA1, SP DATA2, . . . ) of one or more sub-picture packets. In short, sub-picture data unit 30 is constituted by sub-picture unit header SPUH 31, in which various parameters for sub-picture displaying are recorded, display data (compressed pixel data) PXD 32 formed of run-length codes, and display control sequence table DCSQT 33.

Figure 4:
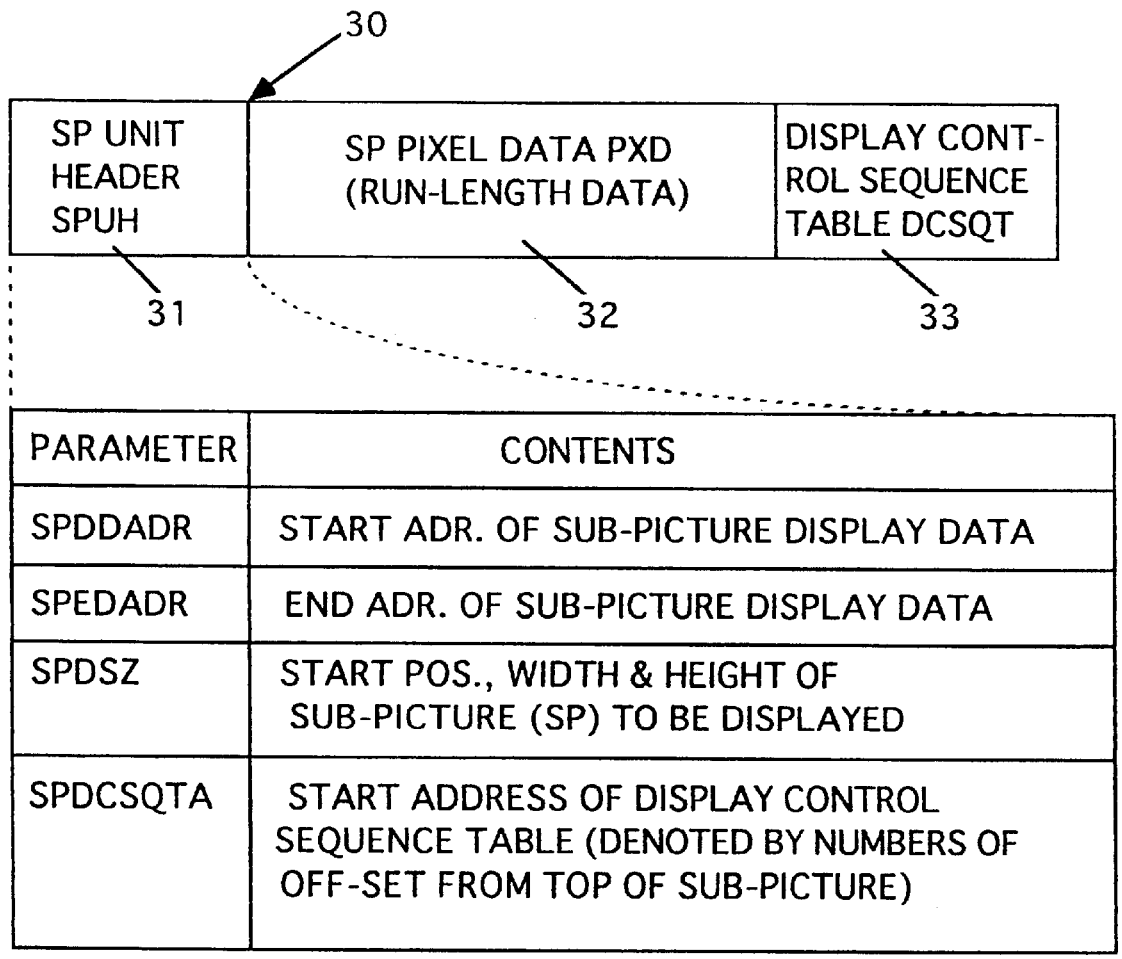
FIG. 4 is a view showing the contents of a sub-picture data, of the sub-picture pack in FIG. 3, to which an encoding method according to an embodiment of the present invention is applied.
Figures 30, 31:
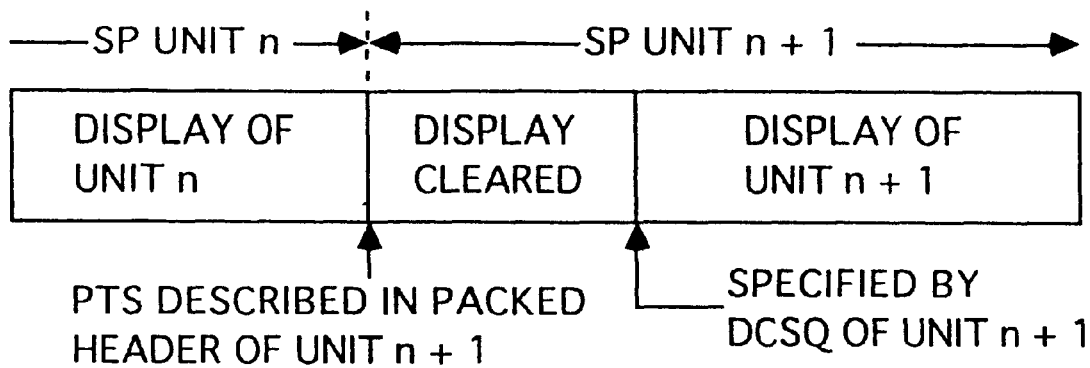
FIG. 30 explains a relation between series sub-picture units and the time stamp (PTS) as well as the display control sequence (DCSQ) which are described in the packet header of one of the series sub-picture units.
FIG. 31 explains the size of sub-picture as well as the start address (relative address pointer of DCSQ) of display control sequence table, which constitute a part of parameters contained in the sub-picture unit header (SPUH) of FIG. 3 or FIG. 4.

FIG. 4 shows part of the contents of sub-picture unit header 31 in one unit of run-length compressed data 30 in FIG. 3 (cf. FIG. 31 for other part of SPUH 31). The data of a sub-picture (e.g., subtitles corresponding to a scene in a movie) to be recorded/transmitted (or communicated) together with a main picture (e.g., a picture of the movie) will be described below.

As will be seen from FIG. 4, recorded in sub-picture unit header SPUH 31 are: start address SPDDADR of sub-picture pixel data (display data); end address SPEDADR of pixel data 32; data SPDSZ of the display-start position and display area (width and height) of pixel data 32 with respect to a TV display screen; and record start position SPDCSQTA of display control sequence table 33 in the sub-picture data packet.

In a certain case, the following parameters may also be recorded in SPUH 31: background color SPCHI designated by the system; sub-picture color SPCINFO designated by the system; pallet color number SPADJINFO of an emphasizing color designated by the system; modification information SPMOD of sub-picture pixel data 32; mixing ratio SPCONT of sub-picture (SP) to main-picture (MP); start-timing (corresponding to the frame number of MP) SPDST of the sub-picture; and start addresses SPLine 1 to SPLine N of decode data of respective lines.

Incidentally, in a preferred embodiment of the present invention, start addresses SPLine 1 to SPLine N of decode data of the lines are respectively provided for a plurality of sub-picture fields.

More specifically, as indicated by the lower portion in FIG. 4, various parameters (e.g., SPDDADR) having the following contents are recorded on sub-picture unit header 31:

(1) the start address information (SPDDADR: an address relative to the beginning of the header) of the display data (sub-picture pixel data) following the header;

(2) the end address information (SPEDADR: an address relative to the beginning of the header) of the display data;

(3) information (SPDSZ) indicating the display start position and display range (width and height) of the display data on the monitor screen; and (4) record start position information (start address SPDCSQTA of the sub-picture display control sequence table) of display control sequence table 33 in the packet.

Further, in a specific case of various embodiments according to the present invention, sub-picture unit header SPUH 31 may include the following information pieces:

(5) information (SPCHI) designated by the system and indicating the background color (a 16-color palette number set by a story information table or a display control sequence table);

(6) information designated by the system and indicating a sub-picture color (a 16-color palette number set by the story information table or the display control sequence table);

(7) information (SPAJDNFO) designated by the system and indicating a sub-picture emphasizing color (a color palette number set by the story information table or the display control sequence table);

(8) information (SPMOD) designated by the system and specifying the sub-picture image mode information indicating either a field mode for non-interlaced display or a frame mode for interlaced display (when the pixel data to be compressed is defined by various number of bits, the number of bits of this pixel data can be specified by the content of this mode information);

(9) information (SPCONT) designated by the system and indicating the mixing ratio of the sub-picture to the main picture;

(10) information (SPDST) indicating the-display start timing of the sub-picture with the frame number (e.g., an I picture frame number of MPEG) of the main picture;

(11) information (SPline 1 to SPline N) indicating the start addresses (relative addresses with respect to the beginning of the sub-picture unit header) of the encoded data on the first to Nth lines of the sub-picture; and Note that information SPCONT indicating the mixing ration of the sub-picture to the main picture represents: the mixing ratio of the sub-picture with [system set value]/16 or [system set value]/255, and the mixing ratio of the main picture with [16–set value]/16 or [255–set value]/255.

Sub-picture unit header 31 (or respective sub-picture fields) includes the start address (SPLine 1 to SPLine N) of data to be decoded on every lines. For this reason, scrolling of only the sub-picture on the display screen can be realized by changing the designation of a decoding start line in accordance with an instruction from a microcomputer (MPU or CPU) on the decoding side. (How the scrolling is performed will be described later with reference to FIG. 21)

In a certain embodiment of the invention, a field/frame mode (SPMOD) can be recorded on sub-picture unit header 31 to indicate how the sub-picture corresponds to a TV field/frame of the NTSC scheme.

In general, bit "0" is written in this field/frame mode recording portion (SPMOD). Upon reception of sub-picture data unit 30, the decoding side determines from bit "0" that the frame mode (non-interlaced mode) is set, and decodes the received encoded data in units of lines. As a result, a decoded image like the one shown at the lower left position in FIG. 8 is output from the decoder. This image is displayed on the display screen of a monitor, a television (TV) set, or the like.

If bit "1" is written in the field/frame mode recording portion (SPMOD), the decoding side determines that the field mode (interlaced mode) is set. In this case, after the encoded data is decoded in units of lines, the same data corresponding to two lines are consecutively output, as shown at the lower right position in FIG. 8. As a result, a frame corresponding to the TV interlaced mode can be obtained. With this operation, an image twice as large in amount as that in the frame mode (non-interlaced mode) can be displayed with the same data amount, although the image quality is lower than that in the frame mode.

The data length (variable length) of the pixel data (run-length data) 32 of sub-picture shown in FIG. 3 or 4 is determined depending on whether run-length compression rules 1 to 6 in FIG. 5 or run-length compression rules 11 to 15 in FIG. 6 are used.

Rules 1 to 6 in FIG. 5 are used when pixel data to be compressed has a multi-bit configuration (2 bits in this case). Rules 11 to 15 in FIG. 6 are used when pixel data to be compressed has a 1-bit configuration.

Whether run-length compression rules 1 to 6 or 11 to 15 are to be used can be determined by the contents (e.g., a bit width flag) of parameter SPMOD (see a portion near the middle of the table shown at the lower portion in FIG. 4) in sub-picture unit header 31. If, for example, the bit width flag of parameter SPMOD is "1", the pixel data to be run-length compressed is 2-bit data, and hence rules 1 to 6 in FIG. 5 are used. If the bit width flag of parameter SPMOD is "0", the pixel data to be run-length compressed is 1-bit data, and hence rules 11 to 15 in FIG. 6 are used.

Assume that four groups A, B, C, and D of compression rules are provided respectively for four kinds of the bit-configuration of pixel data, when this pixel data can optionally have the bit-configuration of either of 1-bit, 2-bit, 3-bit, and 4-bit. Under this assumption, when parameter SPMOD is constituted by 2-bit flag, the 1-bit pixel data using rule group A can be designated by the 2-bit flag of "00". In similar manner, the 2-bit pixel data using rule group B can be designated by the 2-bit flag of "01", the 3-bit pixel data using rule group C can be designated by the 2-bit flag of "10", and the 4-bit pixel data using rule group D can be designated by the 2-bit flag of "11". In this case, rules 11 to 15 of FIG. 6 can be used for the compression rules of group A, and rules 1 to 6 of FIG. 5 can be used for the compression rules of group B. When the contents of coding headers and the bit-configuration of pixel data, as well as the number of rules, are properly modified, the compression rules of groups C and D will be derived from rules 1 to 6 of FIG. 5.

FIG. 5 is a view for explaining run-length compression rules 1 to 6 which are used in an encoding method according to an embodiment of the present invention, wherein pixel data constituting sub-picture pixel data (run-length data) 32 in FIG. 4 consists of a plurality of bits (2 bits in this case).

FIG. 9 is a view for explaining compression rules 1 to 6, in detail, in a case wherein pixel data constituting sub-picture pixel data (run-length data) 32 in FIG. 4 consists of 2 bits.

According to rule 1 on the first row in FIG. 5, when 1 to 3 identical pixels continue, one encoded (run-length compressed) data unit is constituted by 4 bits. In this case, the first 2 bits represent the number of pixels followed, and the next 2 bits represent pixel data (pixel color information or the like).

For example, first compression data unit CU01 of picture data PXD before compressed, which is indicated by the upper portion in FIG. 9, contains 2 2-bit pixel data d0, d1=(0000)b (b indicates binary data). In this case, 2 identical 2-bit pixel data (00)b continue.

In this case, as indicated by the lower portion in FIG. 9, 2-bit display (10)b representing the number of pixels followed "2" is coupled to contents (00)b of the pixel data to form d0, d1=(1000)b, which is data unit CU01* of picture data PXD after compressed.

In other words, (0000)b of data unit CU01 is converted into (10000)b of data unit CU01* according to rule 1. In this case, bit length compression is not practically realized. However, for example, 3 continuous identical pixels (00)b, i.e., CU01=(000000)b, are compressed into CU01*=(1100)b. That is, the pixel data can be compressed by 2 bits.

According to rule 2 on the second row in FIG. 5, when 4 to 15 identical pixels continue, one encoded data unit is constituted by 8 bits. In this case, the first 2 bits represent a coding header indicating that encoding is performed according to rule 2, the subsequent 4 bits represent the number of pixels followed, and the next 2 bits represent pixel data.

For example, second compression data unit CU02 of picture data PXD before compressed, which is indicated by the upper portion in FIG. 9, contains 5 2-bit pixel data d2, d3, d4, d5, d6=(0101010101)b. In this case, 5 identical 2-bit pixel data (01)b continue.

In this case, as indicated by the lower portion in FIG. 9, coding header (00)b, 4-bit display (0101)b representing the number of pixels followed "5", and contents (01)b of the pixel data are coupled to each other to form d2, d6=(00010101)b, which is data unit CU02* of picture data PXD after compressed.

In other words, (0101010101)b (10-bit length) of data unit CU02 is converted into (00010101)b (8-bit length) of data unit CU02* according to rule 2. In this case, the 10-bit data is compressed into the 8-bit data, i.e., the substantial bit length compression amount corresponds to only 2 bits. If, however, the number of pixels followed is 15 (which corresponds to a 30-bit length because 15 "01"s of CU02 continue), the data is compressed into 8-bit data (CU02*=00111101). That is, 30-bit data can be compressed by 22 bits. The bit compressing effect based on rule 2 is therefore larger than that based on rule 1. In order to cope with run-length compression of a fine image with high resolution, rule 1 is also required.

According to rule 3 on the third row in FIG. 5, when 16 to 63 identical pixels continue, one encoded data unit is constituted by 12 bits. In this case, the first 4 bits represent a coding header indicating that encoding is performed according to rule 3, the subsequent 6 bits represent the number of pixels followed, and the next 2 bits represent pixel data.

For example, third compression data unit CU03 of picture data PXD before compressed, which is indicated by the upper portion in FIG. 9, contains 16 2-bit pixel data d7 to d22=(101010 . . . 1010)b. In this case, 16 identical 2-bit pixel data (10)b continue.

In this case, as indicated by the lower portion in FIG. 9, coding header (0000)b, 6-bit display (010000)b representing the number of pixels followed "16", and contents (10)b of the pixel data are coupled to each other to form d7 to d22=(000001000010)b, which is data unit CU03* of picture data PXD after compressed.

In other words, (101010 . . . 1010)b (32-bit length) of data unit CU03 is converted into (000001000010)b (12-bit length) of data unit CU03* according to rule 3. In this case, the 32-bit data is compressed into the 12-bit data, i.e., the substantial bit length compression amount corresponds to 20 bits. If, however, the number of pixels followed is 63 (which corresponds to a 126-bit length because 63 "10"s of CU03 continue), the data is compressed into 12-bit data (CU03*=000011111110). That is, 126-bit data can be compressed by 114 bits. The bit compressing effect based on rule 3 is therefore larger than that based on rule 2.

According to rule 4 on the fourth row in FIG. 5, when 64 to 255 identical pixels continue, one encoded data unit is constituted by 16 bits. In this case, the first 6 bits represent a coding header indicating that encoding is performed according to rule 4, the subsequent 8 bits represent the number of pixels followed, and the next 2 bits represent pixel data.

For example, fourth compression data unit CU04 of picture data PXD before compressed, which is indicated by the upper portion in FIG. 9, contains 69 2-bit pixel data d23 to d91=(111111 ... 1111)b. In this case, 69 identical 2-bit pixel data (11)b continue.

In this case, as indicated by the lower portion in FIG. 9, coding header (000000)b, 8-bit display (00100101)b representing the number of pixels followed "69", and contents (11)b of the pixel data are coupled to each other to form d23 to d91=(0000000010010111)b, which is data unit CU04* of picture data PXD after compressed.

In other words, (111111 ... 1111)b (138-bit length) of data unit CU04 is converted into (0000000010010111)b (16-bit length) of data unit CU04* according to rule 4. In this case, the 138-bit data is compressed into the 16-bit data, i.e., the substantial bit length compression amount corresponds to 122 bits. If, however, the number of pixels followed is 255 (which corresponds to a 510-bit length because 255 "11"s of CU04 continue), the data is compressed into 16-bit data (CU04*=0000001111111111). That is, 510-bit data can be compressed by 494 bits. The bit compressing effect based on rule 4 is therefore larger than that based on rule 3.

According to rule 5 on the fifth row in FIG. 5, when identical pixels continue from a switching point of a data unit of encoding to the end of a line, one encoded data unit is constituted by 16 bits. In this case, the first 14 bits represent a coding header indicating that encoding is performed according to rule 5, and the next 2 bits represent pixel data.

For example, fourth compression data unit CU05 of picture data PXD before compressed, which is indicated by the upper portion in FIG. 9, contains one or more 2-bit pixel data d92 to dn=(000000 ... 0000)b. In this case, a finite number of identical 2-bit pixel data (00)b continue. According to rule 5, however, the number of pixels followed may be 1 or more.

In this case, as indicated by the lower portion in FIG. 9, coding header (00000000000000)b is coupled contents (00)b of the pixel data to form d92 to dn=(0000000000000000)b, which is data unit CU05* of picture data PXD after compressed.

In other words, (000000 0000)b (unspecified bit length) of data unit CU05 is converted into (0000000000000000)b (16-bit length) of data unit CU05* according to rule 5. According to rule 5, if the number of pixels followed up to the end of a line is 16 or more, a compressing effect can be obtained.

According to rule 6 on the sixth row in FIG. 5, if the length of 1-line compressed data PXD is not an integer multiple of 8 bits (i.e., not byte-aligned) at the end of a pixel line on which data to be encoded are arranged, 4-bit dummy data is added to the 1-line compressed data to make 1-line compressed data PXD coincide with a byte unit (i.e., for byte-aligning).

For example, the total bit length of data units CU01* to CU05* of picture data PXD after compressed, which is indicated by the lower portion in FIG. 9, is always an integer multiple of 4 bits. However, this length is not always an integer multiple of 8 bits.

If, for example, the total bit length of data units CU01* to CU05* is 1020, and 4 bits are required for byte-aligning, 4-bit dummy data CU06*=(0000)b is added to the end of the 1020-bit data to output data units CU01* to CU06* as byte-aligned 1024-bit data.

Note that 2-bit pixel data is not limited to data representing four types of pixel colors. For example, pixel data (00)b may represent a background pixel of a sub-picture; pixel data (01)b, a pattern pixel of the sub-picture; pixel data (10)b, the first emphasizing pixel of the sub-picture, and pixel data (11)b, the second emphasizing pixel of the sub-picture.

As the number of bits constituting pixel data becomes larger, more types of sub-picture pixels can be designated. If, for example, pixel data is constituted by 3-bit data (000)b to (111)b, a maximum of eight types of pixel colors+pixel types (emphasizing effects) can be designated in sub-picture data to be run-length encoded/decoded.

FIG. 6 is a view for explaining run-length compression rules 11 to 15 which are used in an encoding method according to another embodiment of the present invention wherein pixel data constituting sub-picture pixel data (run-length data) 32 in FIG. 4 consists of one bit.

According to rule 11 on the first row in FIG. 6, when 1 to 7 identical pixels continue, one encoded (run-length compressed) data unit is constituted by 4 bits. In this case, the first 3 bits represent the number of pixels followed, and the next 1 bit represents pixel data (information such as a pixel type). If, for example, 1-bit pixel data "0", it indicates a background pixel of a sub-picture. If this data is "1", it indicates a pattern pixel of the sub-picture.

According to rule 12 on the second row in FIG. 6, when 8 to 15 identical pixels continue, one encoded data unit is constituted by 8 bits. In this case, the first 3 bits represent a coding header (e.g., 0000) indicating that encoding is based on rule 12, the subsequent 4 bits represent the number of pixels followed, and the next 1 bit represents pixel-data.

According to rule 13 on the third row in FIG. 6, when 16 to 127 identical pixels continue, one encoded data unit is constituted by 12 bits. In this case, the first 4 bits represent a coding header (e.g., 0000) indicating that encoding is based on rule 13, the subsequent 7 bits represent the number of pixels followed, and the next 1 bit represents pixel data.

According to rule 14 on the fourth row in FIG. 6, when identical pixels continue from a switching point of a data unit of encoding to the end of a line, one encoded data unit is constituted by 8 bits. In this case, the first 7 bits represent a coding header (e.g., 0000000) indicating that encoding is performed according to rule 14, and the next 1 bit represents pixel data.

According to rule 15 on the sixth row in FIG. 6, if the length of 1-line compressed data PXD is not an integer multiple of 8 bits (i.e., not byte-aligned) at the end of a pixel line on which data to be encoded are arranged, 4-bit dummy data is added to the 1-line compressed data to make 1-line compressed data PXD coincide with a byte unit (i.e., for byte-aligning).

An image encoding method (an encoding method using run-length coding) will be described in detail next with reference to FIG. 7.

FIG. 7 shows a case wherein pixel data constituting sub-picture pixel data (run-length data) 32 in FIG. 4 is constituted by the first to ninth lines, 2-bit pixels (having a maximum of four types of contents) are arranged on each line, and character patterns "A" and "B" are expressed by the 2-bit pixels on the respective lines. The manner of encoding (run-length compressing) the pixel data on each line will be described in detail below.

As indicated by the upper portion in FIG. 7, an image as a source is constituted by three types (a maximum of four types) of pixel data. That is, 2-bit image data (00)b represents the pixel color of the background of the sub-picture; 2-bit image data (01)b, the pixel color of characters "A" and "B" in the sub-picture; and 2-bit image data (10)b, an emphasizing pixel color with respect to sub-picture characters "A" and "B".

When the original image containing characters "A" and "B" is scanned by a scanner or the like, these character patterns are read, from the left to right of each scanning line, in units of pixels. The picture data read in this manner is input to an encoder (denoted by reference numeral 200 in the embodiment in FIG. 10 which will be described later) for performing run-length compression based on the present invention.

This encoder can be constituted by a microcomputer (MPU or CPU) in which software for executing run-length compression based on rules 1 to 6 described with reference to FIG. 5 runs. This encoder software will be described later with reference to the flow charts in FIGS. 13 and 14.

Encoding processing of run-length compressing a sequential bit string of character pattern "A" and "B" read in units of pixels will be described below.

In the case shown in FIG. 7, a source image is assumed to have three color pixels. More specifically, in picture data (the sequential bit string of character patterns "A" and "B") to be encoded, background color pixel "•" is represented by 2-bit pixel data (00)b, character color pixel "#" is represented by 2-bit pixel data (01)b, and emphasizing pixel color "o" is represented by 2-bit pixel data (10)b. The bit count (=2) of pixel data (e.g., 00 or 01) is also called a pixel width.

For the sake of simplicity, in the case shown in FIG. 7, the display width of picture data (sub-picture data) to be encoded is set to be 16 pixels, and the number of scanning lines (display height) is set to be 9 lines.

Image data (sub-picture data) obtained from a scanner is temporarily converted into a run-length value by the microcomputer.

Consider the first line at the lower portion in FIG. 7. Three continuous pixels " • • • " are converted into (•*3); subsequent 1 pixel "0", (0*1); subsequent 1 pixel "#", (#*1); subsequent 1 pixel "o", (o*1); subsequent continuous 3 pixels " • • • ", (•*3); subsequent 1 pixel "o", (o*1); subsequent continuous 4 pixels "####", (#*4); subsequent 1 pixel "o", (o*1); and last 1 pixel "•", (•*1).

As a result, as indicated by the intermediate portion in FIG. 7, the run-length data (before compressed) on the first line becomes "•*3/o*1/#*1/o*1/•*3/o*1/#*4/o*1/•*1". This data is constituted by a combination of image information such as a character color pixel, and the number of pixels followed which represents a continuation count.

Similarly, the pixel data strings on the second to ninth lines indicated by the upper portion in FIG. 7 become the run-length data strings on the second to ninth lines indicated by the intermediate portion in FIG. 7.

Consider the data on the first line. Since 3 background color pixels " • • • " continue from the start of the line, compression rule 1 in FIG. 5 is used. As a result, first three pixels " • • • ", i.e., (•*3), on the first line are encoded into (1100), which is a combination of 2 bits (11) representing "3" and (00) representing background color pixel "•".

Since the next data on the first line is 1 pixel "o", rule 1 is used. As a result, next pixel "o", i.e., (o*1), on the first line is encoded into (0110), which is a combination of 2 bits (01) representing "1" and (10) representing emphasizing color pixel "o".

Since the next data is 1 pixel "#", rule 1 is used. As a result, next pixel "#", i.e., (#*I), on the first line is encoded into (0101), which is a combination of 2 bits (01) representing "1" and (01) representing character color pixel "#" (the portions corresponding to pixels "### . . . " are enclosed with the broken lines in the intermediate and lower portions in FIG. 7).

Similarly, (o*1) is encoded into (0110); (•*3), (1100); and (o*1), (0110).

Since the subsequent data on the first line are 4 pixels "####", compression rule 2 in FIG. 5 is used. As a result, pixels "####", i.e., (#*4), on the first line are encoded into (00010001), which is a combination of 2-bit header (00) representing that rule 2 is used, 4 bits (0100) representing the number of pixels followed "4", and (01) representing character color pixel "#" (the portions corresponding to "#" are enclosed with the broken lines in FIG. 7).

Since the subsequent data on the first line is 1 pixel "o", rule 1 is used. As a result, pixel "o", i.e., (o*1), is encoded into (0110), which is a combination of 2 bits (01) representing "1" and (10) representing emphasizing color pixel "o".

Since the last data on the first line is 1 "•", rule 1 is used. As a result, pixel "•", i.e., (•*1), is encoded into (0100), which is a combination of 2 bits (01) representing "1" and (00) representing background color pixel "•".

In the above manner, run-length data "•*3/o*1/#*1/o*1/•*3/o*1/#*4/o*1/•*1" (before compressed) on the first line is run-length compressed into (1100) (0110) (0101) (0110) (1100) (0110) (00010001) (0110) (0100), thereby completing the encoding of the first line.

In the same manner as described above, encoding proceeds up to the eighth line. All the data on the ninth line are identical background color pixels " • • • . . . ". In this case, compression rule 5 in FIG. 5 is used. As a result, run-length data "•*16" (before compressed) on the ninth line is encoded into 16-bit data (0000000000000000), which is a combination of 14-bit header (00000000000000) representing that identical background color pixels " • • • . . . " continue to the end of the line and 2-bit pixel data (00) representing background color pixel "•".

Note that encoding based on rule 5 is used when data to be compressed starts midway along a line and continues to the end of the line.

Figure 10:
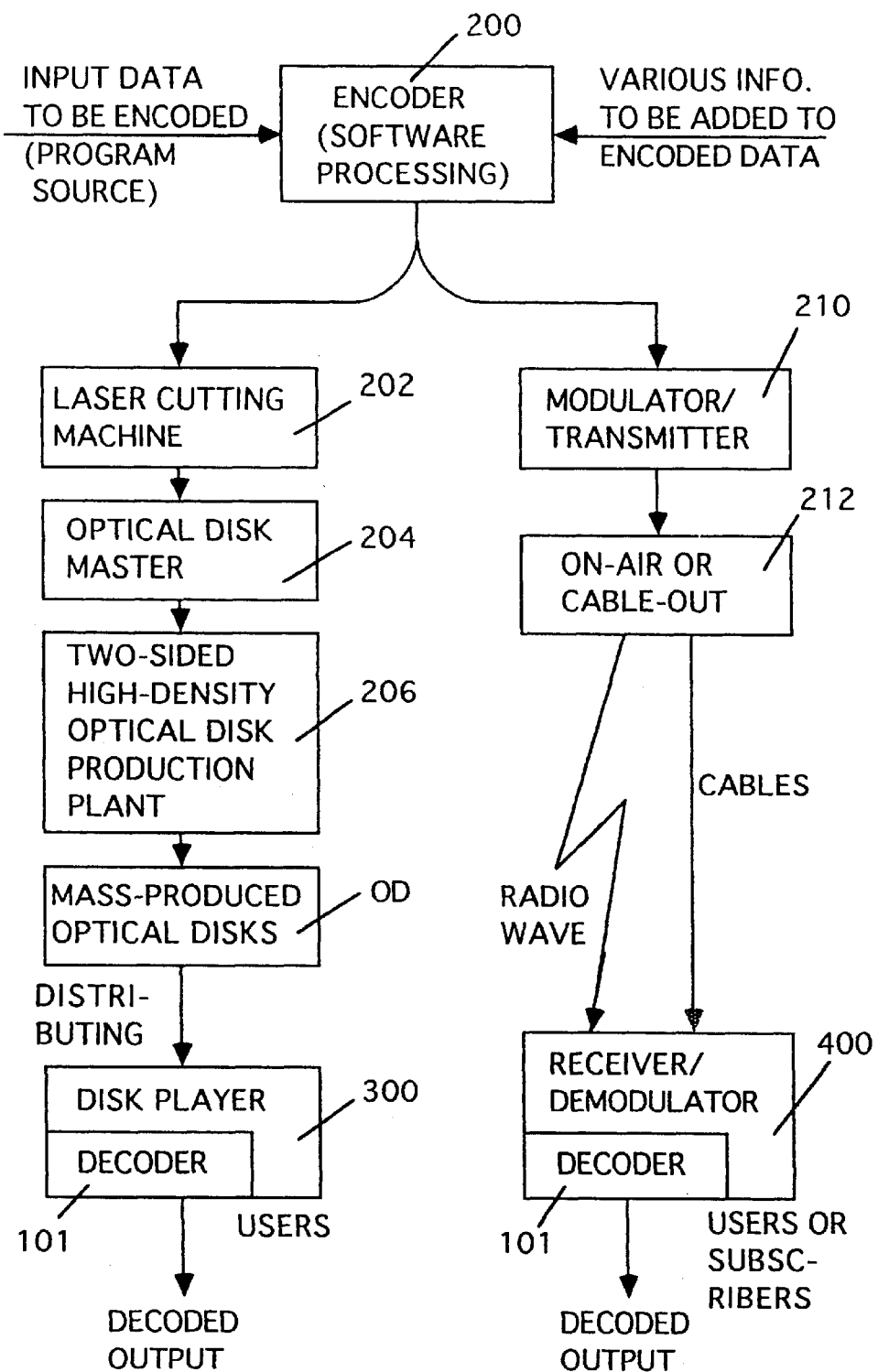
FIG. 10 is a block diagram for explaining the flow of processing from the step of mass-producing a high-density optical disk having image information encoded on the basis of the present invention to the step of playing back the information on the user side, and the flow of processing from the step of broadcasting/cable-distributing of image information encoded on the basis of the present invention to the step of receiving/playing back the information on the user/sub-picture side.

FIG. 10 is a block diagram for explaining the flow of processing from the step of mass-producing high-density optical disks having image information (cf. 31+32+33 in FIG. 3) encoded on the basis of the present invention to the step of playing back the information on the user side, together with the flow of processing from the step of broadcasting/cable-distributing image information encoded on the basis of the present invention to the step of receiving/playing back the information on the user/subscriber side.

Assume that run-length data before compressed like the one shown at the intermediate portion in FIG. 7 is input to encoder 200 in FIG. 10. Encoder 200 performs run-length compression (encoding) of the input data by software processing based on compression rules 1 to 6 in FIG. 5.

When data of a logic structure like the one shown in FIG. 2 is to be recorded on optical disk OD in FIG. 1, encoder 200 in FIG. 10 performs run-length compression processing (encoding processing) with respect to sub-picture data in FIG. 3.

Various data required to complete optical disk OD are also input to encoder 200 in FIG. 10. These data are compressed on the basis of, e.g., the standards of MPEG (Motion Picture Expert Group), and the compressed digital data are sent to laser cutting machine 202 or modulator/transmitter 210.

In laser cutting machine 202, the MPEG-compressed data from encoder 200 is recorded on a mother disk (not shown) to manufacture optical disk master 204.

In two-sided high-density optical disk production plant 206, the information of master 204 is transferred onto, e.g., a laser beam reflecting film on a 0.6-mm thick polycarbonate base. Two large-capacity polycarbonate base on which different pieces of master information are respectively transferred are joined to each other to form a 1.2 mm thick two-sided optical disk (or a two-sided disk having one information read surface).

Double-sided high-density optical disks OD mass-produced by plant 206 are distributed to various types of markets and to users.

Distributed disk OD is played back by disk player 300 of the user. Disk player 300 includes decoder 101 for decoding data encoded by encoder 200 into original information. The information decoded by decoder 101 is sent to, e.g., a monitor TV of the user to be visualized. In this manner, the end user can enjoy the original picture information from large-capacity disk OD.

The compressed information sent from encoder 200 to modulator/transmitter 210 is modulated in accordance with predetermined standards and transmitted. For example, the compressed picture information from encoder 200 is broadcasted through a satellite (212), through corresponding audio information. Alternatively, the compressed picture information from encoder 200 is transmitted through a cable (212), together with corresponding audio information.

The compressed picture/audio information broadcasted or transmitted through the cable is received by receiver/demodulator 400 of a user or subscriber. Receiver/demodulator 400 includes decoder 101 for decoding the data encoded by encoder 200 into the original information. The information decoded by decoder 101 is sent to, e.g., the monitor TV of the user to be visualized. In this manner, the end user can enjoy the original picture information from the compressed picture information broadcasted or transmitted through the cable.

Figure 11:
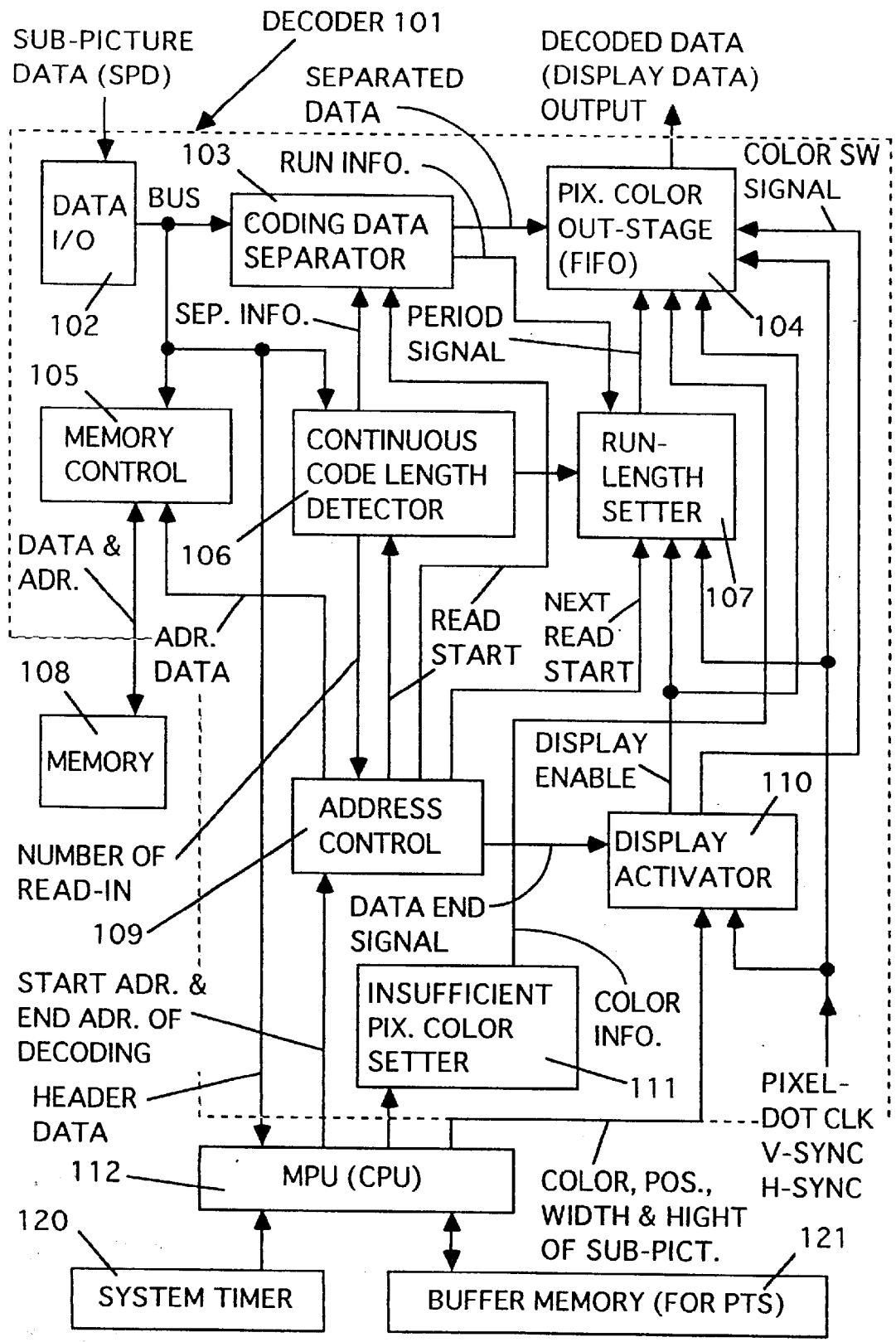
FIG. 11 is a block diagram for explaining an embodiment (non-interlaced specification) of decoder hardware for executing image decoding (run-length expansion) according to the present invention.

FIG. 11 is a block diagram showing an embodiment (non-interlaced specification) of decoder hardware for executing image decoding (run-length expansion) based on the present invention. Decoder 101 (see FIG. 10) for decoding run-length compressed sub-picture data SPD (corresponding to data 32 in FIG. 3) can have an arrangement like the one shown in FIG. 11.

A sub-picture data decoder for run-length expanding a signal containing run-length compressed pixel data having a format like the one shown in FIG. 4 will be described below with reference to FIG. 11.

As shown in FIG. 11, decoder 101 comprises data I/O 102 to which sub-picture data SPD is input; memory 108 retaining sub-picture data SPD; memory control 105 for controlling the read operation of memory 108; continuous code length detector 106 for detecting the continuous code length (coding header) of one unit (one block) from the run information of encoded data (run-length compressed pixel data) read out from memory 108, so as to output separation information for the continuous code length; coding data separator 103 for extracting one-block encoded data in accordance with the information from continuous code length detector 106; run-length setter 107 for receiving a signal output from coding data separator 103 and representing the run information of one compression unit, together with a signal (period signal) output from continuous code length detector 106 and indicating the number of continuous bits "0"s, i.e., the number of data bits "0"s continuing from the start of the coding data of one block, and calculating the number of pixels followed in one block from these signals; pix. color out-stage 104 (Fast-in/Fast-out type) for receiving pixel color information from coding data separator 103 and the period signal output from run-length setter 107 and outputting the color information only for the corresponding interval; microcomputer 112 for loading the header data (see FIG. 4) in sub-picture data SPD read out from memory 108, and performing various types of processing settings and control operations on the basis of the loaded data; address control 109 for controlling the read/write addresses of memory 108; insufficient pix. color setter 111 in which color information corresponding to a line on which no run information is present is set by microcomputer 112; and display activator 110 for determining a display area, of a TV screen or the like, in which a sub-picture is to be displayed.

Incidentally, system timer 120 and buffer memory 121 are coupled to MPU 112 of decoder 101, which will be referred to in the explanations of FIGS. 53 to 57.

In other words, as described in FIG. 11, run-length compressed sub-picture data SPD is sent to the internal bus of decoder 101 through data I/O 102. Sub-picture data SPD sent to the bus is supplied to memory 108 through memory control 105 to be stored therein. The internal bus of decoder 101 is connected to coding data separator 103, continuous code length detector 106, and microcomputer (MPU or CPU) 112.

Sub-picture unit header 31 of the sub-picture data obtained from memory 108 is read by microcomputer 112.

Microcomputer 112 detects the various parameters shown in FIG. 4 from read sub-picture unit header 31. In accordance with the detected parameters, the start address of decoding (SPDDADR) is set at address controller 109; display activator 110 receives information (SPDSZ) indicating the display start position, display width, and display height of the sub-picture; and coding data separator 103 receives display width (or the number of dots of the line) of the sub-picture. The parameters detected by microcomputer 112 are then stored in the internal registers of respective circuit blocks (109, 110, and 103). Thereafter, microcomputer 112 can access the parameters stored in the circuit blocks (109, 110, and 103).

Address controller 109 accesses memory 108 through memory controller 105 in response to the starting address (SPDDADR) of decoding set at the register of controller 109, so that the reading of the sub-picture data to be decoded starts. The sub-picture data read from memory 108 is supplied to coding data separator 103 and to continuous code length detector 106.

The coding header (2 to 14 bits according to rules 2 to 5 in FIG. 5) of run-length compressed sub-picture data SPD is detected by continuous code length detector 106. The number of continuous pixels of identical pixel data in sub-picture data SPD is detected by run-length setter 107 based on a signal from continuous code length detector 106.

More specifically, continuous code length detector 106 counts the number of bits of "0" in the data read from memory 108 in order to detect the coding header (cf. FIG. 5). In accordance with the value or content of the detected coding header, detector 106 supplies separation information SEP.INFO. to coding data separator 103.

In response to separation information SEP.INFO., coding data separator 103 sets the continuous pixel numbers (run information) at run length setter 107. At the same time, separator 103 sets the pixel data (separated data indicating the pixel color) at pixel color output stage 104 of a FIFO (first-in/first-out) type. in this case, coding data separator 103 counts the pixel number of the sub-picture data, and compares the counted pixel number with the display width (or the number of pixels on one line) of the sub-picture.

Here, if no byte-aligning is established when the decoding of one line is completed (or if the bit length of one line data is not the integral of the unit of number "8"), coding data separator 103 discards or neglects the trailing 4-bit data on the line, regarding as the dummy data added at the time of encoding.

Run-length setter 107 supplies pixel color output stage 104 with a PERIOD SIGNAL for outputting the pixel data, based on the continuous pixel number (run information), pixel dot clock DOTCLK, and horizontal/ vertical sync signals H-SYNC/V-SYNC. Pixel color output stage 104 outputs the pixel data from coding data separator 103, as the decoded display data, during the active period of the pixel data output signal (PERIOD SIGNAL), or during the period of outputting the same pixel color.

Within the above-mentioned active period of the PERIOD SIGNAL, if the start line of decoding is changed by the instruction from microcomputer 112, a certain line(s) having no run information could exists. When the no-run-information line(s) is(are) found during the decoding, insufficient pixel color setter 111 sends data (COLOR INFO.) of preset insufficient pixel color to pixel color output stage 104. Then, pixel color output stage 104 outputs the data (COLOR INFO.) of the insufficient pixel color from insufficient pixel color setter 111, so long as the no-run-information line(s) is(are) input to coding data separator 103.

More specifically, in the case of decoder 101 in FIG. 11, if input sub-picture data SPD includes no image data, microcomputer 112 sets pixel color information as shortage data in insufficient pix. color setter 111.

A display enable signal for determining a specific position on a monitor screen (not shown) at which a decoded sub-picture is to be displayed is supplied from display activator 110 to pix. color out-stage 104 in synchronism with a horizontal/vertical sync signal for a sub-picture image. Display activator 110 sends a color switching signal to pix. color out-stage 104 in accordance with a color information instruction from microcomputer 112.

After the processing settings of microcomputer 112, address control 109 sends address data and various timing signals to memory control 105, continuous code length detector 106, coding data separator 103, and run-length setter 107.

When a pack of sub-picture data SPD is received through data I/O 102 and stored in memory 108, microcomputer 112 reads the contents of the pack header of data SPD (e.g., a start address of decoding, an end address of decoding, a display start position, a display width, and a display height). Microcomputer 112 sets a start address of decoding, an end address of decoding, a display start position, a display width, a display height, and the like in display activator 110 on the basis of the read contents. At this time, a specific bit configuration of compressed pixel data (2-bit pixel data in this case) can be determined by the contents of sub-picture unit header 31 in FIG. 4.

The operation of decoder 101 in a case wherein compressed pixel data has a 2-bit configuration (rules 1 to 6 in FIG. 5 are used) will be described.

When the start address decoding is set by microcomputer 112, address control 109 sends corresponding address data to memory control 105, and a read start signal to continuous code length detector 106.

In response to the sent read start signal, continuous code length detector 106 sends a read signal to memory control 105 to load encoded data (compressed sub-picture data 32). Continuous code length detector 106 then checks whether all the upper 2 bits of the read data are "0"s.

If all the bits are not "0"s, it is determined that the block length of the unit of compression is 4 bits (see rule 1 in FIG. 5).

If the bits (upper 2 bits) are "0"s, the subsequent 2 bits (upper 4 bits) are checked. If they are not "0"s, it is determined that the block length of the unit of compression is 8 bits (see rule 2 in FIG. 5).

If the bits (upper 4 bits) are "0"s, the subsequent 2 bits (upper 6 bits) are checked. If they are not "0"s, it is determined that the block length of the unit of compression is 12 bits (see rule 3 in FIG. 5).

If the bits (upper 6 bits) are "0"s, the subsequent 8 bits (upper 14 bits) are further checked. If they are not "0"s, it is determined that the block length of the unit of compression is 16 bits (see rule 4 in FIG. 5).

If the bits (upper 14 bits) are "0"s, it is determined that the block length of the unit of compression is 16 bits, and identical pixel data continue up to the end of the line (see rule 5 in FIG. 5).

If the number of bits of the pixel data read up to the end of the line is an integer multiple of 8, the pixel data is used as it is. If the number of bits is not an integer multiple of 8, it is determined that 4-bit dummy data is required at the end of the read data to realize byte-aligning (see rule 6 in FIG. 5).

Coding data separator 103 extracts 1-block data (the unit of compression) of sub-picture data 32 from memory 108 on the basis of the above determination result obtained by continuous code length detector 106. Coding data separator 103 separates the extracted 1-block data into the number of pixels followed and pixel data (e.g., pixel color information). The separated data of the number of pixels followed (RUN INFO.) is sent to run-length setter 107, and the separated pixel data (SEPARATED DATA) is sent to pix. color out-stage 104.

Display activator 110 generates a display enable signal (enable signal) for designating a sub-picture display interval in synchronism with a pixel dot clock (PIXEL-DOT CLK), a horizontal sync signal (H-SYNC), and a vertical sync signal (V-SYNC) in accordance with the display start position information, the display width information, and the display height information received from microcomputer 112. This display enable signal is output to run-length setter 107.

Run-length setter 107 receives a signal output from continuous code length detector 106 and indicating whether the current block data continues to the line end, and continuous pixel data (RUN INFO.) from coding data separator 103. On the basis of the signal from continuous code length detector 106 and the data from coding data separator 103, run-length setter 107 determines the number of pixel dots of a block which is being decoded, and outputs a display enable signal (output enable signal) to pix. color out-stage 104 during an interval corresponding to the number of dots.

Pix. color out-stage 104 is enabled during an interval in which an period signal is received from run-length setter 107. In this interval, pix. color out-stage 104 sends the pixel color information received from coding data separator 103, as decoded display data, to a display unit (not shown) in synchronism with the pixel dot clock (PIXEL-DOT CLK). That is, pix. color out-stage 104 outputs the same display data corresponding to the pixel pattern continuous dots of the block which is being decoded.

Upon determining that the encoded data are identical pixel color data continuing to the line end, continuous code length detector 106 outputs a signal for a continuous code length of 16 bits to coding data separator 103, and also output, to run-length setter 107, a signal indicating that identical-pixel data continue up to the line end.

Upon reception of the above signal from continuous code length detector 106, run-length setter 107 outputs an output enable signal (period signal) to pix. color out-stage 104 to keep the color information of the encoded data in an enable state until horizontal sync signal H-SYNC is inactivated.

When microcomputer 112 changes the start line of decoding to scroll the displayed contents of a sub-picture, no data line used for decoding may be present in a preset display area (i.e., a decoding line shortage may occur).

In decoder 101 in FIG. 11, in order to cope with such a case, pixel color data for compensating for a line shortage is prepared in advance. When a line shortage is actually detected, the current display mode is switched to an insufficient pixel color data display mode. More specifically, when a data end signal is supplied from address control 109 to display activator 110, display activator 110 sends a color switching signal (COLOR SW SIGNAL) to pix. color out-stage 104. In response to this switching signal, pix. color out-stage 104 switches the mode of outputting decoded pixel color data from the encoded data to the mode of outputting decoded color information (COLOR INFO.) from display activator 110. This switched state is kept during an insufficient line display interval (DISPLAY ENABLE=active).

When the above line shortage occurs, a decoding operation may be stopped instead of using insufficient pixel color data.

More specifically, when, for example, a data end signal is input from address control 109 to display activator 110, a color switching signal for designating a display stop may be output from display activator 110 to pix. color out-stage 104. Pix. color out-stage 104 keeps stopping the display of a sub-picture during an interval in which this display stop designation color switching signal is active.

FIG. 8 shows two display modes (non-interlaced display and interlaced display) to explain how character pattern "A" of the pixel data (sub-picture data) encoded in FIG. 7 is decoded.

Decoder 101 in FIG. 11 can be used to decode compressed data like the one shown at the upper portion in FIG. 8 into interlaced display data like the one shown at the lower left portion in FIG. 8.

In contrast to this, when compressed data like the one shown at the upper portion in FIG. 8 is to be decoded into interlaced display data shown at the lower right portion in FIG. 8, a line doubler for scanning the same pixel line twice (e.g., re-scanning line #10, in an even field, which has the same contents as those of line #1 in an odd field; switching in units of V-SYNC pulses) is required.

When an image display amount equivalent to that in the interlaced display mode is to be displayed in the non-interlaced display mode, another line doubler (e.g., line #10 having the same contents as those of line #1 at the lower end portion in FIG. 8 is made to follow line #1; switching in units of H-SYNC pulses).

Figure 12:
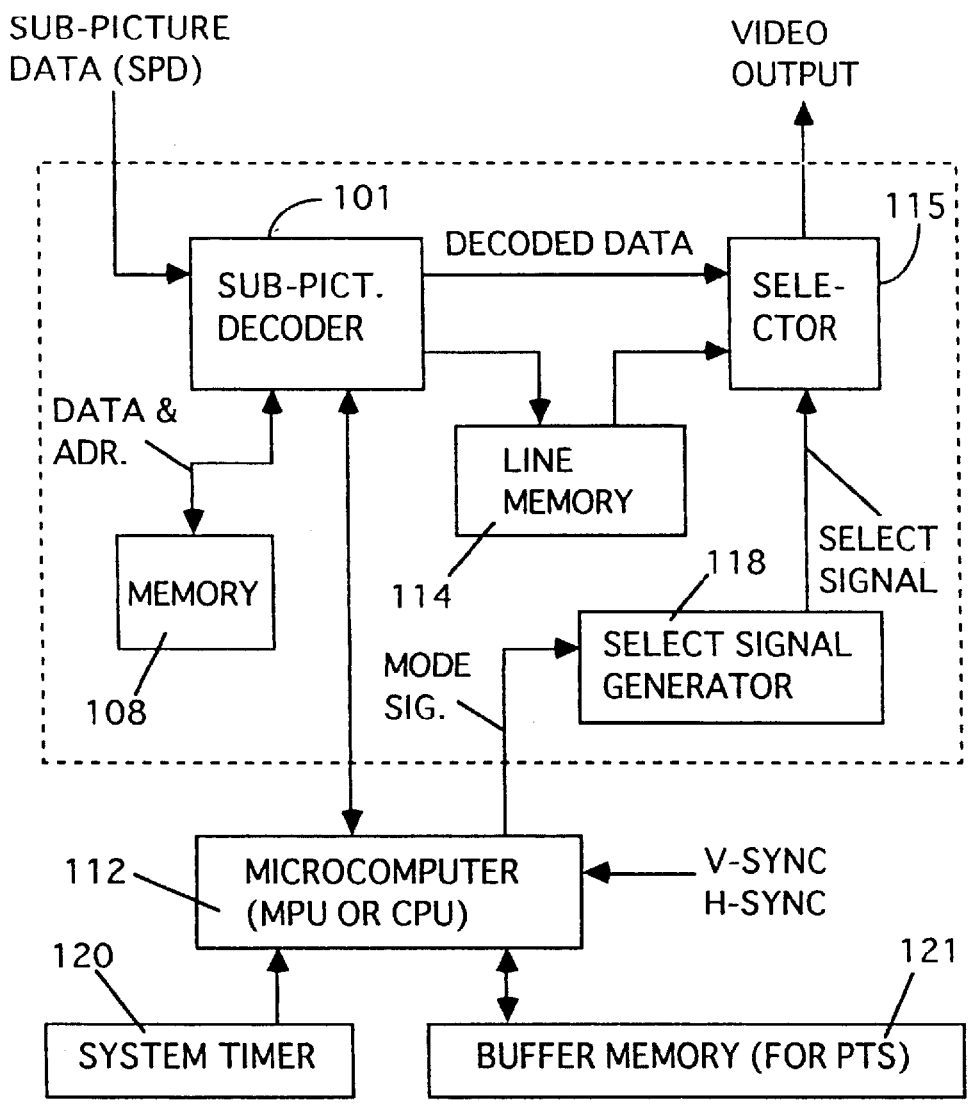
FIG. 12 is a block diagram for explaining another embodiment (interlaced specification) of decoder hardware for executing image decoding (run-length expansion) according to the present invention.

FIG. 12 is a block diagram for explaining an embodiment (interlaced specifications) of decoder hardware having the above line doubler function. Decoder 101 in FIG. 10 may be constituted by a decoder having the arrangement shown in FIG. 12.

In the arrangement in FIG. 12, microcomputer 112 detects the generation timings of odd and even fields in the interlaced display mode on the basis of a horizontal/vertical sync signal for a sub-picture.

Upon detection of an odd field, microcomputer 112 supplies, to select signal generator 118, a mode signal indicating that the current field is an odd field. As a result, select signal generator 118 outputs a signal to selector 115 to select decoded data from decoder 101. Decoder 101 then outputs the pixel data (see the lower right portion in FIG. 8) of lines #1 to #9 in the odd field, as an video output, to an external unit through selector 115. In this case, the pixel data of lines #1 to #9 in the odd field are temporarily stored in line memory 114.

Upon detecting that the odd field has shifted to an even field, microcomputer 112 supplies, to select signal generator 118, a mode signal indicating that the current field is an even field. As a result, select signal generator 118 outputs a signal to selector 115 to select the data stored in line memory 114. Line memory 114 then outputs the pixel data (see the lower right portion in FIG. 8) of lines #10 to #18 in the even field, as a video output, to the external unit through selector 115.

In this manner, the sub-picture image (character "A" in FIG. 8) of lines #1 to #9 in the odd field is synthesized with the sub-picture image (character "A" in FIG. 8) of lines 10# to #18 in the even field, thereby realizing interlaced display.

Note that sub-picture unit header 31 of the sub-picture data in FIG. 4 includes a parameter bit (SPMOD) indicating a frame display mode/field display mode for a TV screen.

For example, an image display amount equivalent to that in the interlaced display mode is displayed in the non-interlaced display mode in the following manner.

Upon loading sub-picture unit header 31, microcomputer 112 in FIG. 12 can determine from the set value of parameter SPMOD (active="1"; inactive="0") whether the interlaced mode (active="1") or the non-interlaced mode (inactive "0") is set.

In the arrangement in FIG. 12, if parameter SPMOD is active="1", microcomputer 112 detects that the interlaced mode is set, and sends a mode signal indicating the interlaced mode to select signal generator 118. Select signal generator 118 supplies a switching signal to selector 115 every time horizontal sync signal H-SYNC is generated. Selector 115 alternately switches the decoded output (decoded data) of the current field from decoder 101 and the decoded output of the current field temporarily stored in line memory 114 every time horizontal sync signal H-SYNC is generated, and outputs a video output to an external TV set or the like.

When the current decoded data and the decoded data in line memory 114 are switched for each H-SYNC, a picture having a density (the number of horizontal scanning lines) twice that of the original image (decoded data) is displayed on the TV screen in the interlaced mode.

In decoder 101 having the above arrangement, sequentially input bit data are read by 2 to 16 bits while being counted bit by bit from the beginning of a decoded data unit block, and are decoded, instead of being decoded after read by one line. In this case, the bit length (4 bits, 8 bits, 12 bits, 16 bits, or the like) of one decoded data unit is detected immediately before a decoding operation. For example, compressed pixel data is decoded (played back) into three types of pixels ("•", "o", and "#" in FIG. 7) in real time in the unit of the detected data length.

In decoding pixel data encoded according to rules 1 to 6 in FIG. 5, decoder 101 may have a bit counter and a data buffer (line memory 114 or the like) having a relatively small capacity. In other words, the circuit arrangement of decoder 101 can be relatively simplified, and the overall apparatus including this encoder can be reduced in size.

That is, the encoder of the present invention requires no large code table in the coder unlike in the conventional MH coding method, and need not read the is same data twice in an encoding operation unlike in the arithmetic coding method. In addition, the decoder of the present invention requires no relatively complicated hardware like a multiplier, and can be realized by adding simple circuits such as a counter and a small-capacity buffer.

According to the present invention, run-length compression/encoding and run-length expansion/decoding of many types of pixel data (a maximum of four types of pixel data each having a 2-bit configuration) can be realized with a relatively simple arrangement.

Figure 13:
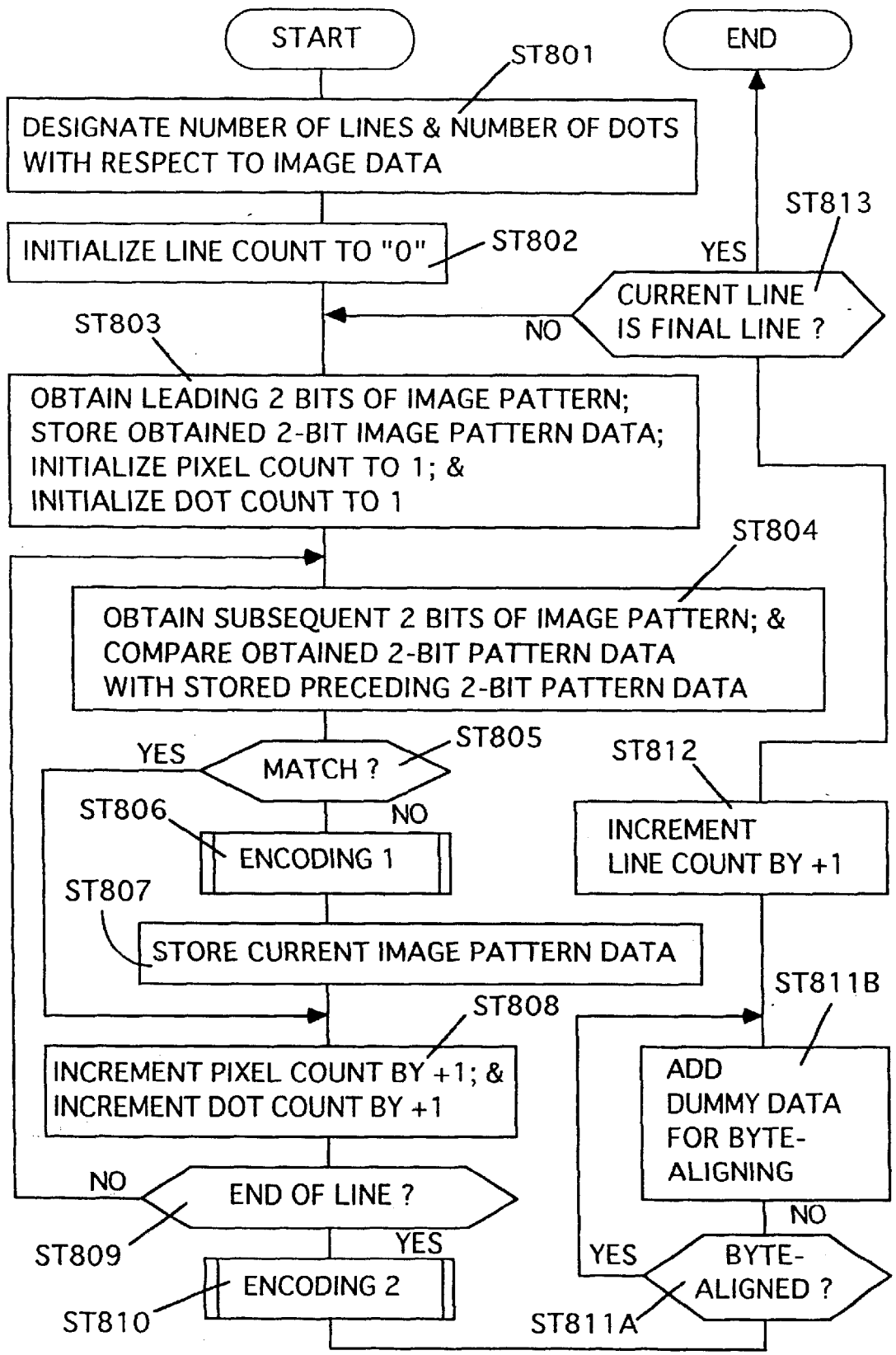
FIG. 13 is a flow chart for explaining software for the execution of image encoding (run-length compression) according to an embodiment of the present invention, which is executed, for example, by an encoder (200) in FIG. 10.

FIG. 13 is a flow chart for executing image encoding (run-length compression) according to an embodiment of the present invention and for explaining software executed by the encoder (200) in FIG. 10.

A series of encoding operations based on rules 1 to 6 in FIG. 5 is executed, as software processing, by the microcomputer in encoder 200 in FIG. 10. The overall encoding processing can be performed by encoder 200 in accordance with the flow chart in FIG. 13. Run-length compression of image data in sub-picture data can be performed in accordance with the flow chart in FIG. 14. (Note that the explanation. for encoding display control sequence table DCSQT 33 of FIG. 3 is omitted here. The encoding of DCSQT 33 will be explained later with reference to FIG. 53.)

In this case, when the number of lines and the number of dots of image data are designated by a key input operation (step ST801), the computer in the encoder 200 prepares a header area for sub-picture data, and initializes the line count to "0" (step ST802).

When an image pattern is sequentially input in units of bits, the computer in the encoder 200 obtains the first 1-pixel data (2 bits in this case), and stores the pixel data. In addition, the computer initializes the pixel count to "1", and the dot count to "1" (step ST803).

Subsequently, the computer in encoder 200 obtains the next pixel data (2 bits) of the pixel pattern, and compares it with the stored preceding image data (step ST804).

If it is determined from the comparison result that the pixel data do not match each other (NO in step ST805), encoding 1 is performed (step ST806), and the current pixel data is stored (step ST807). The pixel count is then incremented by one, and the dot count is also incremented by one accordingly (step ST808).

If it is determined from the comparison result that the pixel data match each other (YES in step ST805), encoding 1 in step ST806 is skipped, and the flow advances to step ST808.

After the pixel count and the dot count are incremented (step ST808), the computer in encoder 200 checks whether a pixel line which is currently encoded is the end of a pixel line (step 809). If the pixel line is the end of the line (YES in step ST809), encoding 2 is performed (step ST810). If the pixel line is not the end of the line (NO in step ST809), the flow returns to step ST840, and the processing in steps ST804 to ST808 is repeated.

Upon completion of encoding 2 in step ST810, the computer in encoder 200 checks whether a bit string after encoding is an integer multiple of 8 bits (byte-aligned) (step ST811A). If the bit string is not byte-aligned (NO in step ST811A), 4-bit dummy data (0000) is added to the end of the bit string after encoding (step ST811B). After this dummy addition processing, or if the bit string after encoding is byte-aligned (YES in step ST811A), the line counter of the computer in the encoder (e.g., the general-purpose register in the microcomputer) is incremented by one(step ST812).

If the current line is not the final line (NO instep ST813) after the line counter is incremented, the flow returns to step ST803, and the processing in steps ST803 to ST812 is repeated.

If the current line is the final line (YES in step ST813) after the line counter is incremented, the encoding processing (run-length compression of the bit string of the 2-bit pixel data) is completed.

Figure 14:
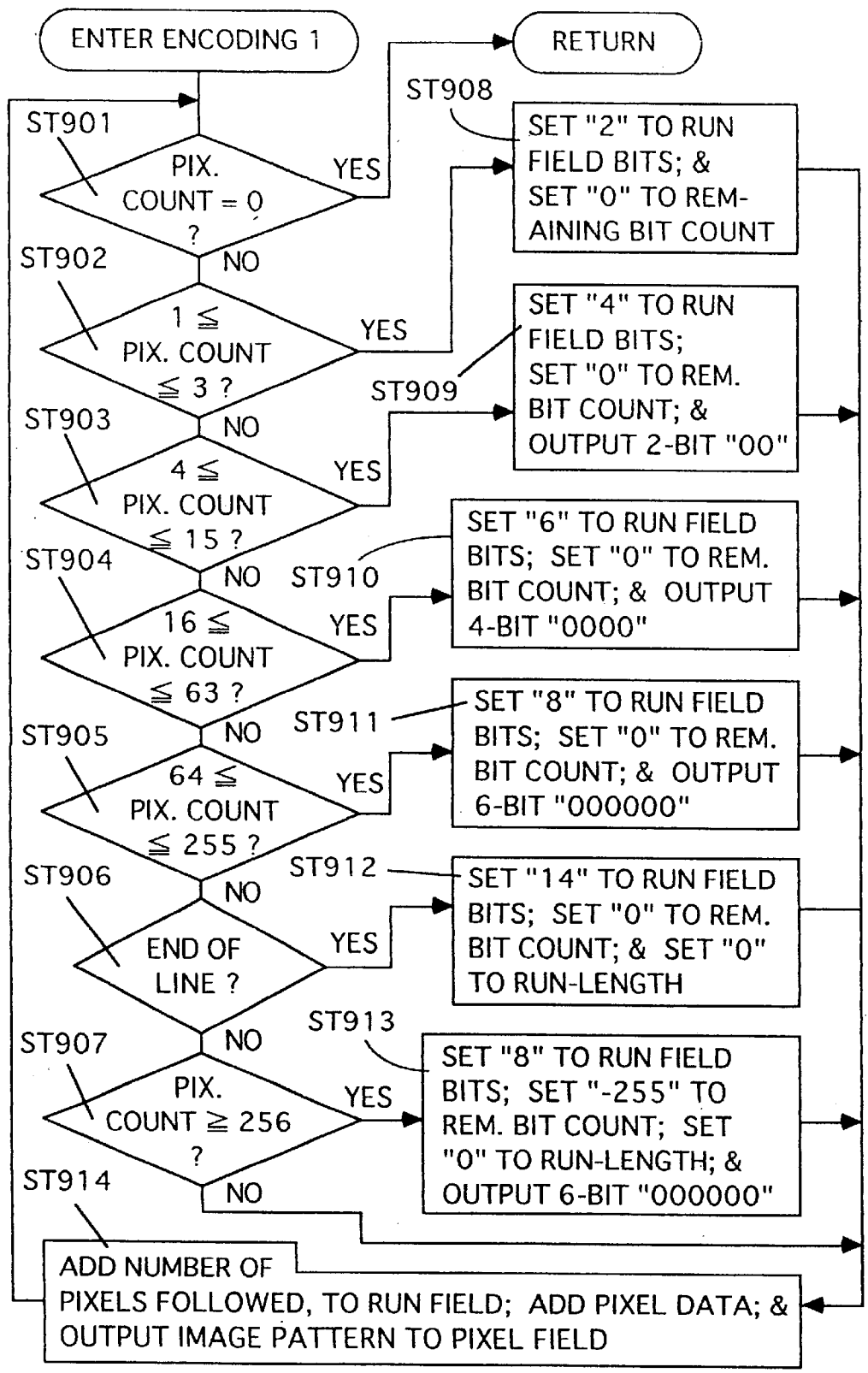
FIG. 14 is a flow chart for explaining the contents of encoding step 1 (ST806) used in the software in FIG. 13.

FIG. 14 is a flow chart for explaining the contents of encoding 1 in FIG. 13.

In encoding 1 (step ST806) in FIG. 13, pixel data to be encoded is assumed to have a 2-bit width, and hence run-length compression rules 1 to 6 in FIG. 5 are used.

In correspondence with rules 1 to 6, computer software is executed to determine whether the pixel count is 0 (step ST901), 1 to 3 (step ST902), 4 to 15 (step ST903), 16 to 63 (step ST904), or 64 to 255 (step ST905), or indicates the end of a line (step ST906), or is 256 or more (step ST907).

The computer in encoder 200 determines the number of run field bits (one unit length of identical pixel data) on the basis of the above determination result (steps ST908 to ST913), and ensure an area corresponding to the determined number of run field bits after sub-picture unit header 31. The number of pixels followed is output to the run field ensured in this manner, and the pixel data is output to the pixel field. These data are recorded in a memory unit (not shown) in encoder 200 (step ST914).

Figure 15:
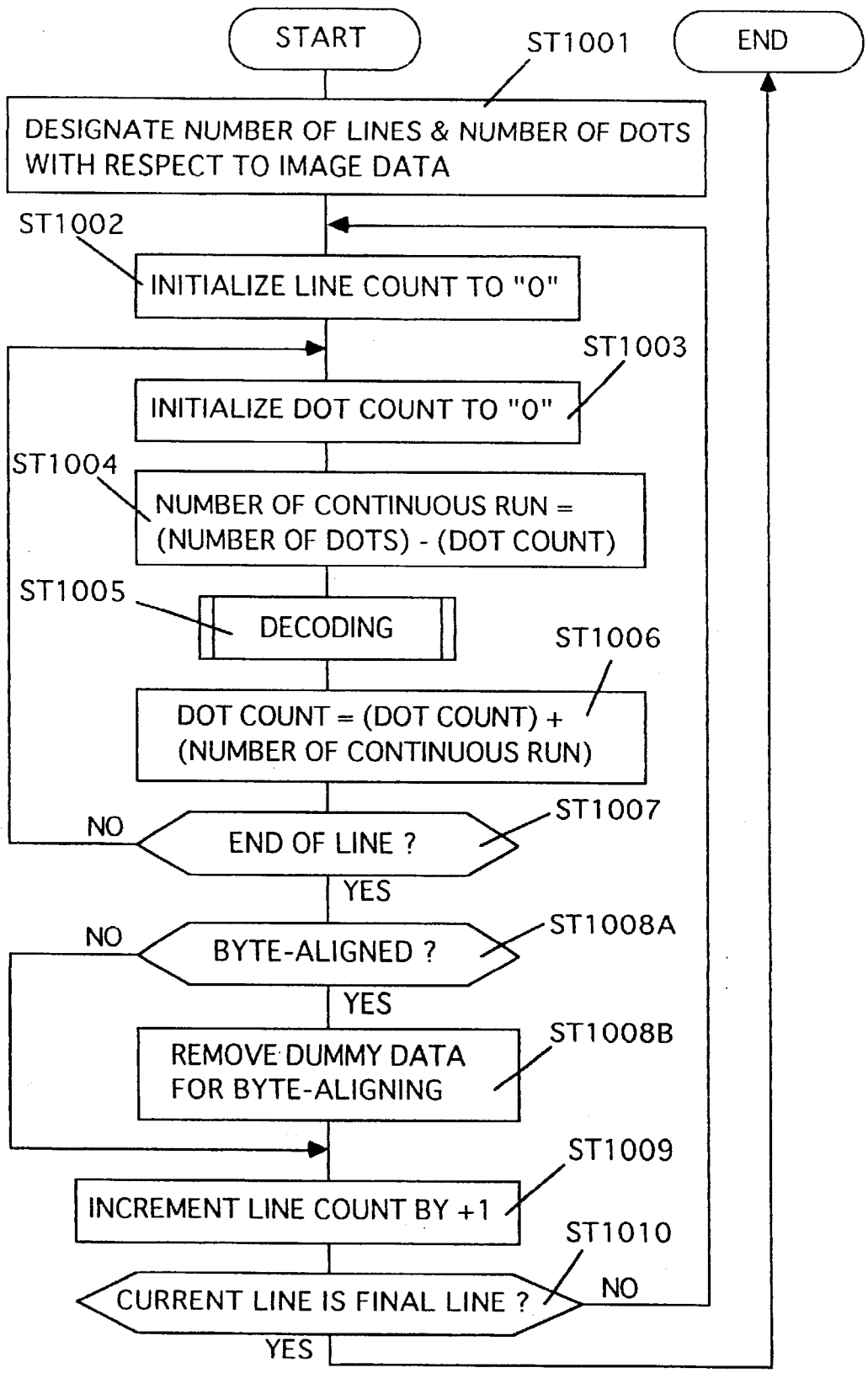
FIG. 15 is a flow chart for explaining software for the execution of image decoding (run-length expansion) according to an embodiment of the present invention, which is executed by an MPU (112) in FIG. 11 or 12.

FIG. 15 is a flow chart for executing image decoding (run-length expansion) according to an embodiment of the present invention, and for explaining software executed by microcomputer 112 in FIG. 11 or 12. (Note that the explanation for decoding display control sequence table DCSQT 33 of FIG. 3 is omitted here. The decoding of DCSQT 33 will be explained later with reference to FIGS. 54 to 57.)

Figure 16:
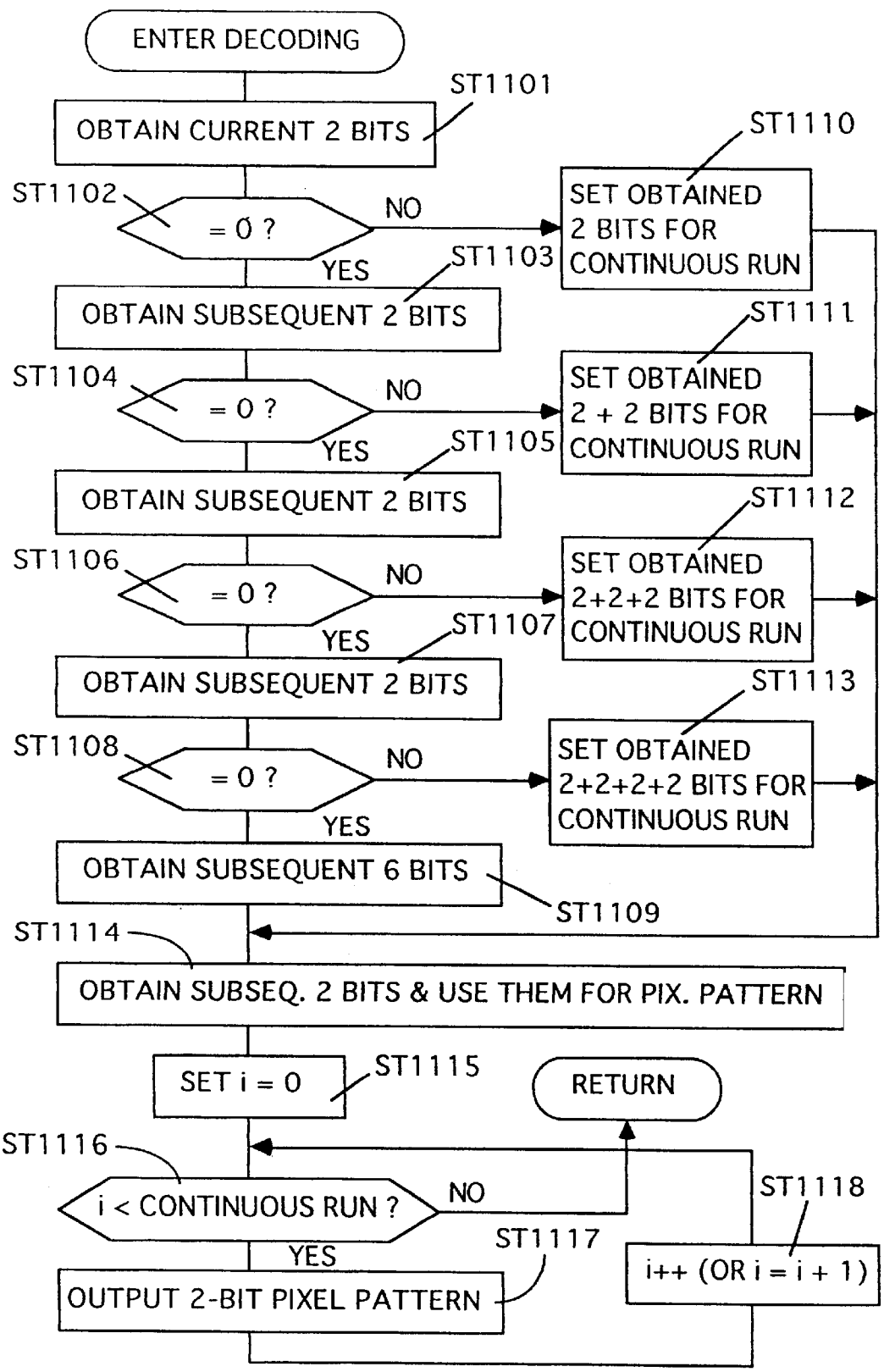
FIG. 16 is a flow chart for explaining the contents of decoding step (ST1005) used in the software in FIG. 15.

FIG. 16 is a flow chart for explaining the contents of the decoding step (step ST1005) used in the software in FIG. 15.

Microcomputer 112 loads first header 31 of run-length compressed sub-picture data (pixel data has a 2-bit configuration), and analyzes its contents (see FIG. 4). The data is then decoded on the basis of the analyzed contents of the header. The number of lines and the number of dots of the data are designated. When the number of lines and the number of dots are designated (step ST1001), the line count and the dot count are initialized to "0" (steps ST1002 and ST1003).

Microcomputer 112 sequentially receives the data bit string following sub-picture unit header 31, and counts the number of dots and the dot count. Microcomputer 112 then subtracts the dot count from the number of dots to obtain the number of pixels followed (step ST1004).

Upon calculating the number of pixels followed in this manner, microcomputer 112 executes decoding in accordance with the number of pixels followed (step ST1005).

After the decoding processing in step ST1005, microcomputer 112 adds the dot count to the number of pixels followed to obtain a new dot count (step ST1006).

Microcomputer 112 sequentially loads data and executes the decoding processing in step ST1005. When the accumulated dot count coincides with the initially set line end count (the position of the end of the line), microcomputer 112 terminates decoding processing for 1-line data (YES in step ST1007).

If the decoded data is byte-aligned (YES in step ST1008A), dummy data is removed (step ST1008B). The line count is then incremented by one (step ST1009). The processing in steps ST1002 to ST1009 is repeated until the final line (NO in step ST1010). If the current line is the final line (YES in step ST1010), the decoding processing is terminated.

For example, FIG. 16 shows the contents of the decoding processing in step ST1005 in FIG. 15.

From the beginning of this processing, 2 bits are obtained, and it is checked whether the bits are "0". This determination step is repeated (steps ST1101 to ST1109). With this processing, the number of pixels followed, i.e., the number of continuous runs, corresponding to run-length compression rules 1 to 6 is determined (steps ST1110 to ST1113).

After the number of continuous runs is determined, the subsequent 2 bits obtained afterward is used as a pixel pattern (pixel data; pixel color information) (step ST1114).

When the pixel data (pixel color information) is determined, index parameter "i" is set to 0 (step ST1115). Until parameter "i" coincides with the number of continuous runs (step ST1116), a 2-bit pixel pattern is output (step ST1117), and parameter "i" is incremented by one (step ST1118). After identical data corresponding to one unit is output, the decoding processing is completed.

As described above, according to this sub-picture decoding method, sub-picture data can be decoded by simple processing, i.e., only determination processing for several bits, data block separation processing, and data bit counting processing. For this reason, a large code table used in the conventional MH coding method or the like is not required, and the processing/arrangement for decoding encoded bit data into original pixel information can be simplified.

In the above embodiment, the encoded bit length of identical pixels corresponding to one unit can be determined by reading a maximum of 16-bit data in a decoding operation. However, the encoded bit length is not limited to this value. For example, the encoded bit length may be 32 or 64 bits. However, as the bit length increases, a data buffer having a larger capacity is required.

In addition, in the above embodiment, pixel data (pixel color information) includes pieces of color information of three colors selected from, e.g., a 16-color color palette. Instead of using such pixel data, pieces of amplitude information of the three primary colors (e.g., red R, green G, and blue B; or intensity Y, chroma-red Cr, and chroma-blue Cb) can be expressed by 2-bit pixel data. That is, pixel data is not limited to specific color information.

Figure 17:
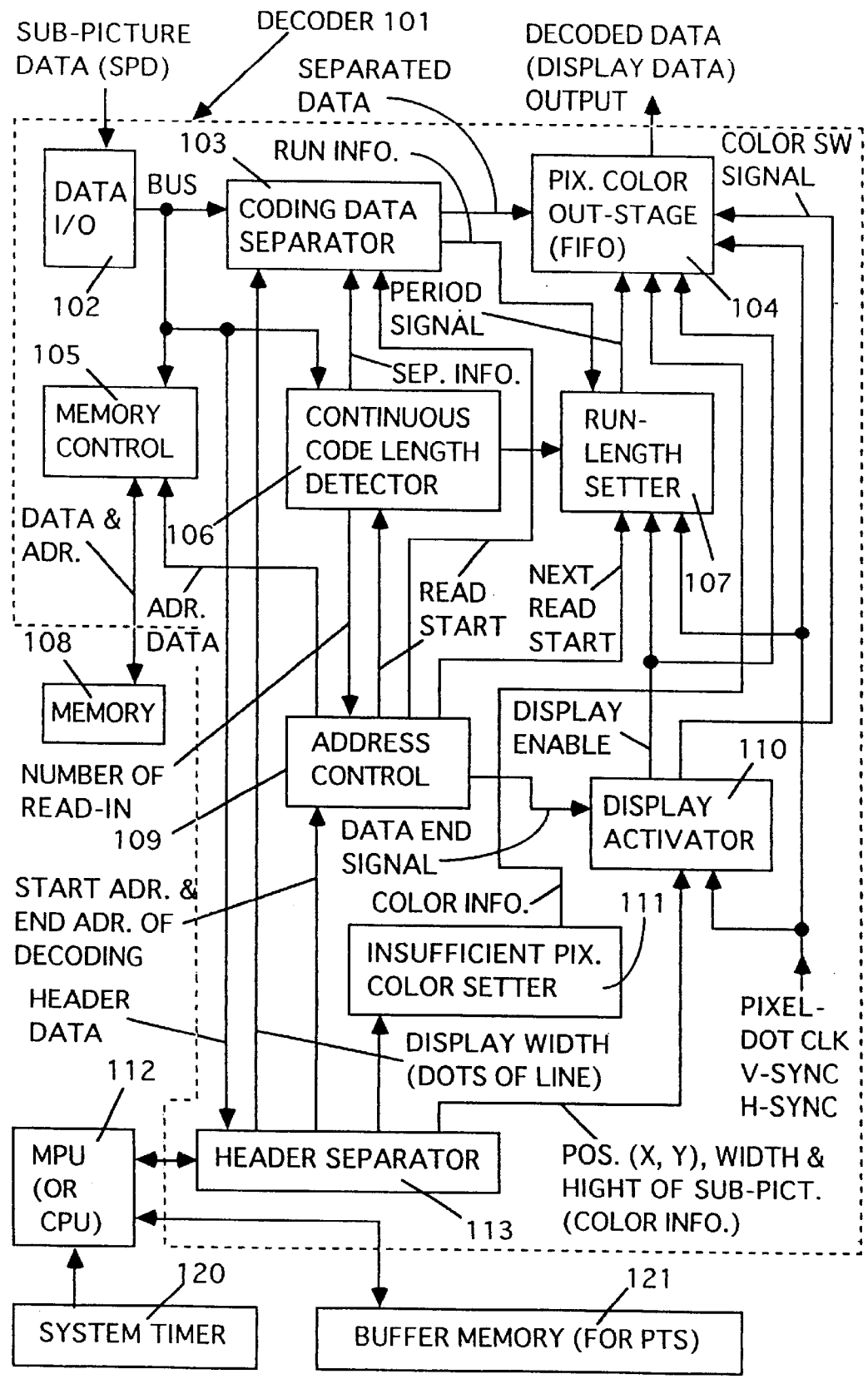
FIG. 17 is a block diagram for explaining another embodiment of the decoder hardware by which the image decoding (run-length expansion) according to the present invention is executed.

FIG. 17 shows a modification of the embodiment of FIG. 11. In the embodiment of FIG. 11, the header is separated by microcomputer 112 in software basis. On the other hand, in the embodiment of FIG. 17, the header is separated based on the hardware in decoder 101.

More specifically, as shown in FIG. 17, sub-picture data SPD subjected to the run-length compression is sent, via data I/O 102, to the internal bus of decoder 101. Sub-picture data SPD on the internal bus is sent to memory 108 through memory controller 105, and is then stored in memory 108. The internal bus of decoder 101 is connected to coding data separator 103, to continuous code length detector 106, and to header separator 113 which is coupled to microcomputer (MPU or CPU) 112.

Sub-picture unit header 31 of the sub-picture data read from memory 108 is read by header separator 113. Separator 113 detects various parameters shown in FIG. 4 from read header 31. Based on the detected parameters, separator 113 sets at address controller 109 the start address (SPDDADR) of decoding; at display activator 110 the information (SPDSZ) of the display width and display height of the sub-picture as well as the display start position of the sub-picture; and at coding data separator 103 the display width (the number of dots of the line). These set information pieces are stored in the internal registers of corresponding circuit blocks (109, 110, and 103). Thereafter, microcomputer 112 can access the parameters stored in the circuit blocks (109, 110, and 103).

Address controller 109 accesses memory 108 through memory controller 105 in response to the starting address (SPDDADR) of decoding set at the register of controller 109, so that the reading of the sub-picture data to be decoded starts. The sub-picture data read from memory 108 is supplied to coding data separator 103 and to continuous code length detector 106.

The coding header (e.g., 2 to 14 bits of rules 2 to 5 in FIG. 5) of run-length-compressed sub-picture data SPD is detected by continuous code length detector 106. The number of pixels followed with respect to the same pixel data within sub-picture data SPD is detected by run-length setter 107 in accordance with the signal from continuous code length detector 106.

Another decoding method differing from the decoding method of FIGS. 15 and 16 will be explained with reference to FIGS. 17 to 21.

Figure 18:
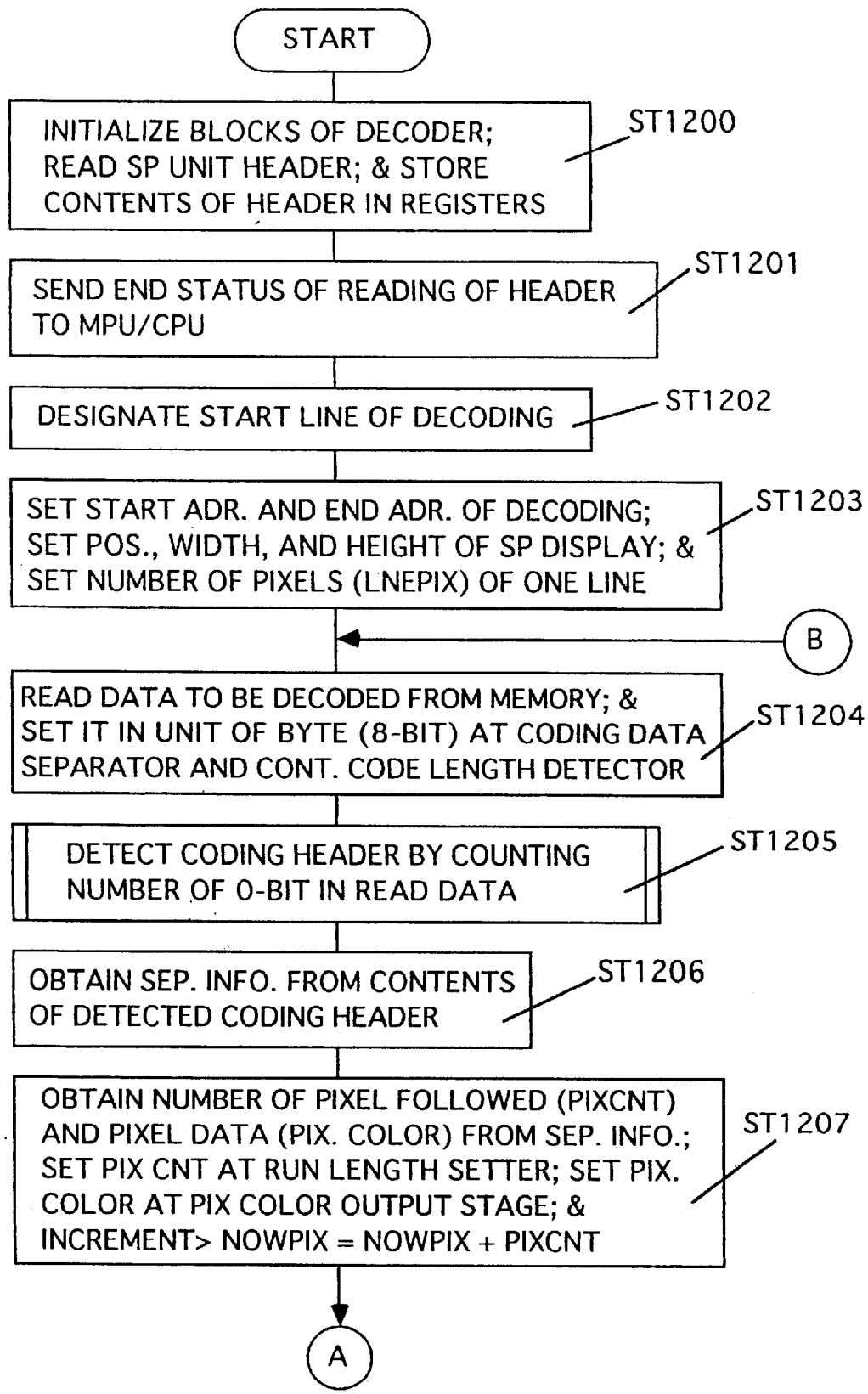
FIG. 18 is a flow chart for explaining the former processing of the image decoding (run-length expansion) according to another embodiment of the present invention.

FIG. 18 is a flow chart for explaining the former processing of the image decoding (run-length expansion) according to another embodiment of the present invention.

When the decoding starts, respective blocks in decoder 101 of FIG. 17 are initialized (e.g., registers are cleared and counters are reset). Thereafter, sub-picture unit header 31 is read, and the contents (various parameters shown in FIG. 4) of header 31 are set at internal registers of header separator 113 (step ST1200).

After the parameters of header 31 are set at the registers of header separator 113, microcomputer 112 is informed of the end status of reading of header 31 (step ST1201).

When microcomputer 112 receives the end status of header reading, it designates the start line of decoding (e.g., SPLine 1 in FIG. 4). The designated start line of decoding is sent to header separator 113 (step ST1202).

When header separator 113 receives the designated start line of decoding, separator 113 refers to the various parameters set in its own registers. Then, according to the parameters set in the registers of separator 113, the following data set operations are performed (step ST1203):

the designated decoding start line address (SPDDADR in FIG. 4) and the decoding end address (SPEDADR in FIG. 4; the address obtained by relatively-shifting by one line from the start line address) are set at address controller 109;

the display start position, display width, and display height of the decoded sub-picture (SPDSZ in FIG. 4) are set at display activator 110; and the width of display (LNEPIX; although not shown, LNEPIX is part of SPDSZ in FIG. 4 and indicates the number of dots on one line) is set at coding data separator 103.

Address controller 109 sends the decoding addresses to memory controller 105. Then, the data to be decoded (i.e., compressed sub-picture data SPD) is read, via memory controller 105, from memory 108 to coding data separator 103 and to continuous code length detector 106. In this case, the read data is set at respective registers of separator 103 and detector 106 in unit of byte (step ST1204).

Continuous code length detector 106 counts the number of 0-bit of the data read from memory 108, and detects the coding header corresponding to either of rules 1 to 5 shown in FIG. 5 (step ST1205). Details of detection of the coding header will be described later with reference to FIG. 20.

Then, continuous code length detector 106 generates separation information SEP.INFO. corresponding to either of rules 1 to 5 shown in FIG. 5 (step ST1206).

More specifically, for example, when the count of 0-bit of data read from memory 108 is zero, separation information SEP.INFO. indicating rule 1 is obtained;

when the count of 0-bit of data read from memory 108 is two, separation information SEP.INFO. indicating rule 2 is obtained; when the count of 0-bit of data read from memory 108 is four, separation information SEP.INFO. indicating rule 3 is obtained; when the count of 0-bit of data read from memory 108 is six, separation information SEP.INFO. indicating rule 4 is obtained; and when the count of 0-bit of data read from memory 108 is fourteen, separation information SEP.INFO. indicating rule 5 is obtained. The separation information SEP.INFO. thus obtained is sent to coding data separator 103.

In accordance with the content of separation information SEP.INFO. from continuous code length detector 106, coding data separator 103 sets the number of pixels followed (PIXCNT; run information) at run length setter 107. Further, coding data separator 103 sets at pixel color output stage 104 the 2-bit pixel data (pixel color data picked up from the sub-picture data packet) subsequent to the number of pixels followed. At this time, current count value NOWPIX of a pixel counter (not shown) in separator 103 is incremented by number PIXCNT of pixels followed (step ST1207).

Figure 19:
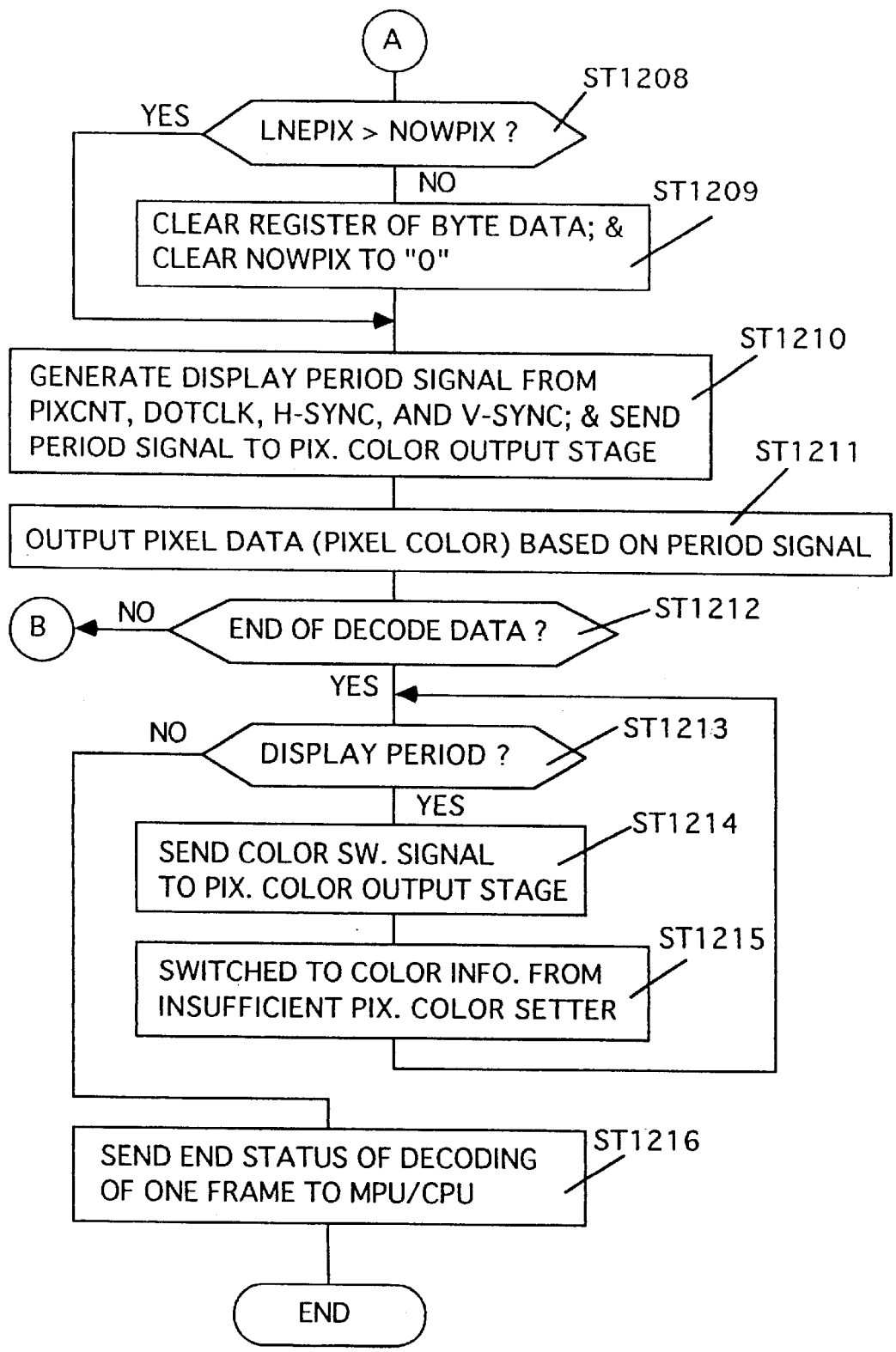
FIG. 19 is a flow chart for explaining the latter processing (subsequent to node A in FIG. 18) of the image decoding (run-length expansion) according to another embodiment of the present invention.

FIG. 19 is a flow chart for explaining the latter processing (subsequent to node A in FIG. 18) of the image decoding (run-length expansion) according to another embodiment of the present invention.

In the former step ST1203, coding data separator 103 is informed, by header separator 113, of the number LNEPIX of pixel data (the number of dots) of one line corresponding to the display width of the sub-picture. Coding data separator 103 checks whether the value NOWPIX of the internal pixel counter of separator 103 exceeds the value LNEPIX of the informed one-line pixel data (step ST1208).

In step ST1208, when the pixel count value NOWPIX is equal to or larger than the one-line pixel data value LNEPIX (NO at step ST1208), the internal register of separator 103, to which one byte data is set, is cleared, and the pixel count value NOWPIX becomes zero (step ST1209). At this time, if the data has been byte-aligned, the trailing 4-bit data is discarded or neglected. On the other hand, when the pixel count value NOWPIX is smaller than the one-line pixel data value LNEPIX (YES at step ST1208), the internal register of separator 103 is not cleared, or the state of the internal register remains.

Run length setter 107 responds to the number PIXCNT (run information) of pixels followed set at the former step ST1207, to dot clock DOTCLK determining the rate of transferring the pixel dots, and to horizontal- and vertical-sync signals H-SYNC and V-SYNC for synchronizing the sub-picture to the main picture display. In response to these data or signals, run length setter 107 generates a display period signal (PERIOD SIGNAL) which is provided for enabling pixel color output stage 104 to output for a required period of time the pixel data set in stage 104. The generated PERIOD SIGNAL is sent to pixel color output stage 104 (step ST1210).

Pixel color output stage 104 outputs, as display data of the decoded sub-picture, the separated data (e.g., pixel data indicating the pixel color) set at the former step ST1207 for a period during which the PERIOD SIGNAL is being sent from run length setter 107 to output stage 104 (step ST1211).

Thereafter, the-sub-picture display data thus obtained can be properly superimposed to a main picture by a specific circuit block (not shown), and an image of the superimposed main/sub-picture can be displayed on a TV monitor (not shown).

After the output processing of the pixel data at step ST1211 is completed, if the data to be decoded remains, the flow returns to the former step ST1204 (NO at step ST1212). Whether or not the data to be decoded remains can be determined by checking if coding data separator 103 completes the data processing for the end address (SPEDADR) of the sub-picture display data set by header separator 113.

When no data to be decoded remains, or the data processing up to the end address is completed (YES at step ST1212), it is checked whether a display enable signal (DISPLAY ENABLE) from display activator 110 is active or not. Note that activator 110 generates the active (e.g., high-level) display enable signal unless activator 110 receives a data end signal (DATA END SIGNAL) from address controller 109.

Even when the decoding of current data has already been completed, if the display enable signal is still active, it is determined that the current state is in the display period of the sub-picture (YES at step ST1213). In this case, display activator 110 sends a color switch signal to run-length setter 107 and to pixel color output stage 104 (step ST1214).

At the time when the color switch signal is sent, pixel color output stage 104 already receives insufficient pixel color data from insufficient pixel color setter 111. When output stage 104 receives the color switch signal from display activator 110, the pixel color data to be output is switched to the insufficient pixel color data obtained from insufficient pixel color setter 111 (step ST1215). Then, so long as the display enable signal is active (or in the loop of steps ST1213 to ST1215) during the display period in which no sub-picture data to be decoded exists, the display area for the sub-picture is filled with the insufficient pixel color provided by insufficient pixel color setter 111.

On the other hand, when the display enable signal is inactive, it is determined that the display period for the decoded sub-picture elapses (NO at step ST1213). In this case, display activator 110 supplies microcomputer 112 with an end status indicating that the decoding of the sub-picture(s) of one frame is completed (step ST1216). The decoding of the sub-picture(s) in one screen image (or one frame) is thus completed.

Figure 20:
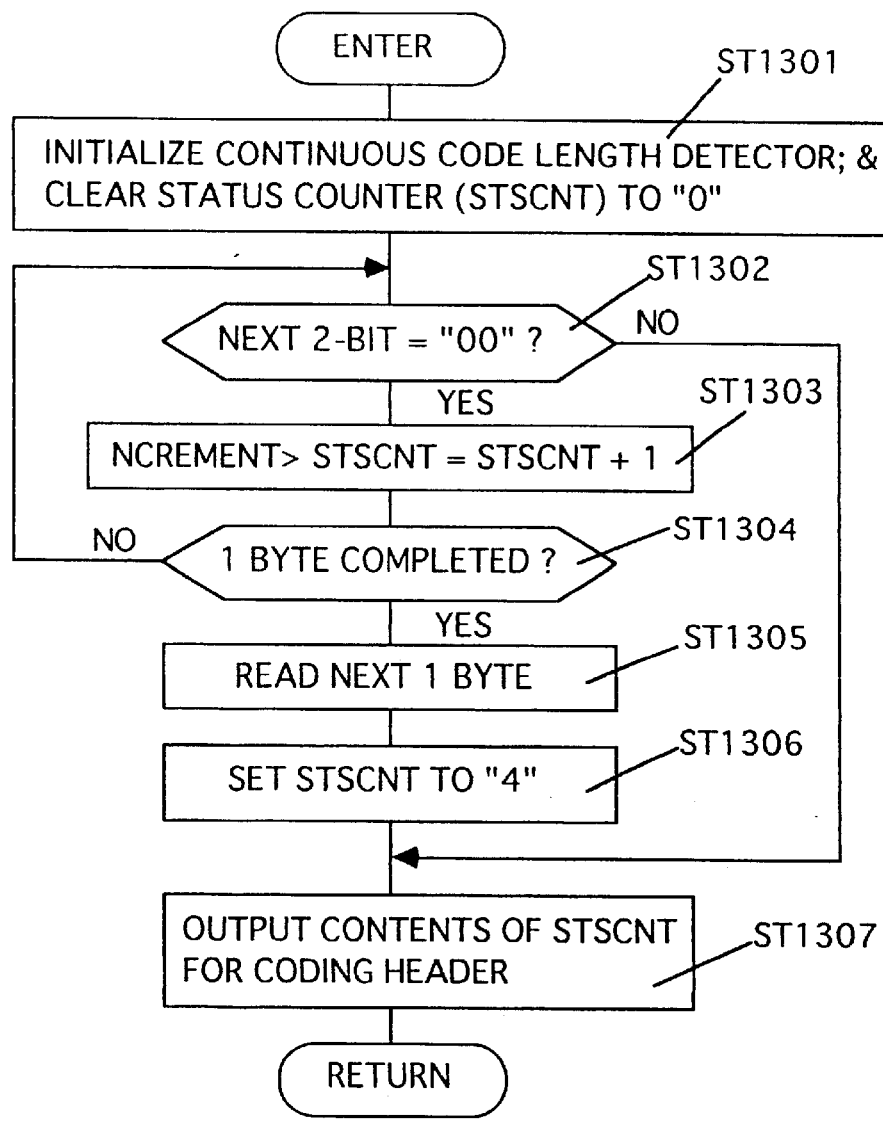
FIG. 20 is a flow chart for exemplifying the content of the coding header detection step ST1205 shown in FIG. 18.

FIG. 20 is a flow chart for exemplifying the content of the coding header detection step ST1205 shown in FIG. 18. The processing of the coding header detection can be executed by continuous code length detector 106 shown in FIG. 17 (or FIG. 11).

First, continuous code length detector 106 is initialized so that its internal status counter (STSCNT; not shown) is set to zero (step ST1301). Then, the contents of two-bit subsequent to the data which has been read from memory 108 to detector 106 in unit of byte are checked. When the contents are "00" (YES at step ST1302), counter STSCNT is incremented by 1 (step ST1303). If the checked two-bit does not reach the end of one byte (NO at step ST1304), the contents of next two-bit are further checked. When the contents are still "00" (YES at step ST1302), counter STSCNT is further incremented by 1 (step ST1303).

After repeating the processing of the loop of steps ST1302 to ST1304, if the checked two-bit reaches the end of one byte (YES at step ST1304), it is determined that the coding header of FIG. 5 is constituted by more than 6 bits. In this case, continuous code length detector 106 reads next one byte data from memory 108 (step ST1305), and status counter STSCNT is set to "4" (step ST1307). At this time, the same one byte data is read by coding data separator 103.

After status counter STSCNT is set to "4", or the contents of two-bit checked at the former step ST1302 is not "00" (NO at step ST1302), the content of status counter STSCNT is established, and the established content is output as the content of the coding header shown in FIG. 5 (step ST1307).

More specifically, when the established content of status counter STSCNT is "0", the coding header of rule 1 of FIG. 5 is detected. When STSCNT="1", the coding header of rule 2 is detected. When STSCNT="2", the coding header of rule 3 is detected. When STSCNT="3", the coding header of rule 4 is detected. When STSCNT="4", the coding header of rule 5 (the same pixel data continues up to the end of line) is detected.

Figure 21:
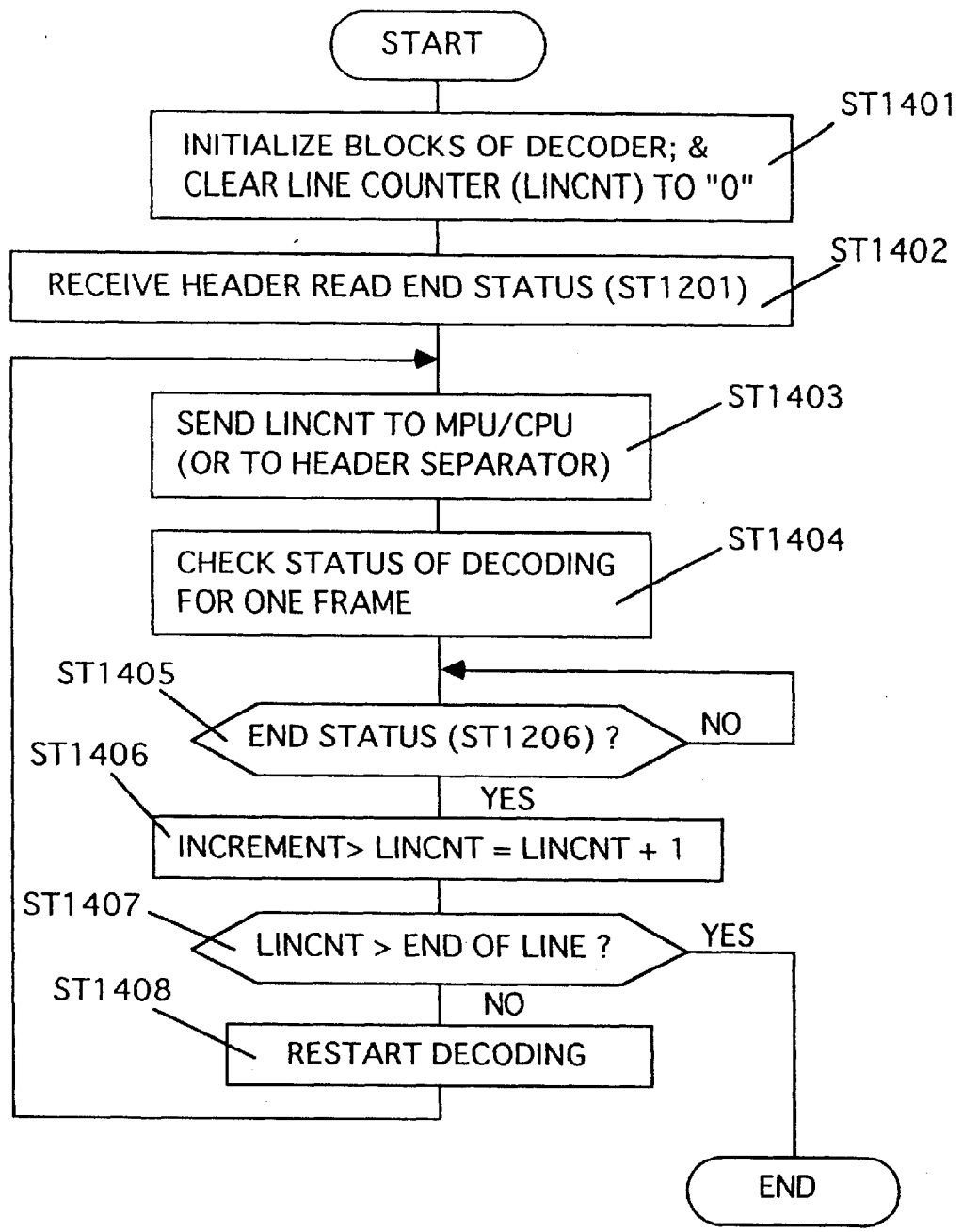
FIG. 21 is a flow chart for explaining the image decode processing according to the present invention, wherein the decoded image is scrolled.

FIG. 21 is a flow chart for explaining the image decode processing according to the present invention, wherein the decoded image is scrolled.

First, the respective blocks in decoder 101 of FIG. 11 or FIG. 17 are initialized, and line counter LINCNT (not shown) is cleared to zero (step ST1401). Then, microcomputer 112 (FIG. 11) or header separator 113 (FIG. 17) receives the header read end status sent at step ST1201 of FIG. 18 (step ST1402).

The content (zero at initial) of line counter LINCNT is sent to microcomputer 112 (FIG. 11) or header separator 113 (FIG. 17) (step ST1403). Microcomputer 112 or header separator 113 checks whether the received status is the end status (step ST1206 of FIG. 18) of one frame or one screen (step ST1404).

If the received status is not the end status of one frame (NO at step ST1405), the processing waits for the end status. When the end status is received (YES at step ST1405), line counter LINCNT is incremented by one (step ST1406).

When the content of incremented counter LINCNT does not reach the end of line (NO at step ST1407), the decode processing of FIGS. 15 and 16, or the decode processing of FIGS. 18 and 19 is restarted (step ST1408), and the processing returns to step ST1403. To repeat the restart of decoding (steps ST1403 to ST1408), the run-length-compressed sub-picture can be scrolled while it is decoded.

Meanwhile, when the content of incremented counter LINCNT reaches the end of line (YES at step ST1407), the decode processing associated with scrolling of the sub-picture is finished.

Figure 22:
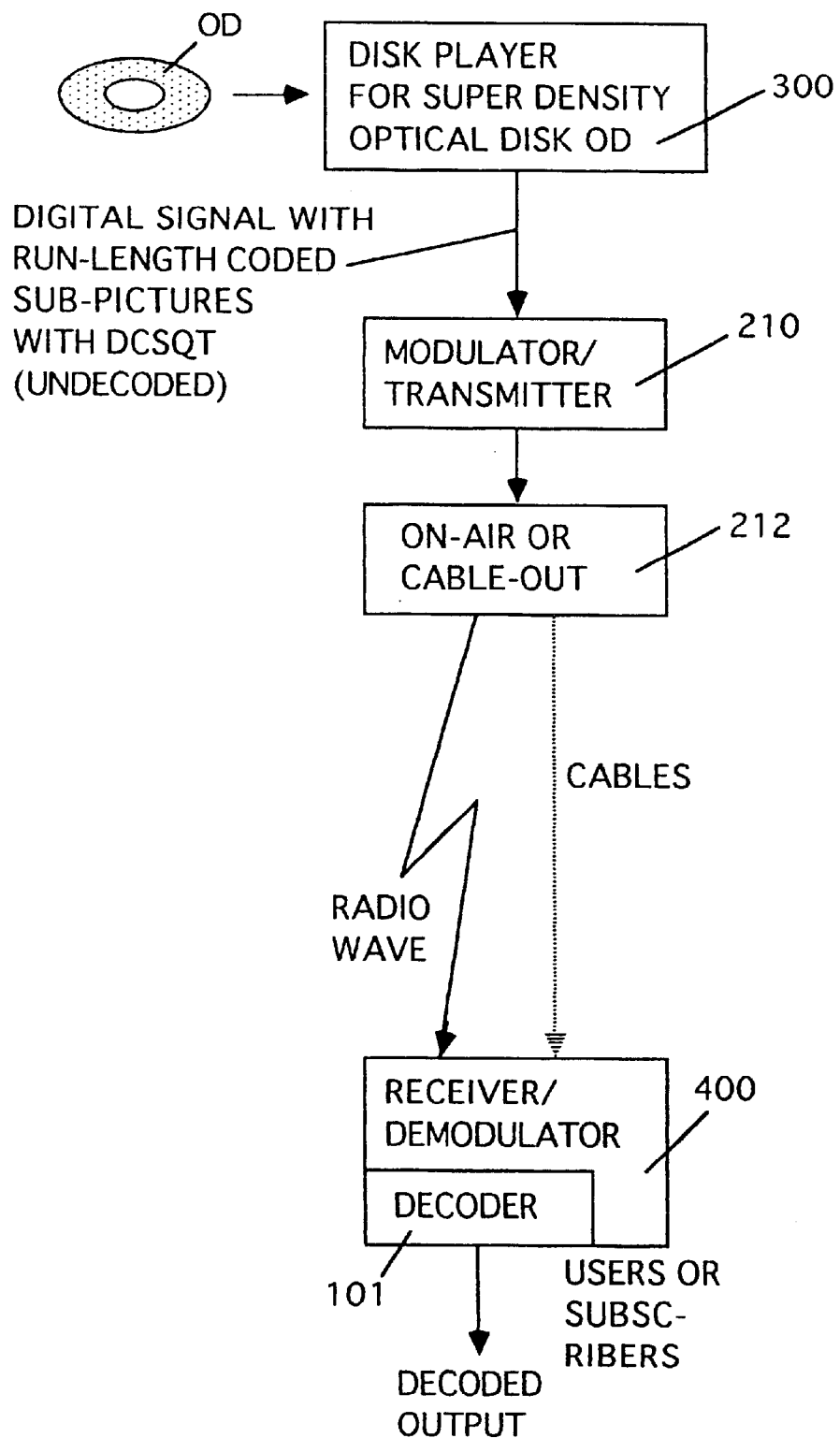
FIG. 22 is a block diagram for explaining a case wherein the compressed data, reproduced from a high-density optical disk having image information encoded according to the present invention, is directly on-aired or output to a cable, and the on-aired or cable-distributed compressed data is decoded at the user side or at the subscriber side.

FIG. 22 is a block diagram for explaining the brief configuration of an optical disk record/playback apparatus in which the encoding (of SPUH+PXD+DCSQT in FIG. 3) and decoding (of SPUH+PXD+DCSQT) of the present invention are executed.

Optical disk player 300 of FIG. 22 basically has the same configuration as a conventional optical disk playback apparatus (such as a compact disk player or a laser disk player). However, optical disk player 300 has a special configuration that a digital signal, obtained before decoding the run-length-compressed image information (i.e., an encoded digital signal), can be output from inserted optical disk OD on which recorded is image information containing run-length-compressed sub-picture data according to the present invention. Since the encoded digital signal is compressed, the transmission bandwidth necessary to the encoded digital signal can be narrower than that necessary to non-compressed data.

The compressed digital signal from optical disk player 300 is on-aired or is output to a communication cable, via modulator/transmitter 210.

The on-aired compressed digital signal or the cable-output compressed digital signal is received by receiver/demodulator 400 of a user or subscriber. Receiver 400 is provided with decoder 101 having a configuration as shown, for example, in FIG. 11 or FIG. 17. Decoder 101 of receiver 400 decodes the compressed digital signal having been received and demodulated, so as to output image information containing the original sub-picture data before encoded.

In the configuration of FIG. 22, when the transmission system of the transmitter/receiver has an average bit rate of more than about 5M-bit/s, high-quality multi-media video/audio information can be transmitted.

Figure 23:
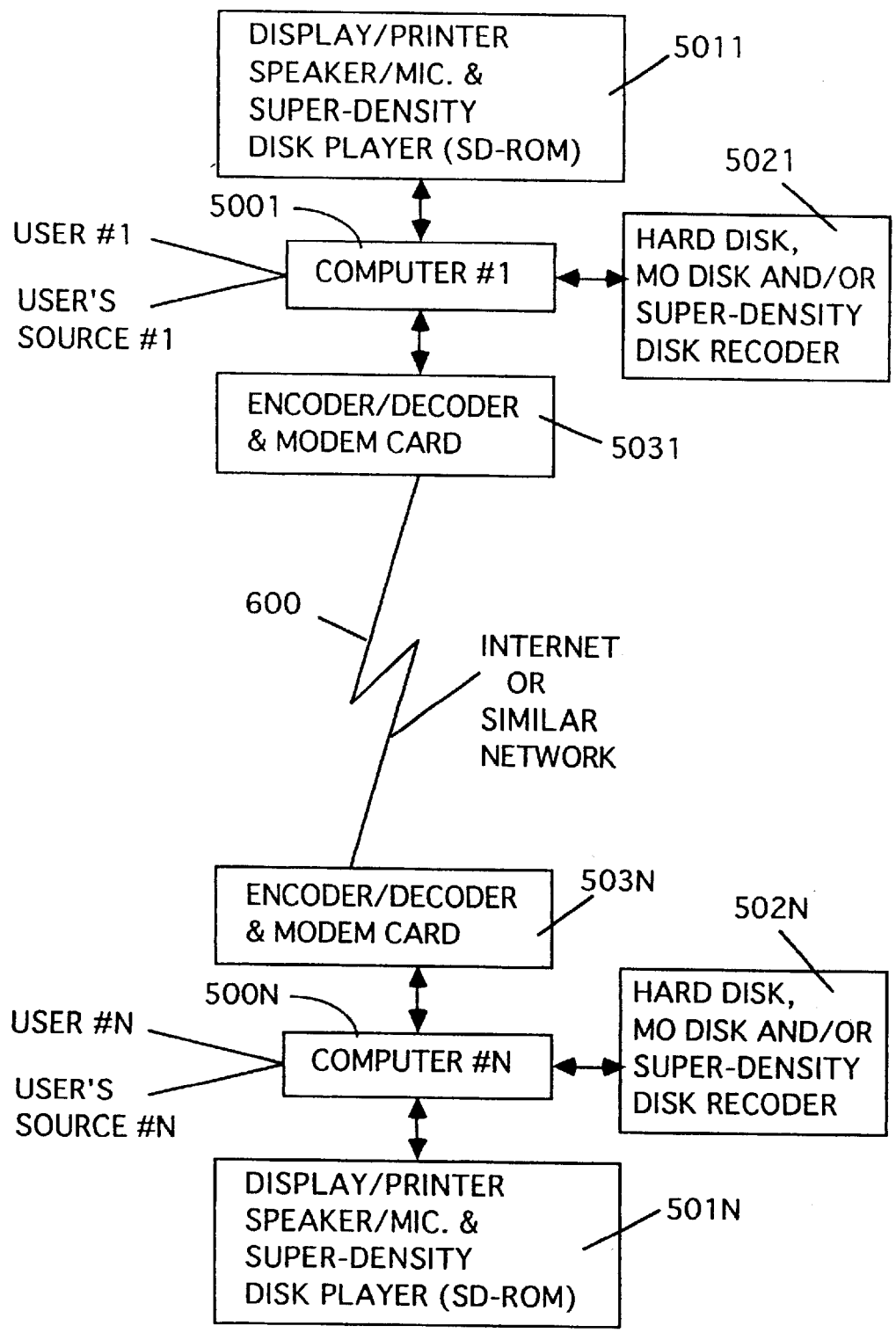
FIG. 23 is a block diagram for explaining a case wherein image information encoded on the basis of the present invention is exchanged between two arbitrary computer users via a communication network (e.g., an internet)

FIG. 23 is a block diagram for explaining a case wherein image information encoded on the basis of the present invention is exchanged between two arbitrary computers through a communication network (e.g., an internet).

User #1 having user's source #1, which is managed by a host computer (not shown), has personal computer 5001. Various input/output devices 5011 and various external memory units 5021 are connected to computer 5001. Modem card 5031 incorporating the encoder and the decoder of the present invention and having a function required for communication is inserted in an internal slot (not shown) of personal computer 5001.

Similarly, user #N having user's source #N has personal computer 500N. Various input/output devices 501N and various external memory units 502N are connected to computer 500N. Modem card 503N incorporating the encoder and the decoder of the present invention and having a function required for communication is inserted in an internal slot (not shown) of personal computer 500N.

Assume that user #1 operates computer 5001 to communicate with computer 500N of another user #N through line 600 such as an internet. In this case, since both users #1 and #N have modem cards 5031 and 503N incorporating the encoders and the decoders, compressed image data can be efficiently exchanged within a short period of time.

Figure 24:
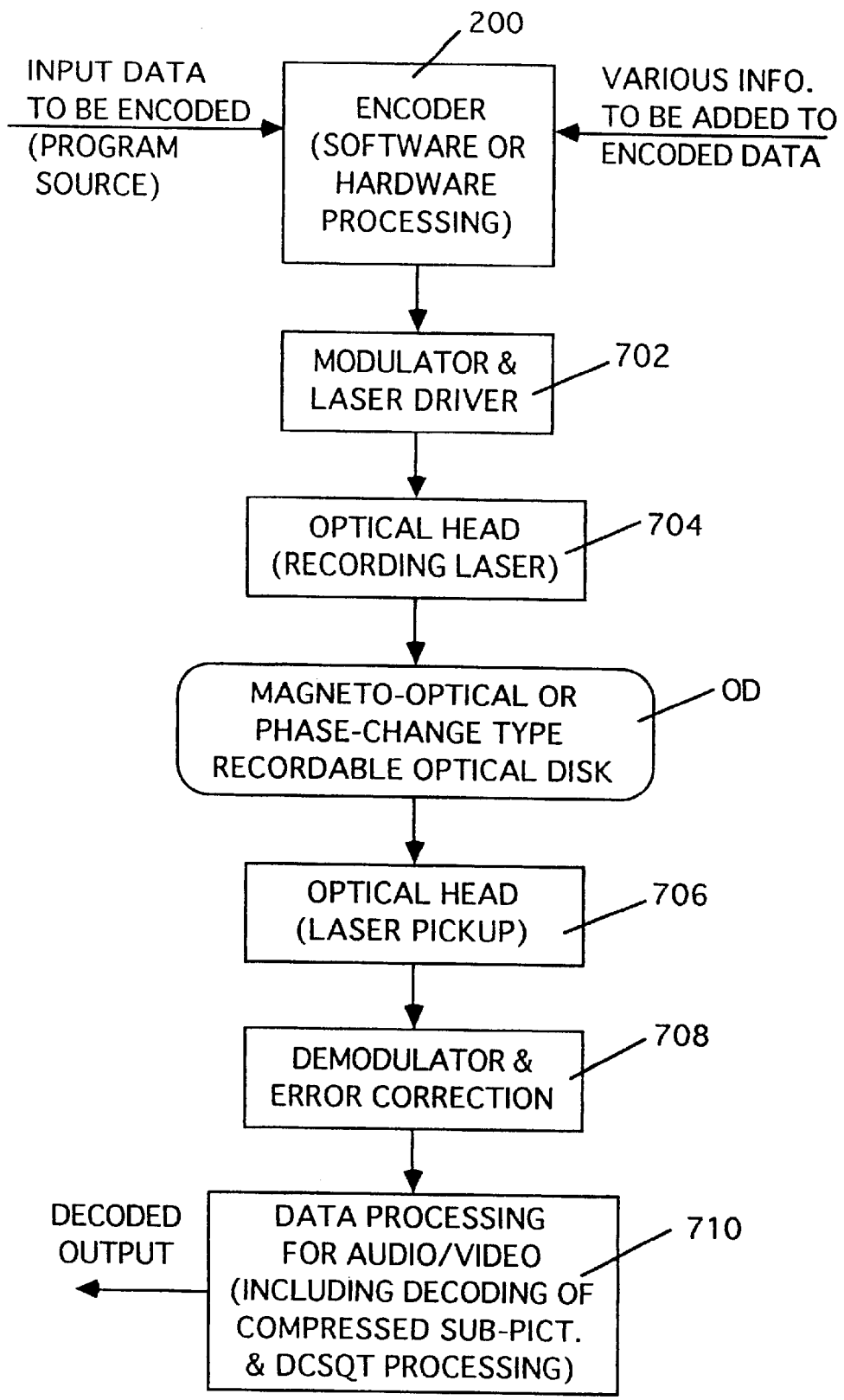
FIG. 24 shows a brief configuration of a record/playback apparatus for recording on optical disk OD the image information encoded according to the present invention, and for playing back the recorded information to decode it according to the present invention.

FIG. 24 shows a brief configuration of a record/playback apparatus for recording on optical disk OD the image information (SPUH+PXD+DCSQT in FIG. 3) encoded according to the present invention, and for playing back the recorded information (SPUH+PXD+DCSQT) to decode it according to the present invention.

Encoder 200 of FIG. 24 is so constructed that it performs the encode processing (corresponding to the processing of FIGS. 13 and 14) similar to the encode processing of encoder 200 of FIG. 10, provided that encoder 200 of FIG. 24 executes the encode processing based on a software or hardware (containing a firmware or wired-logic circuits).

The record signal containing sub-picture data encoded by encoder 200, etc. is subjected to, for example, a (2,7) RLL modulation at modulator/laser driver 702. The modulated record signal is sent from laser driver 702 to a high-power laser diode mounted in optical head 704. A particular pattern corresponding to the record signal is written in a magneto-optical disk or phase-change optical disk OD by means of the recording laser from optical head 704.

Thereafter, the information written in disk OD is read by a laser pickup of optical head 706. The read information is then demodulated at demodulator/error correction circuit 708 in which an error correction is performed, if necessary. The demodulated and error-corrected signal is subjected to various data processing at data processor 710 for audio/video information, so that information, equivalent to the original information before recording, is played back.

Data processor 710 includes a decode processing portion corresponding to, for example, decoder 101 of FIG. 11. This decode processing portion can perform the decoding (i.e., expanding of compressed sub-picture data) of FIGS. 15 and 16.

Figure 25:
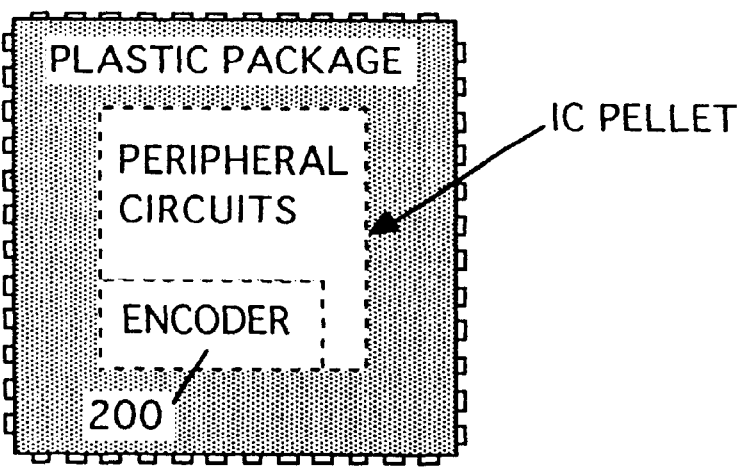
FIG. 25 shows an example of an IC device in which the encoder of the present invention is integrated with its peripheral circuits.

FIG. 25 shows an example of an IC device in which the encoder of the present invention is integrated with its peripheral circuits.

Figure 26:
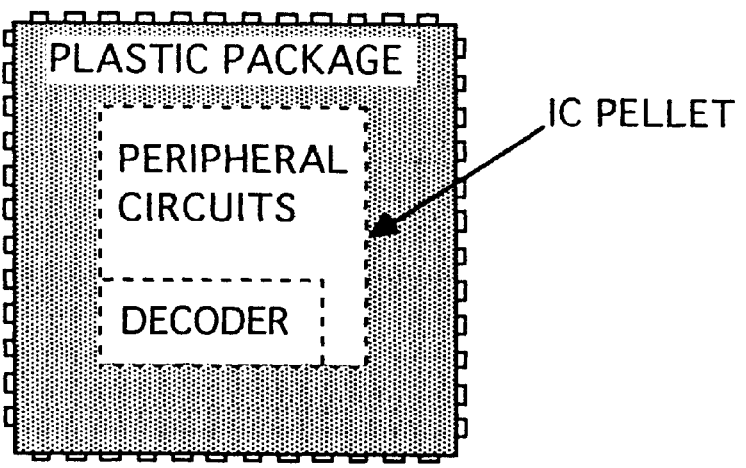
FIG. 26 shows an example of an IC device in which the decoder of the present invention is integrated with its peripheral circuits.

FIG. 26 shows an example of an IC device in which the decoder of the present invention is integrated with its peripheral circuits.

Figure 27:
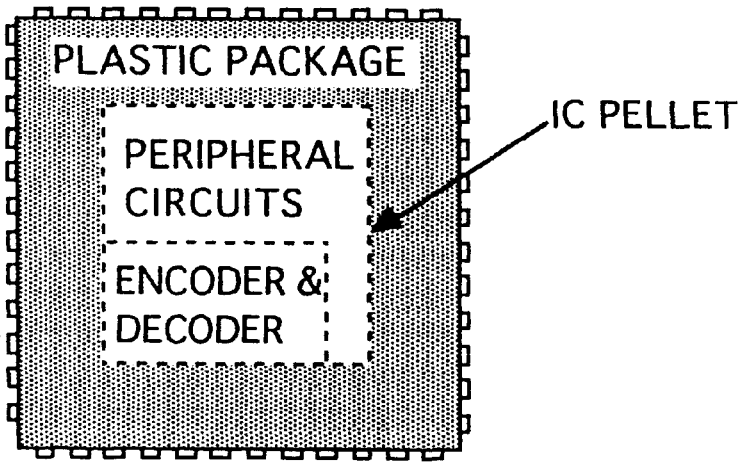
FIG. 27 shows an example of an IC device-in which the encoder and decoder of the present invention are integrated with their peripheral circuits;.

FIG. 27 shows an example of an IC device in which the encoder and decoder of the present invention are integrated with their peripheral circuits.

Thus, the encoder and/or the decoder according to the present invention can be reduced to practice in a form of a semiconductor integrated circuit (IC). The present invention can be embodied by installing such an IC in various apparatuses.

Generally, the data line on which the bit train of compressed data (PXD) as shown in FIG. 9 is arranged includes the image information of one horizontal scanning line of a TV display screen. However, the data line may include the image information of two or more horizontal scanning lines of the TV display screen, or may include the image information of all horizontal scanning lines of one TV display screen (or one frame of the TV display screen).

Incidentally, the target of data encoding based on the compression rules of the present invention is not limited to the sub-picture data (color information with respect to 3 or 4 colors) explained in the present specification. When the portion of the pixel data is constituted by more bit numbers, various information can be packed in this portion. For instance, if 8-bit per one pixel dot is assigned to the pixel data, 256-color pictures can be transmitted only by the sub-picture (in addition to a main picture).

Figure 52:
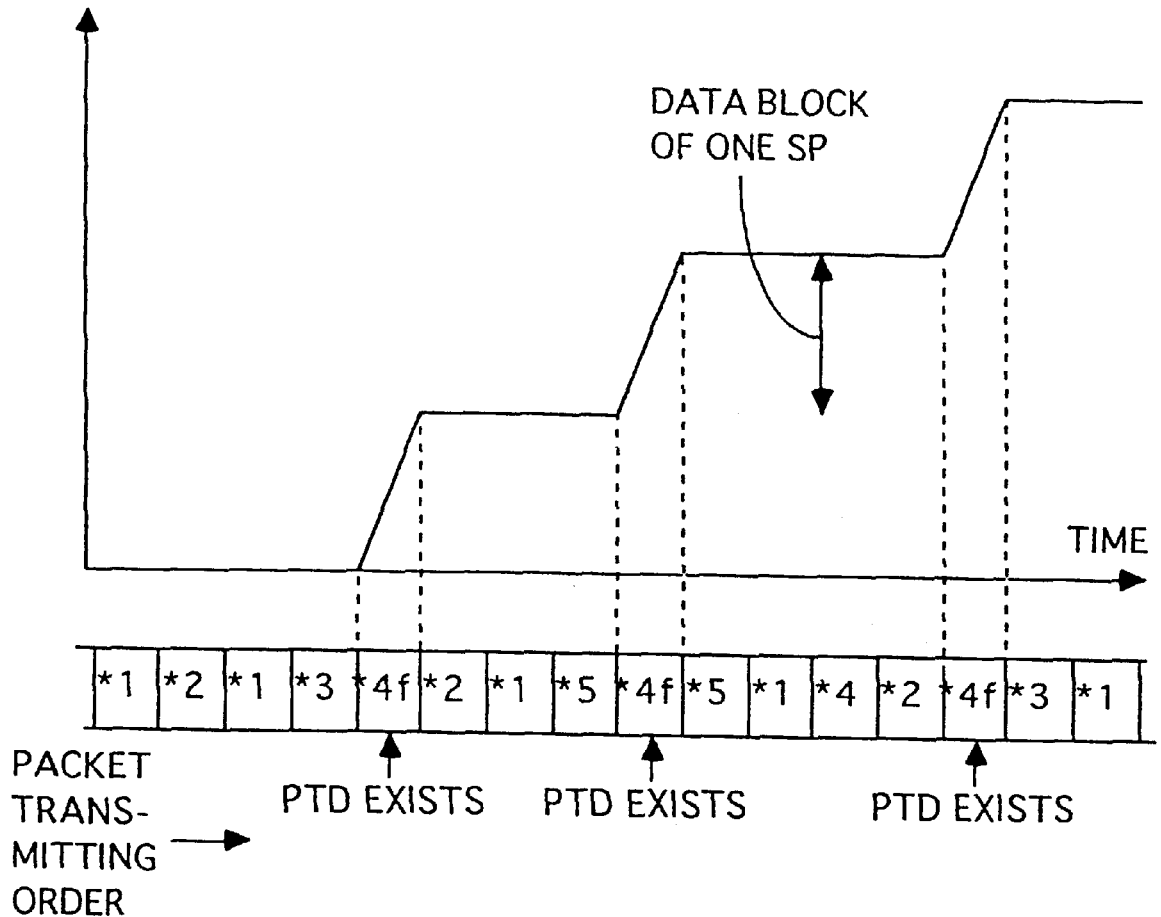
FIG. 52 explains how the state of storing sub-picture data blocks is changed with sub-picture channels each having time stamp (PTS), when the sub-picture data is decoded according to the present invention.

Sub-picture data as shown in FIG. 2 or 3 has a plurality of channels, as shown in FIG. 52. The sub-picture data block is constituted by a plurality of sub-picture data packets of a channel arbitrarily selected from the plurality of channels. The sub-picture is information of, e.g., a character or figure. The sub-picture is played back simultaneously with video and audio data and is superposed on the playback frame of the video data.

Figure 29:
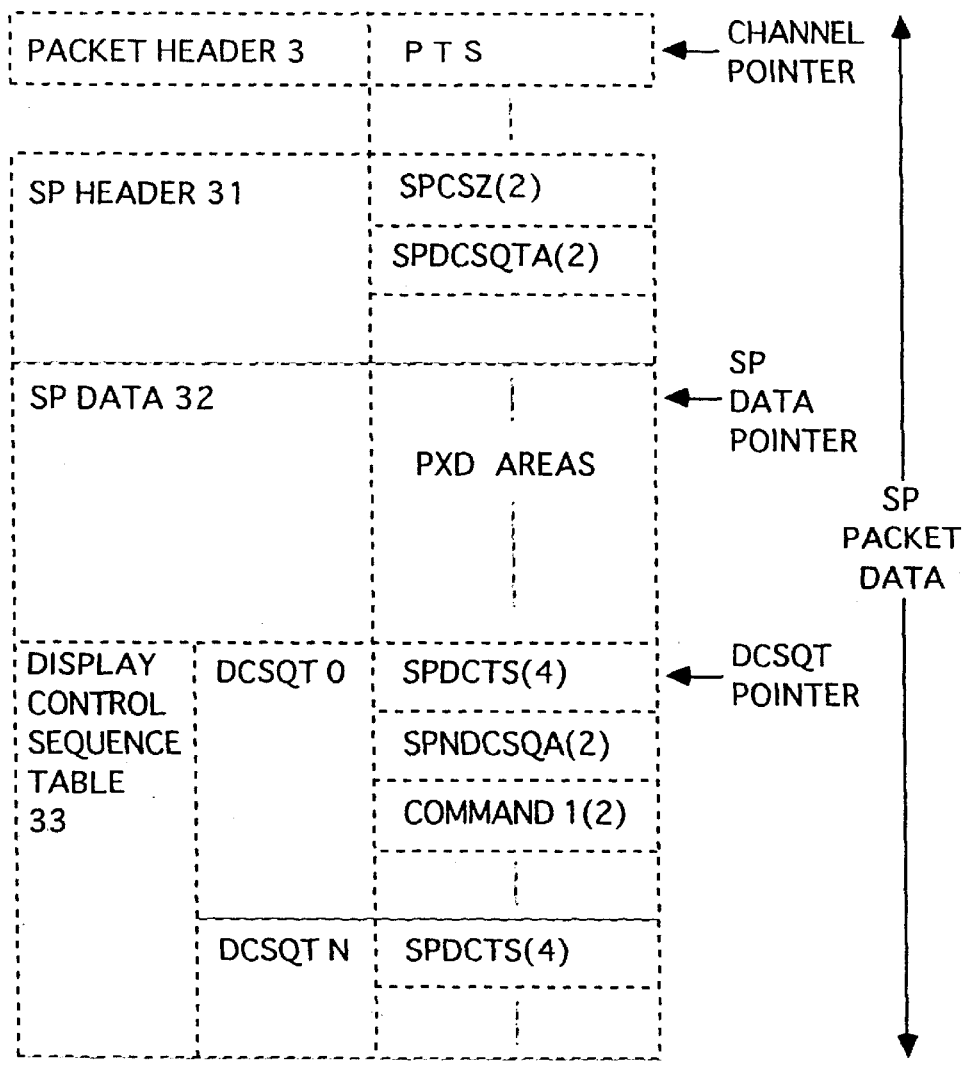
FIG. 29 explains a data structure of the data packet of sup-picture.

FIG. 29 is a view showing the structure of a sub-picture data packet. As shown in FIG. 29, the sub-picture data packet has packet header 3, sub-picture header 31, sub-picture content data 32, and display control sequence table 33.

The time at which a playback system starts controlling a sub-picture data block is recorded as a time stamp (to be referred to as a PTS; Presentation Time Stamp) in packet header 3. Note that the PTS is recorded in only header 3 of the start sub-picture data packet in each of sub-picture data blocks (Y, W). See FIG. 28

FIG. 30 exemplifies a series arrangement (n, n+1) of sub-picture units (cf. 30 in FIG. 3) each of which is constituted by one or more sub-picture packets; time stamp PTS described in the packet header of one unit (n+1); and conditions (clear of the display of the preceding sub-picture, and designation of the display control sequence of the sub-picture to be displayed from now) of display control of the unit (n+1) corresponding to the PTS.

The size (SPDSZ of 2 bytes) of a sub-picture data packet, and the recording start position (SPDCSQTA of 2 bytes) of display control sequence table 33-in the packet, are recorded in sub-picture header 31.

At least one display control sequence-information (DCSQT; Display Control Sequence Table) having, as one group, a sub-picture display control time stamp (to be referred to as SPDCTS; Sub-Picture Display Control Time Stamp) representing the display start/end time of the sub-picture data, the recording position (SPNDCSQA; Sub-Picture Next Display Control Sequence Address) of sub-picture content data (PXD) 32 to be displayed, and the display control command (COMMAND) of the sub-picture content data is recorded in display control sequence table 33.

Time stamp PTS in packet header 3 is defined by the time relative to a reference time (SCR; System Clock Reference) for playback of an overall file, e.g., by the playback start time at the beginning of a file (cf. FIG. 2). Meanwhile, each SPDCTS in display control sequence table 33 is defined as the time relative to the PTS.

Time stamp PTS processing of a sub-picture data packet in the playback system will be described below. Assume that the PTS processing is executed by a sub-picture processor (such as MPU 112 and its peripheral circuitry) in the playback system.

FIG. 52 explains how the state of storing sub-picture data blocks is changed with sub-picture channels each having time stamp PTS, when the sub-picture data is decoded.

(1) The sub-picture processor (cf. FIGS. 11, 17, etc.) decodes each sub-picture data packet of a selected channel from externally input sub-picture data packets (delivered from an optical disk, a broadcasting station, etc.), so as to check the presence/absence of a PTS in the decoded packet.

Figure 28:
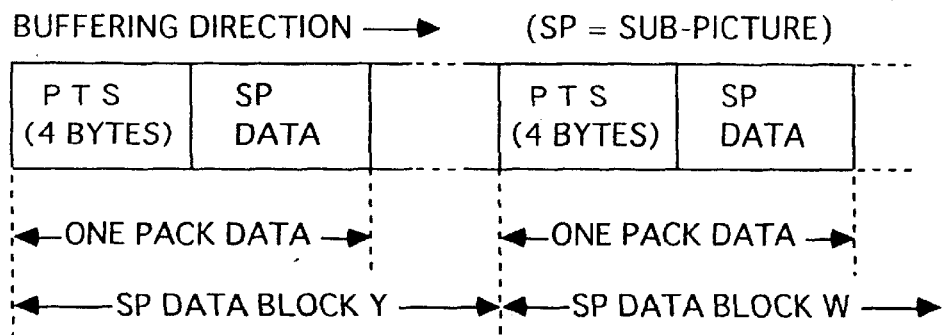
FIG. 28 explains a position of time stamp (PTS) in the data block of sub-picture.

If the PTS is present as indicated by channel *4f in FIG. 52, this PTS is extracted from packet header 3. The PTS is added to the beginning of the sub-picture data as shown in FIG. 28. The resultant sub-picture data having a header with PTS is buffered (or stored) in a sub-picture buffer (e.g., buffer 121 in FIG. 11).

Note that the graph of FIG. 52 illustrates how the buffering amount of sub-picture buffer 121 is accumulated as the sub-picture data packets of channel *4f with PTS are buffered.

(2) After the system is reset, the sub-picture processor loads the PTS during a vertical blanking period (during which a display frame/field is switched to the next display frame/field) immediately succeeding reception of the first packet including this PTS. The sub-picture processor compares this PTS with an STC. The STC represents the value of a standard'time counter (e.g., part of timer 120 in FIG. 11) in the sub-picture processor, which measures the lapse of time from the reference time SCR for playback of the overall file.

(3) As a result of comparison between the PTS and STC, if the STC is larger than the PTS, this sub-picture data is immediately subjected to display processing. However, if the STC is smaller than the PTS, no processing is performed. This comparison is performed again in the next vertical blanking period.

(4) In the display processing for the sub-picture data, the first sub-picture display control time stamp SPDCTS recorded in display control sequence table 33 in this sub-picture data packet is compared with a substandard time counter (sub-STC) in the sub-picture processor during the same vertical blanking period. Here, the sub-STC is constituted by a sub-standard time counter (e.g., other part of timer 120 in FIG. 11) in the sub-picture processor, which measures the lapse of time from the playback start time of the sub-picture data block. Thus, all the bits of the sub-STC are cleared to "0"s every time the display is switched to the next sub-picture data block, and the sub-STC is incremented (i.e., time-counted) again.

(5) As a result of comparison between the sub-STC and sub-picture display control time stamp SPDCTS, if the sub-STC is larger than the SPDCTS, control data (DCSQT; e.g., DCSQ 0 in FIG. 29) of the first display control sequence in display control sequence table 33 is immediately executed, and display processing for the sub-picture is started.

(6) Once the display processing is started, the PTS added to the first packet in the next sub-picture data block in the currently displayed sub-picture data block is loaded every vertical blanking period. This PTS is compared with the count of standard time counter STC.

As a result of this comparison, if the STC is larger than the PTS, the channel pointer of FIG. 29 is set to indicate the PTS address value of the next sub-picture data block, and the sub-picture data block to be processed is switched to the next one. For example, in FIG. 28, sub-picture data block Y is switched to next sub-picture data block W. At this time, since the data of sub-picture data block Y is no longer used, an empty area corresponding to the size of sub-picture data block Y is formed in the sub-picture buffer (e.g., memory 108 in FIG. 11), so that new sub-picture data packets can be transferred to this empty area.

The buffered state (cf. FIG. 52) of the sub-picture data packet can be primarily defined in advance at the time of encoding the sub-picture data, in accordance with the size of the sub-picture data block (e.g., block W in FIG. 28) and the switching time thereof (e.g., the time at which block Y is switched to block W). Therefore, in serial transfer of video picture, audio, and sub-picture packets, it is possible to generate a bit stream which causes neither an overflow nor underflow in the buffers of the respective decoders (e.g., memory 108 in FIG. 11, etc., for the sub-picture decoder).

As a result of the comparison between the PTS and STC, if the STC is not larger than the PTS, sub-picture data block switching is not performed, and the display control sequence table pointer (DCSQT pointer in FIG. 29) is set in the next DCSQT address value. The sub-picture display control time stamp SPDCTS of the next DCSQT in the current sub-picture data packet is compared with the sub-STC. Whether the next DCSQT is executed is determined based on the comparison result. This operation will be described in detail later on.

Note that the DCSQT processing in (5) for the last DCSQT in the sub-picture data packet remains basically the same, because the display control sequence table DCSQT designates itself as the next DCSQT.

(7) In a normal playback (or reproduction) operation, processing of (4), (5), and (6) is repeated.

In processing operation (6), the channel pointer (cf. FIG. 29) representing a PTS in loading this PTS in the next sub-picture data block is obtained using the packet size (SPDSZ) of the current sub-picture data block.

Similarly, the value of the DCSQT pointer indicating sub-picture display control time stamp SPDCTS of next DCSQT in display control sequence table 33 can be obtained from the size information (address SPNDCSQTA of the next sub-picture display control sequence) described in table 33.

Sub-picture header 31, sub-picture content data 32, and display control sequence table 33 will be described in detail below.

FIG. 31 is a view showing the structure of the sub-picture unit header (SPUH) 31. Sub-picture unit header SPUH 31 includes the size (SPDSZ) of a sub-picture data packet, and the recording start position (SPDCSQTA; relative address pointer of DCSQ) of display control sequence table 33 in the packet.

Incidentally, as shown in FIG. 32, the contents of sub-picture display control sequence table SPDCSQT indicated by address SPDCSQTA are constituted by a plurality of display control sequences DCSQ1 to DCSQn.

Further, as shown in FIG. 33, each of display control sequences DCSQ1 to DCSQn includes sub-picture display control time stamp SPDCTS indicating the sub-picture display control start time, address SPNDCSQA indicating the position of the next display control sequence, and one or more sub-picture display control commands SPDCMD.

Sub-picture content data 32 is an aggregate of data areas (PXD areas) which have a one-to-one correspondence with the individual sub-picture data packets.

More specifically, until the sub-picture data block is switched, sub-picture pixel data PXD at an arbitrary address in the same data area is read out. For this reason, an arbitrary display such as a scroll display, which is not fixed to one display image, can be performed. This arbitrary address is set by a command (e.g., SET_DSPXA in the command table of FIG. 34) for setting the display start address of the sub-picture content data (pixel data PXD).

FIG. 43 shows a bit-configuration of command SET_DSPXA, which is one of the commands exemplified in FIG. 34, for setting the display start address of the pixel data of sub-picture. In the following, meaning of the configuration of this command will be described.

When the line data sizes of sub-picture lines contained in sub-picture content data 32 are different from one another, the start address of the next line can be discriminated only after the immediately preceding line data is decoded. Then, when image data are arranged in the line number order as in a conventional case, it is difficult to read pixel data (PXD) from a buffer (memory 108) while skipping one line in the interlace mode.

Figure 58:
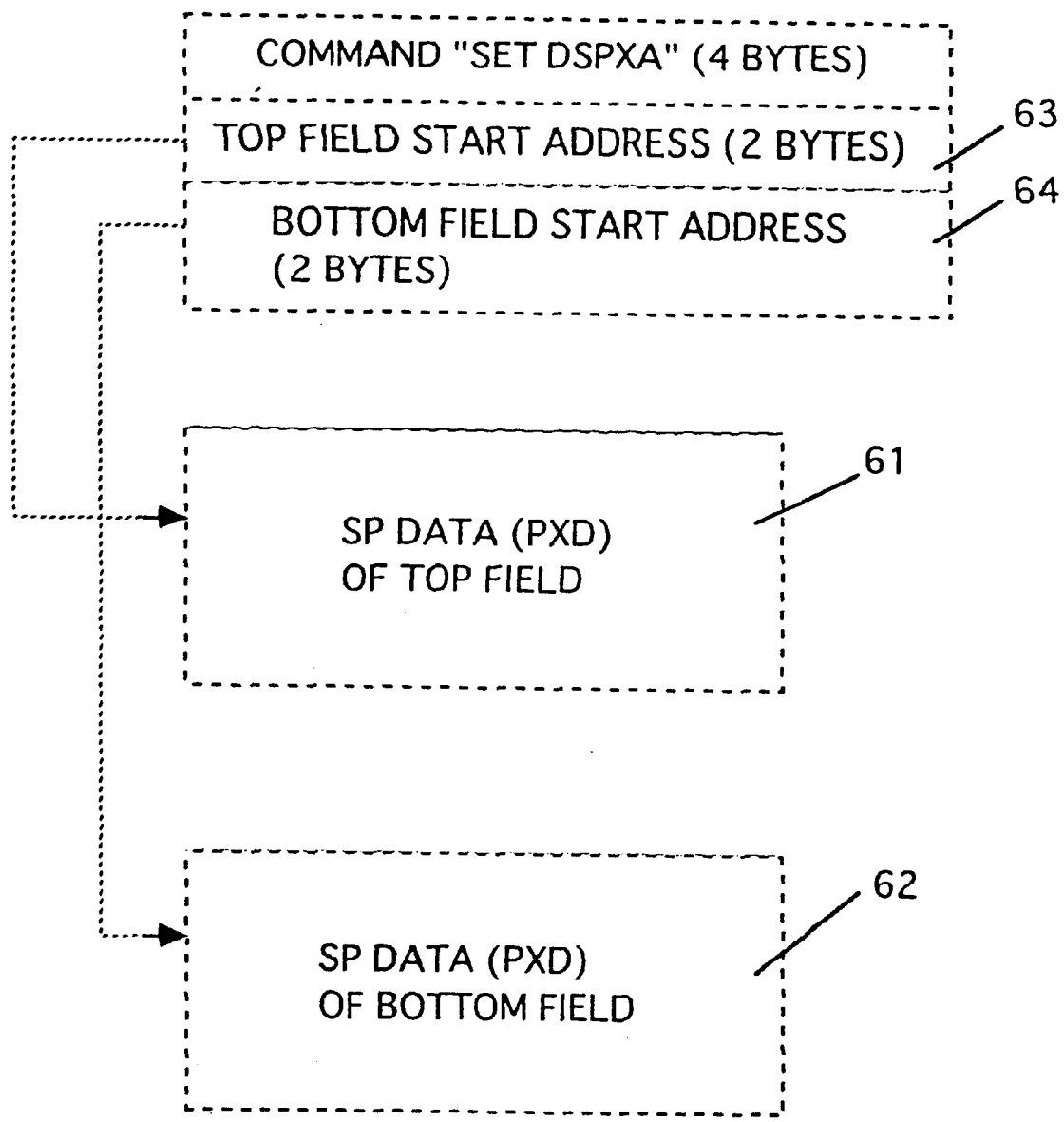
FIG. 58 explains a manner of recording sub-picture (PXD) when the display mode of sub-picture is an interlaced mode.

In view of this problem, as shown in FIG. 58, sub-picture content data 32 are separately recorded in top and bottom field areas 61 and 62 in units of data areas corresponding to the individual sub-picture data packets. In the interlace mode, two, top and bottom field address fields 63 and 64 are given to command SET_DSPXA so as to allow setting of two start addresses, i.e., the top and bottom field start addresses.

Note that, in the noninterlace mode, sub-picture content data for one field is recorded, and the same address is recorded in both address fields 63 and 64 of the top and bottom fields.

FIG. 59 is a view showing the format of display control sequence table 33. As described above, a plurality of display control commands (COMMAND3, COMMAND 4, etc.)

and respective parameters set by these commands are arranged after the time stamp (SPDCTS) and the sub-picture content data recording position (SPNDCSQA) in one display control sequence information (DCSQT) of display control sequence table 33. Finally, an end command (End_Code) representing the end of display control is added.

The processing sequence of this display control sequence table 33 will be described below.

(1) First, the time stamp (SPDCTS) recorded in the first DCSQT (DCSQT0 in FIG. 29) in display control sequence table 33 is compared with the sub-STC (e.g., a function of timer 120 in FIG. 11) of the sub-picture processor.

(2) As a result of this comparison, if the sub-STC is larger than the time stamp SPDCTS, all the display control commands in display control sequence table 33 are executed until display control end command CMD_END (cf. FIG. 34) appears.

(3) After the start of the display control, the sub-picture display control time stamp SPDCTS recorded in the next display control sequence table DCSQT is compared with the sub-STC every predetermined period of time (e.g., every vertical blanking period) to determine whether updating to the next DCSQT is to be performed.

Time stamp SPDCTS in display control sequence table 33 is recorded as a relative time with respect to updating of the PTS, (or updating of the sub-picture data block). For this reason, even if the PTS of the sub-picture data packet changes, the SPDCTS need not be rewritten. Even if the same sub-picture content data 32 is to be displayed at different times, the same display control sequence table DCSQT can be used, so that relocatability of the DCSQT can be guaranteed.

The display control commands for sub-picture will be described in detail below.

FIG. 34 shows a set of sub-picture display control commands SPDCCMD. Major commands thereof are as follows:

(1) Pixel Data Display Start Timing Setting (STA_DSP)

FIG. 37 shows the format of command STA_DSP. This is a command for executing display start control for sub-picture content data 32. More specifically, when the DCSQT is switched from a given DCSQT to another DCSQT including this command STA_DSP, the display of the sub-picture content data 32 is started from the time represented by the time stamp (SPDCTS) of the DCSQT including this command.

When the sub-picture processor (e.g., MPU 112 of FIG. 11) decodes this command, it immediately renders active the enable bit of an internal display control system of the sub-picture processor (because when this command is accessed, the time represented by the SPDCTS of the DCSQT to which this command belongs has passed).

(2) Pixel Data Display End Timing Setting (STP_DSP)

FIG. 38 shows the format of command STP_DSP. This is a command for executing display end control for the sub-picture content data 32. When the sub-picture processor decodes this command, it immediately renders inactive the enable bit of the internal display control system of the sub-picture processor (because when the command is accessed, the time represented by the SPDCTS of the DCSQT to which this command belongs has passed).

(3) Pixel Data Color Code Setting (SET_COLOR)

FIG. 39 shows the format of command SET_COLOR. This is a command for setting the color code of pixel data. By this command, color information can be set into a pattern pixel (e.g., a character or pattern), an emphasized pixel (e.g., edging for a pattern pixel), and a background pixel as a pixel except for the pattern pixel and the emphasized pixel in the range in which a sub-picture is displayed.

Figure 40:
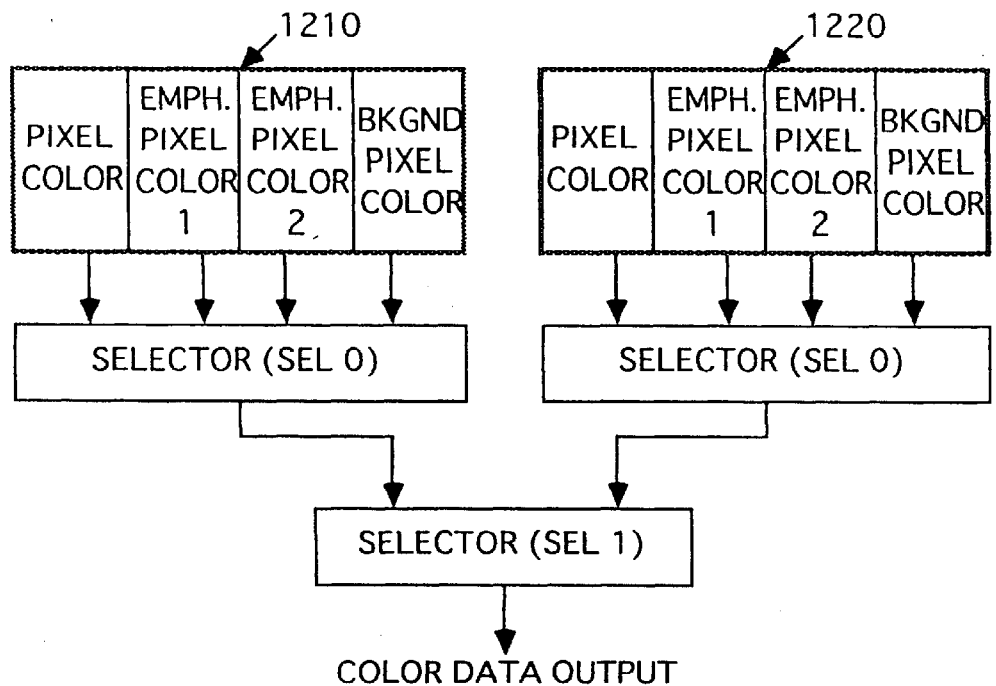
FIG. 40 explains an example of color data processing performed in the sub-picture data processor (e.g., decoder 101 in FIG. 11)

As shown in FIG. 40, the sub-picture processor incorporates color register 1210 capable of setting a color code by command SET_COLOR. Once the color code is set by this command, color register 1210 holds the color code until another color code is set again using the same command. Thus, selected (SEL1) from color resister 1210 is the color data based on a type of pixels (e.g., the type specified by the 2-bit pixel data of FIG. 5) indicated by sub-picture content data 32.

The sub-picture processor also incorporates change color data register 1220 which is set by a command (CHG_COLCON) for setting changes in color and contrast of the sub-picture pixel data. When the data output selected (SEL0) from register 1220 is active, this data output is then selected (SEL1) and output as a selected color data, since the selected data output from register 1220 has a higher priority than that of the selected data output from register 1210.

(4) Pixel Data Main Picture Contrast Setting (SET_CONTR)

Figure 41:
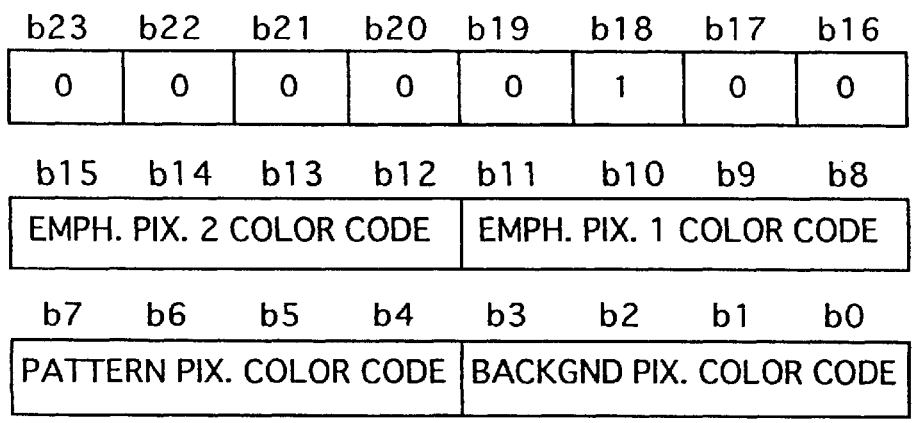
FIG. 41 shows a bit-configuration of command SET_CONTR, which is one of the commands exemplified in FIG. 34, for setting the contrast of the sub-picture with respect to the main picture.

FIG. 41 shows the format of command SET_CONTR. This is a command for setting contrast data, in the same manner as in the case of command SET_COLOR, in place of color code data for the four types of pixels described with reference to FIG. 40.

(5) Pixel Data Display Area Setting (SET_DAREA)

Figure 42:
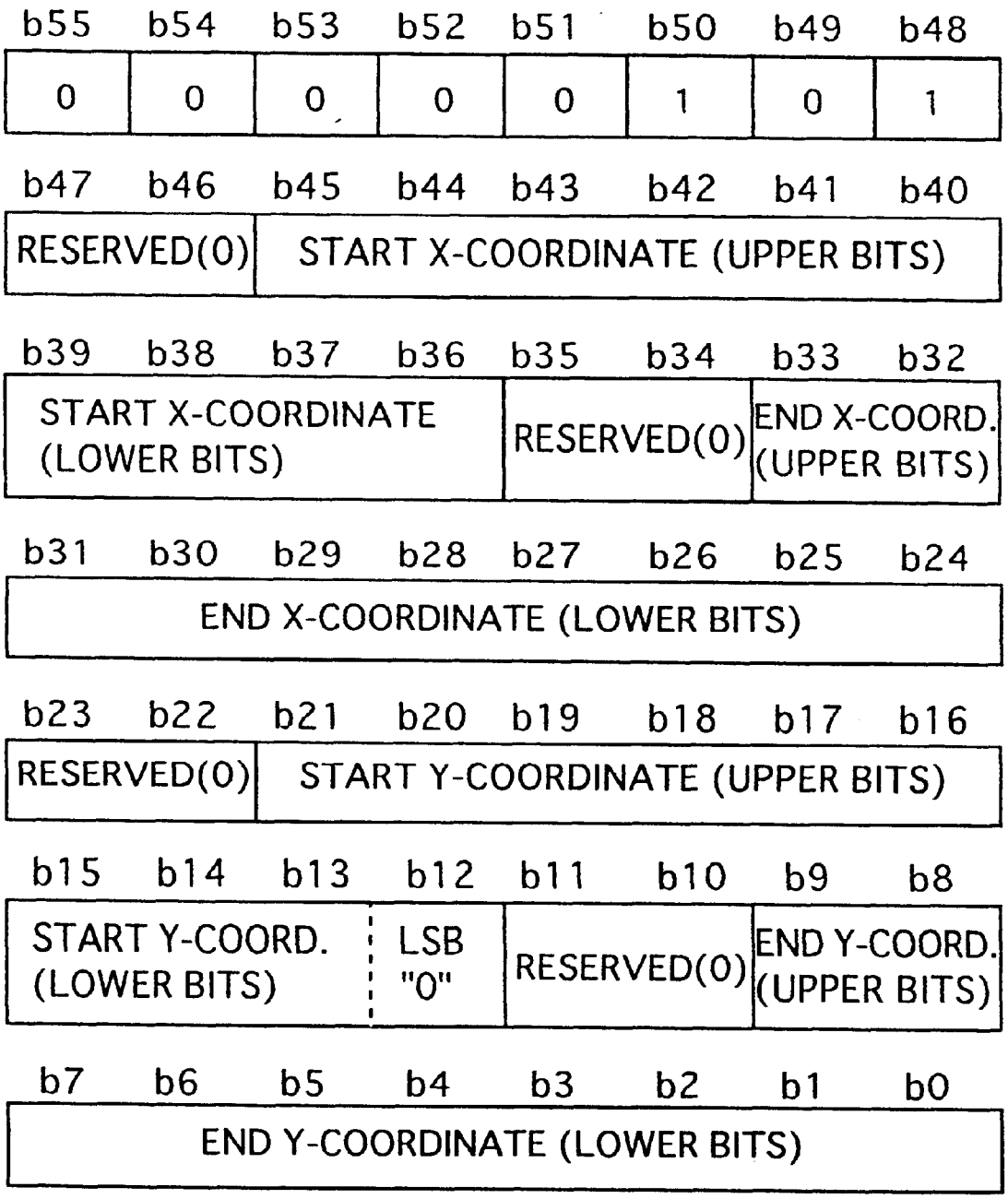
FIG. 42 shows a bit-configuration of command SET_DAREA, which is one of the commands exemplified in FIG. 34, for setting the display area of the pixel data of sub-picture.

FIG. 42 shows the format of command SET_DAREA. This is a command for setting the display position of sub-picture pixel data 32.

(6) Sub-Picture Content Data Use Range Setting (SET_DSPXA)

FIG. 43 shows the format of command SET_DSPXA. This is a command for setting the start address of sub-picture pixel data.

(7) Pixel Data Color Change and Contrast Change Setting (CHG_COLCON)

FIG. 44 shows the format of command CHG_COLCON. This is a command for changing, during the display, the color of sub-picture pixel data 32 as well as for changing the contrast of sub-picture pixel data 32 with respect to the main picture.

This command CHG_COLCON includes the pixel control data (PCD) and its size (extended field size).

Incidentally, in addition to the above-mentioned commands, the command table shown in FIG. 34 also includes command FSTA_DSP (cf. FIG. 36) for forcibly setting the display start timing of the sub-picture pixel data, and command CMD-END (cf. FIG. 45) for terminating the display control of the sub-picture.

FIGS. 35, 46, and 47 explain the format or configuration of pixel control data PCD. Pixel control data PXD has line control information LCINF, pixel control information PCINF, and a termination code (or end code) of pixel control data.

As shown in FIG. 46, line control information LCINF is constituted by a change start line number, the number of changes (a change point count), and a change termination line number (or continuous line count).

More specifically, line control information LCINF indicates the start line of a display frame for control of an outline correction color, a sub-picture color, and the contrast of the sub-picture with respect to the main picture; the number of changes of the outline correction color, the sub-picture color, and the contrast on these lines; and an end of the line at which the common change lasts.

With respect to the line being indicated by line control information LCINF, pixel control information PCINF represents the pixel position at which the outline correction color, the sub-picture color, and the contrast are to be changed; and the contents of changes of the outline correction color, the sub-picture color, and the contrast upon the change.

The number of pixel control data each constituting line control information LCINF and pixel control information PCINF is set for sub-picture display frames, as needed.

Figure 48:
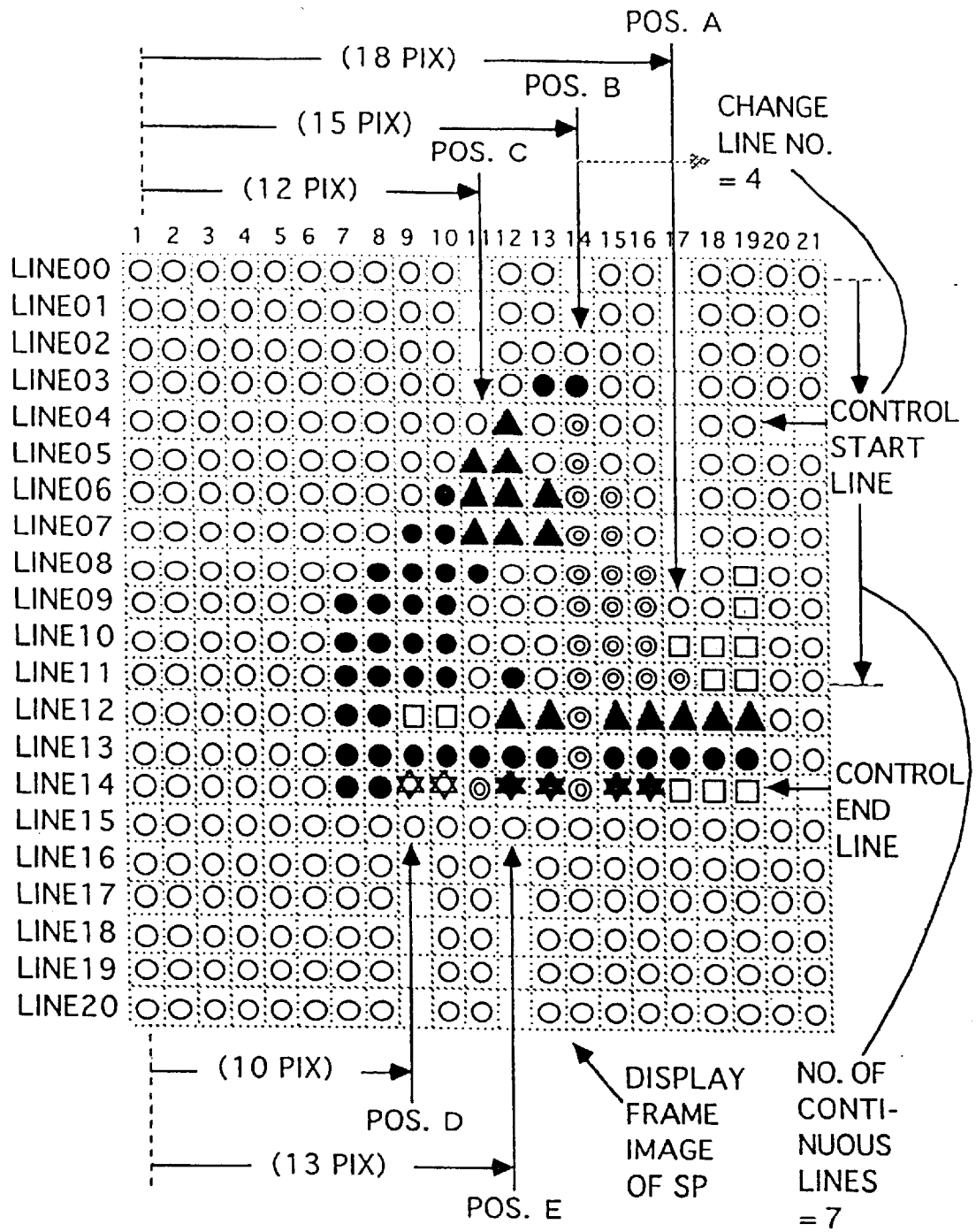
FIG. 48 shows an example of the displayed frame of sub-picture.
Figure 50:
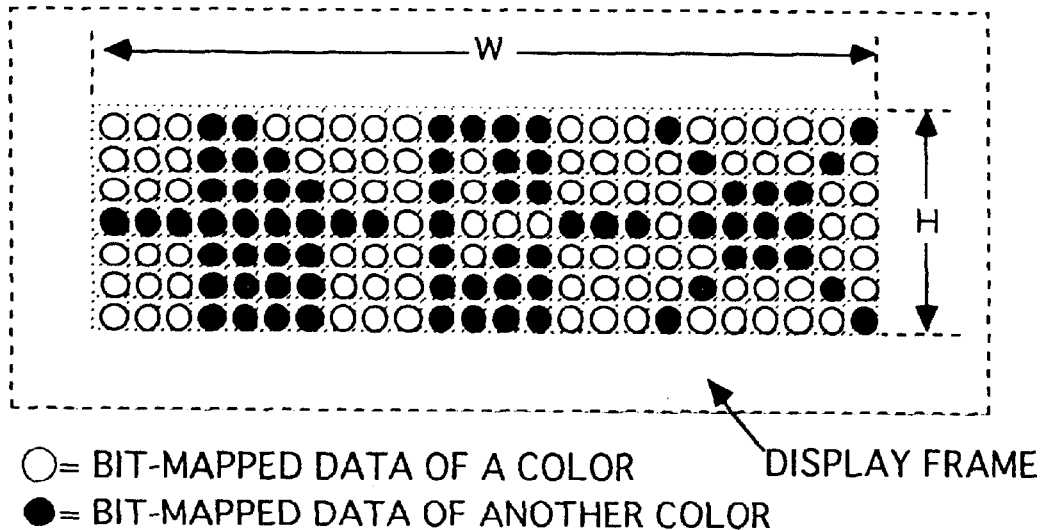
FIG. 50 explains a problem occurred when the bit-mapped data of sub-picture is processed without use of the present invention.
Figure 51:
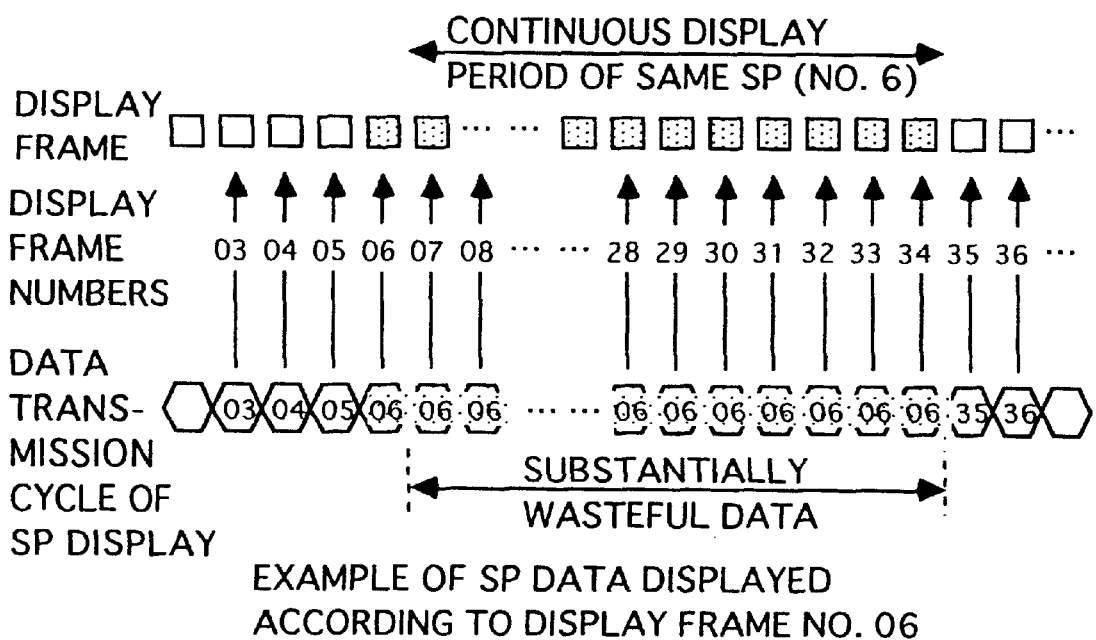
FIG. 51 further explains another problem occurred when the bit-mapped data of sub-picture is processed without use of the present invention.

For example, pixel control data PCD set for a sub-picture display frame image of FIG. 48 can be expressed as shown in FIG. 19.

More specifically, in the above example, a line on which a change is started is line 4. The change start line number is 4. The positions at which pixels change are positions A, B, and C. The pixel change point count is 3. Since the state of common pixel change continues up to line 11, the continuous line count is 7.

Line 12 has a pixel change state different from that on the previous lines. No pixel change occurs on line 13. Another line control information is set such that the change start line number is 12, the change point count is 2, and the continuous line count is 1. Line 14 has four positions at which pixels change. No change in pixel occurs in next line 15. For this reason, another line control information LCINF is set such that the change start line number is 14, the change point count is 4, and the continuous line count is 1. Finally, an end code representing the end is set.

A display control sequence using line-control information LCINF and pixel control information PCINF will be described below.

(1) Display control of sub-picture is performed by repeated executions of control commands (COMMAND1, etc.) contained in display control sequence table 33 (cf. DCSQT1 to DCSQTN of FIG. 29). These command executions are repeated in each of the display fields. The contents of the control commands are shown in the table of sub-picture display control command SPDCCMD in FIG. 34.

Which display control sequence (any of DCSQT1 to DCSQTN) is selected to execute its command (of various commands in FIG. 34) can be determined by the DCSQT pointer shown in FIG. 29.

(2) The parameters set by respective control commands (STA_DSP, STP_DSP, SET_COLOR, SET_CONTR, SET_DAREA, SET_DSPXA, CHG_COLCON) shown in FIG. 34 are kept held in the corresponding registers in the sub-picture processor (e.g., MPU 112 in FIG. 11), unless these parameters are rewritten by the same command. Except for specific parameters (LCINF, PCINF), respective parameters held in the above registers are cleared when the sub-picture data block is switched (e.g., switched from block Y to block W in FIG. 28).

More specifically, the parameters (LCINF, PCINF) of pixel control data PCD in FIG. 35 are held in the internal registers of MPU 112, unless command CHG_COLCON of FIG. 34 is executed again.

(3) In a highlight mode, display control is performed by the LCINF and PCINF parameters set by system MPU 112. The LCINF and PCINF of the sub-picture content data 32 are neglected in this case. These set parameters (LCINF and PCINF) are kept held and the display using the held LCINF and PCINF continues until they are set again by system MPU 112 in the highlight. mode, or the LCINF and PCINF in the sub-picture data are set again in the normal mode.

(4) The display area is set by lines and dots whose numbers are designated at the start and end in both the horizontal and vertical directions. To display only one line, the display start line number must be equal to the display end line number. If no display is to be performed, the display must be stopped using a display end command.

Figure 53:
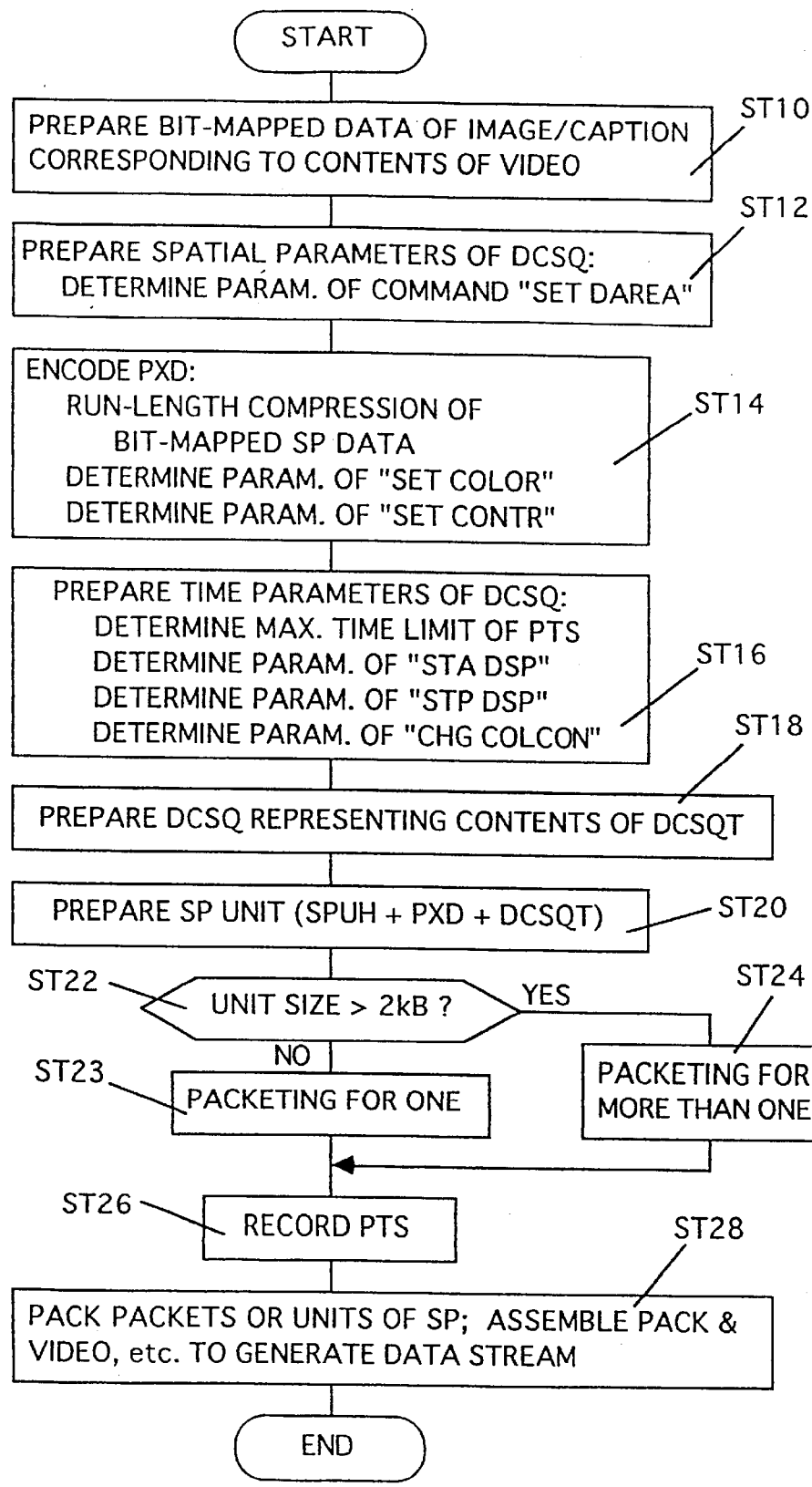
FIG. 53 is a flowchart for explaining an example of encoding the sub-picture according to the present invention, wherein the explanation is chiefly directed to the processing of a display control sequence (DCSQ)

FIG. 53 is a flowchart for explaining a manner of generating sub-picture unit 30 as shown in FIG. 3.

When captions and/or images corresponding to the speech or words of the video (main picture) are used for the sub-picture, the captions and/or images are converted into bit-mapped data (step ST10). When the bit-mapped data is prepared, it is necessary to determine where the part of the captions and/or images is to be displayed within the display screen of the video (main picture). To determine the location of display of the captions and/or images, the parameter of display control command SET_DAREA (cf. FIG. 34) is determined (step ST12).

After the display location (spatial parameter) of the sub-picture (bit-mapped captions and/or images) is determined, pixel data PXD constituting the bit-mapped sub-picture is encoded. (Thus, all part of the video are not encoded; details of the encoding of PXD are already explained with reference to FIGS. 5 to 14.) At this time, the color of the captions (sub-picture), the background color of the caption area, the ratio of mixture of the caption color and background color with respect to the video main picture are determined. For this purpose, the parameters of display control commands SET_COLOR and SET_CONTR (cf. FIG. 34) are determined (step ST14).

Thereafter, the timing of display of the prepared bit-mapped data with respect to the speech or words of the video is determined. This timing can be determined by sub-picture presentation time stamp PTS. At this time, the maximum time length of time stamp PTS as well as respective parameters (time parameter) of display control commands STA_DSP, STP_DSP, and CHG_COLCON (cf. FIG. 34) are determined (step ST16).

Here, sub-picture time stamp PTS is finally determined according to the consumption model of a target decoder buffer of the MPEG2 system layer. In this embodiment, the time of start of the caption display is used for determining the maximum time length of time stamp PTS.

Display control commands STA_DSP and STP_DSP are recorded as relative time information with respect to sub-picture time stamp PTS. Thus, unless the content of PTS is determined, display control commands STA_DSP and STP_DSP cannot be determined. For this reason, in the present embodiment, an absolute time system is adapted to determine the absolute time of PTS. When the absolute time of PTS is determined, the relative time with respect to this absolute time can be determined.

Further, when the display color and/or the display area of the prepared caption are to be changed in spatial domain or in time domain, the parameter of command CHG_COLCON is determined according to the change of the prepared caption.

After the display position (spatial parameter) and the display timing (time parameter) are (temporarily) determined, the content (DCSQ) of sub-picture display control sequence table DCSQT is prepared (step ST18). More specifically, the value of display control start time SPDCTS (cf. FIG. 33) of display control sequence table DCSQ is determined in accordance with the time of issuing display control command STA_DSP (display start timing) and with the time of issuing display control command STP_DSP (display end timing).

The size of sub-picture data unit 30 (cf. FIG. 3) can be determined according to a combination of prepared pixel data PXD 32 and prepared display control sequence table DCSQT 33. Then, parameter SPDSZ (sub-picture size; cf. FIG. 31) of sub-picture unit header SPUH 31 and SPDC-SQTA (start address of display control sequence table; cf.

FIG. 31) are determined according to the above determined size, so that sub-picture unit header SPUH 31 is prepared. Thereafter, the sub-picture unit for one caption is prepared by combining SPUH 31, PXD 32, and DCSQT 33 (step ST20).

When the size of prepared sub-picture unit 30 exceeds a predetermined value (2048 bytes or 2 k bytes) (yes at step ST22), prepared sub-picture unit 30 is divided into one or more packets in units of 2 k bytes (step ST24). In this case, presentation time stamp PTS is recorded only at the leading (or first) packet of prepared sub-picture unit 30 (step ST26).

When the size of prepared sub-picture unit 30 does not exceed the predetermined value (2 k bytes) (no at step ST22), only one packet is prepared (step ST23), and time stamp PTS is recorded at the top of the prepared one packet (step ST26).

One or more packets thus prepared are packed and combined with a video or other packs, so that a data stream is generated (step ST28).

In this case, the order of arrangement. of respective packs is determined, based on the consumption model of a target decoder buffer of the MPEG2 system layer, in accordance with the sequence record code SRC and sub-picture time stamp PTS. Time stamp PTS is finally determined here, and respective parameters (SPDCTS, etc.) of FIG. 33 are also finally determined.

Figure 54:
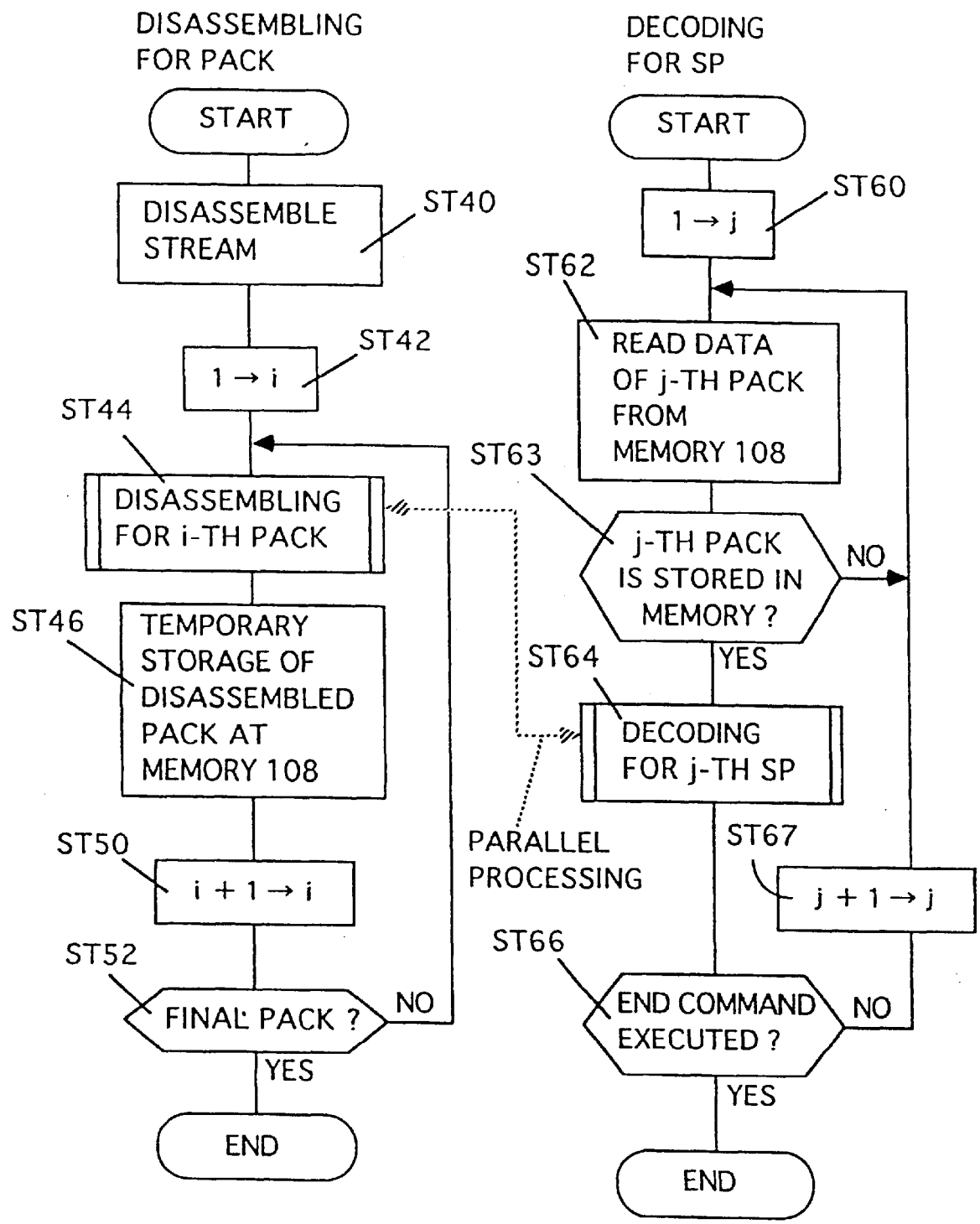
FIG. 54 is a flowchart for explaining an example of parallel-processing of the pack-disassembling of sub-picture data stream and decoding thereof, which data stream is encoded according to the process of FIG. 53.

FIG. 54 is a flowchart for explaining an example of parallel-processing of the pack-disassembling of sub-picture data stream and decoding thereof, which data stream is encoded according to the process of FIG. 53.

First, the decoding system reads the ID of the transferred data stream, so that only selected sub-picture packs (separated from the data stream) are sent to the sub-picture decoder (e.g., sub-picture decoder 101 in FIG. 11 or FIG. 17) (step ST40).

Figure 55:
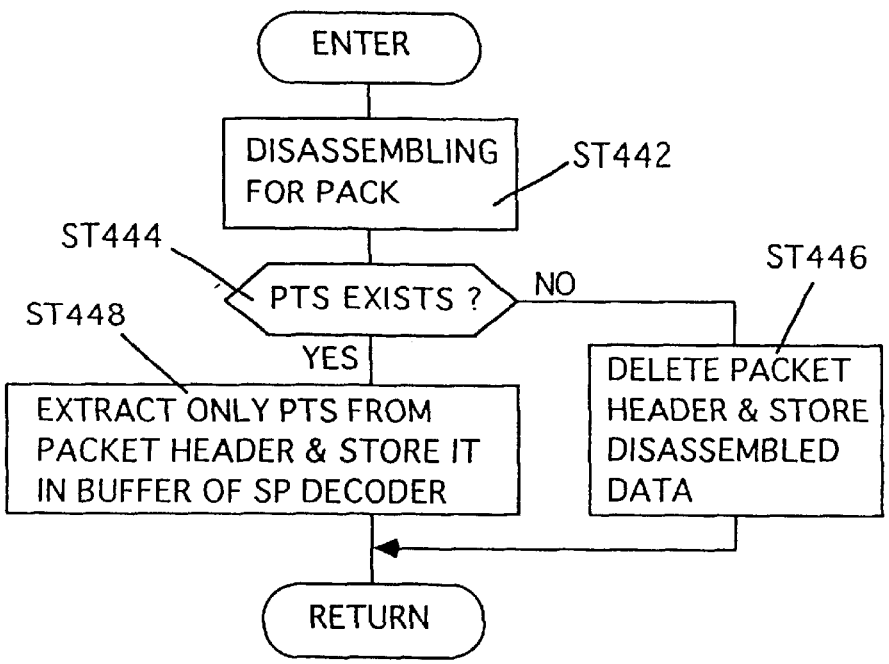
FIG. 55 is a flowchart for explaining an example of the pack disassemble processing of FIG. 54.

When the first pack is transferred, index parameter "i" is set to "1" (step ST42), and the disassembling for the first sub-picture pack is executed (step ST44; see FIG. 55).

The disassembled pack (which contains compressed sub-picture data PXD as shown at the lower portion of FIG. 9) is temporarily stored in the sub-picture buffer (e.g., memory 108 in FIG. 11 or FIG. 17) (step ST46), and index parameter "i" is incremented by "1" (step ST50).

When the incremented i-th pack exists, or the pack disassembled at preceding step ST44 is not the final pack (no at step ST52), the disassembling for the incremented i-th sub-picture pack is executed (step ST44).

The disassembled i-th sub-picture pack (e.g., the second pack) is temporarily stored in the sub-picture buffer (or memory 108) as in the case of the first disassembled pack (step ST46), and index parameter "i" is further incremented by "1" (step ST50).

As mentioned above, a plurality of sub-picture packs are continuously disassembled (step ST44) while index parameter "i" is sequentially incremented, and disassembled packs are stored in the sub-picture buffer (or memory 108) (step ST46).

When continuously incremented i-th pack is not found, or the pack disassembled at preceding step ST44 is the final pack (yes at step ST52), the sub-picture pack disassembling process of the stream to be decoded is ended.

During the continuous executions (steps ST44 to ST52) of the sub-picture pack disassembling process, decoding of sub-picture packs temporarily stored in the sub-picture buffer (memory 108) is performed in parallel and independently with the sub-picture pack disassembling process.

More specifically, when index parameter "j" is set to "1" (step ST60), the first sub-picture pack is read from the sub-picture buffer (memory 108) (step ST62). If the first sub-picture pack is not yet stored in the sub-picture buffer (memory 108) (no at step ST63; the process of step ST46 is not yet completed at this time), the decoding process executes an empty loop of the pack reading operations (steps ST62 to ST63) until the target pack data to be read is stored in memory 108.

When the first sub-picture pack is stored in the sub-picture buffer (memory 108) (yes at step ST63), the first sub-picture pack is read therefrom, and subjected to the decoding (step ST64; see FIGS. 53 to 57).

The result of the decoding (which contains uncompressed sub-picture data PXD as shown at the upper portion of FIG. 9) is sent to a display system (not shown) from sub-picture decoder 101 in FIG. 11 or FIG. 17 during execution of the decoding.

If the display control end command (CMD_END in FIG. 34) is not yet executed in the above decoding process (no at step ST66), index parameter "j" is incremented by "1" (step ST67).

When the incremented j-th pack (in this case, the second sub-picture pack) is stored in memory 108 (yes at step ST63), the pack is read from memory 108, and subjected to the decoding (step ST64). The decoded j-th sub-picture pack (here the second pack) is sent to the display system as in the case of the first pack, and index parameter "j" is further incremented by "1" (step ST67).

As mentioned above, one or more sub-picture packs stored in memory 108 are continuously decoded (step ST64) while index parameter "j" is incremented (step ST67), and an image display of the sub-picture corresponding to the decoded sub-picture data (PXD) is executed.

During the above decoding process, if the display control end command (CMD-END in FIG. 34) is executed (yes at step ST66), the decoding process for the sub-picture stored in memory 108 is ended.

The above decoding process (steps ST62 to ST64) is repeated unless end command CMD_END is executed (no at step ST66). In the present embodiment, the decoding process is terminated by the execution of end command CMD_END (yes at step ST66).

FIG. 55 is a flowchart for explaining an example of the pack disassemble processing of FIG. 54.

Sub-picture decoder 101 skips the pack header (cf. FIG. 3) in the pack sent from an outside to obtain the packet (step ST442). When the obtained packet does not contain presentation time stamp PTS (no at step ST444), the packet header (PH) is deleted from the obtained packet, and only the sub-picture unit data (PXD) is stored in the buffer (e.g., 121) of the sub-picture decoder (step ST446).

When the obtained packet contains presentation time stamp PTS (yes at step ST444), only the PTS is extracted from the packet header (PH), and the extracted PTS is connected to the sub-picture unit data (30). The sub-picture unit data with PTS is then stored in buffer 121 of sub-picture decoder 101 (step ST446).

Figure 56:
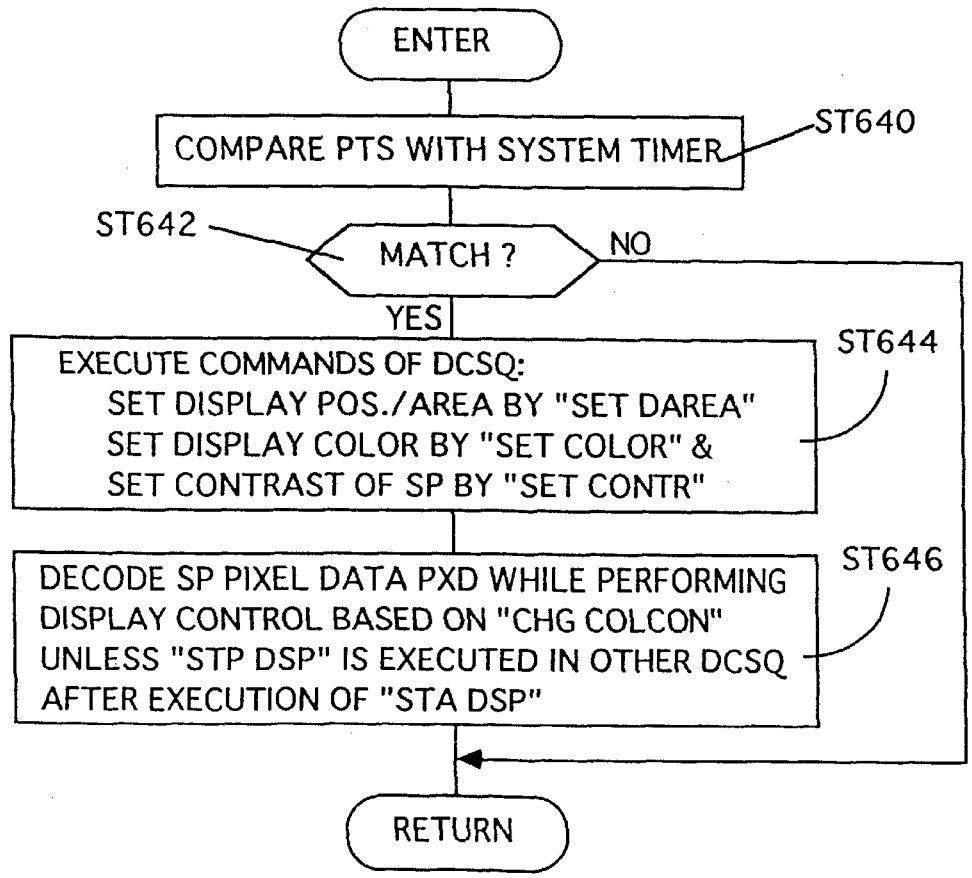
FIG. 56 is a flowchart for explaining an example of the sub-picture decode processing of FIG. 54.

FIG. 56 is a flowchart for explaining an example of the sub-picture decode processing of FIG. 54.

Sub-picture decoder 101 compares time SCR of system timer 120 with time stamp PTS stored in buffer 121 (step ST640). When they match (yes at step ST642), decoding of the corresponding sub-picture unit (30) starts. In the decoding process, how the compressed data PXD as shown at the lower portion of FIG. 9 is restored to the uncompressed data PXD as shown at the upper portion of FIG. 9 is already explained in connection with FIGS. 15, 16, etc.

In the decoding process, the respective commands of display control sequence DCSQ are executed. More specifically, the display position and display area of the sub-picture are set by command SET_DAREA; the display color of the sub-picture is set by command SET_COLOR; the contrast of the sub-picture with respect to the video main picture is set by command SET_CONTR (step ST646).

After display start timing command STA_DSP is executed, and before display end timing command STP_DSP is executed in another display control sequence DCSQ, the decoding of run-length compressed pixel data PXD (32) is performed (step ST646) while the display control based on switch command CHG_COLCON is performed.

Incidentally, steps ST644 and ST646 are skipped when time SCR of system timer 120 does not match time stamp PTS stored in buffer 121 (no at step ST642).

Figure 57:
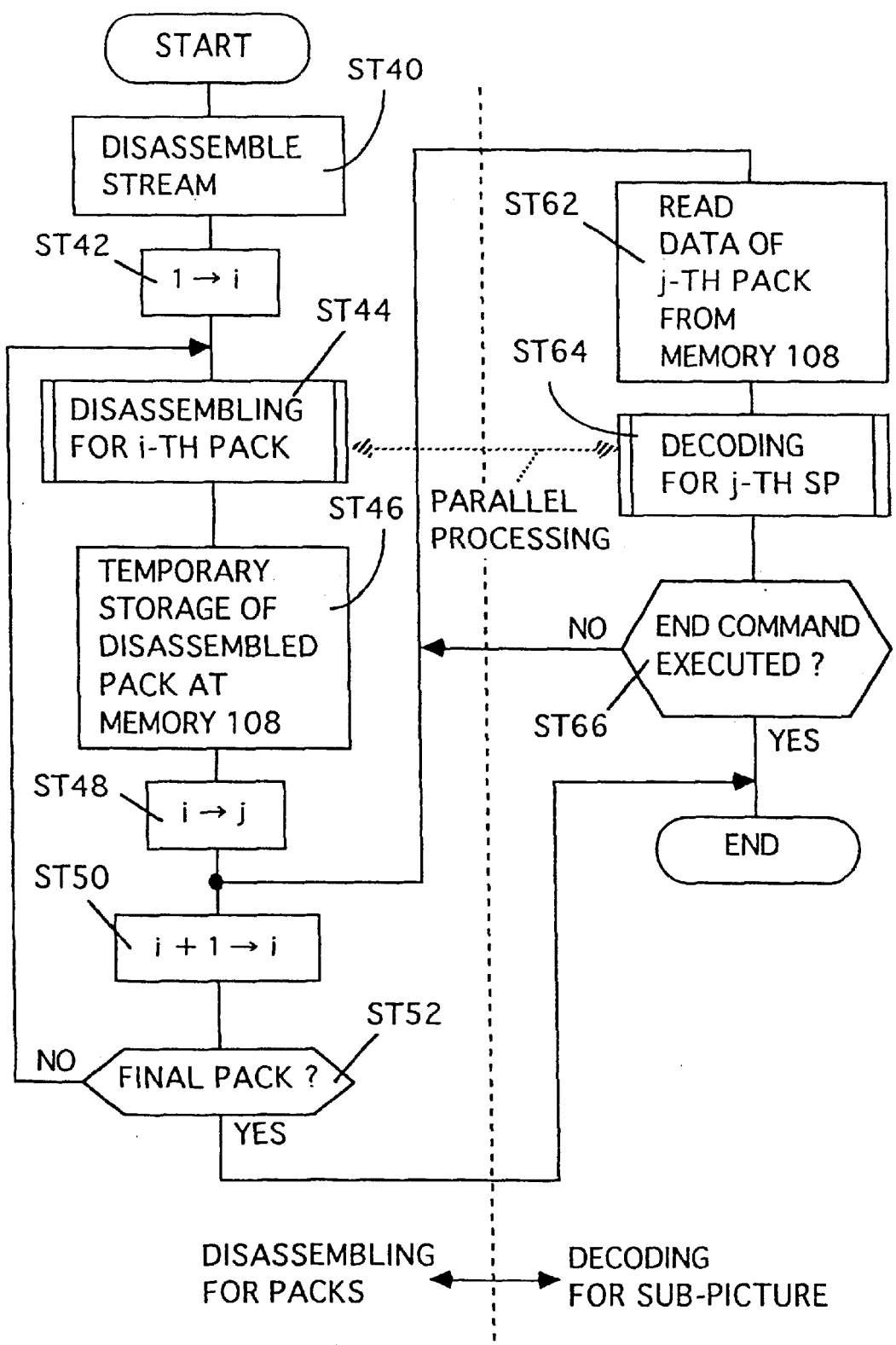
FIG. 57 is a flowchart for explaining another example of parallel-processing of the pack-disassembling of sub-picture data stream and decoding thereof, which data stream is encoded according to the process of FIG. 53.

FIG. 57 is a flowchart for explaining another example of parallel-processing of the pack-disassembling of sub-picture data stream and decoding thereof, which data stream is encoded according to the process of FIG. 53.

The process of FIG. 54 is parallel processing wherein the disassembling of the sub-picture packs and the decoding thereof are independent from each other with respect to time. On the other hand, the process of FIG. 57 is other parallel processing wherein the disassembling of the sub-picture packs and the decoding thereof are linked together with respect to time. More specifically, in the embodiment of FIG. 57, the disassembling of the sub-picture packs and the decoding thereof are performed with substantially the same speed.

In the process of FIG. 57, the decoding system reads the ID of the transferred data stream, so that only selected sub-picture packs (separated from the data stream) are sent to the sub-picture decoder (e.g., sub-picture decoder 101 in FIG. 11 or FIG. 17) (step ST40).

When the first pack transmission is performed, index parameter "I" is set to "1" (step ST42), and disassembling of the first sub-picture pack is executed (step ST44).

The disassembled pack is temporarily stored in a sub-picture buffer (memory 108) (step ST46). Thereafter, index parameter "i" is set to index parameter "j" (step ST48), and index parameter "i" is incremented by "1" (step ST50).

When the incremented i-th pack exists, or the pack disassembled at preceding step ST44 is not the final pack (no at step ST52), the disassembling for the incremented i-th sub-picture pack is executed (step ST44).

The disassembled i-th sub-picture pack (e.g., the second pack) is temporarily stored in the sub-picture buffer (or memory 108) as in the case of the first disassembled pack (step ST46), and index parameter "i" is further incremented by "1" (step ST50).

As mentioned above, a plurality of sub-picture packs are continuously disassembled (step ST44) while index parameter "i" is sequentially incremented, and disassembled packs are stored in the sub-picture buffer (or memory 108) (step ST46).

When continuously incremented i-th pack is not found, or the pack disassembled at preceding step ST44 is the final pack (yes at step ST52), the sub-picture pack disassembling process of the stream to be decoded is ended.

During the continuous execution of disassembling the sub-picture packs (steps ST44 to ST52), decoding of the sub-picture pack temporarily stored in the sub-picture buffer (memory 108) is performed in parallel to the disassembling of the sub-picture packs.

More specifically, when index parameter "i" is set to index parameter "j" (step ST48), the first (j=1) sub-picture pack is read from memory 108 (step ST62), and the first (j=1) sub-picture pack is decoded (step ST64).

During the decoding process (steps ST62 to ST64) of the j-th (j=1) sub-picture pack, the disassembling process (step ST44) of the i-th (i=2; incremented at step ST50) sub-picture pack is parallel executed.

The above decoding process (steps ST62 to ST64) is repeated unless end command CMD_END is executed (no at step ST66). In this embodiment, the decoding process is terminated by the execution of end command CMD_END (yes at step ST66).

As has been described above, according to the present invention, wasteful sub-picture data in respect of display space and display time can be greatly reduced. At the same time, the degree of freedom in sub-picture expressions equivalent to the bit map data scheme can be achieved, and a variety of applications of the sub-pictures can be assured.

That is, according to the present invention, the use range setting information for setting the range to be used for a display in the sub-picture content data is recorded not to display data falling outside the use range. Wasteful data in respect of display space, which are produced in transmitting one-frame data to the display system, can be greatly reduced.

In addition, according to the present invention, the color setting information and the mixing ratio setting information for each pixel type of sub-picture content data, such as a pattern pixel, an outline, and a background, are recorded to obtain sub-picture content data as information representing the shape of a sub-picture image. A sub-picture shape expression almost equal to the conventional scheme for providing color information and mixing ratio information for each pixel can be guaranteed in a smaller volume of data.

Furthermore, according to the present invention, the color/mixing ratio change setting information for setting, in units of pixels, change in the color of the sub-picture content data for each pixel type and in the mixing ratio of the main picture and the sub-picture content data for each pixel type is recorded. A sub-picture can be dynamically displayed with an accuracy equal to that of the conventional bit map data scheme, but in a smaller volume of data than that.

The color information of a sub-picture rarely changes in units of pixels, and the data volume of the color/mixing ratio change setting information is not expected to increase excessively.

In addition, according to the present invention, even if the color of a sub-picture image changes, the sub-picture can be displayed across a plurality of frame times using the same sub-picture content data as long as the shape does not change. As compared with the conventional scheme wherein the sub-picture data is kept supplied to the display system at the frame period regardless of changes in color and shape of the sub-picture, wasteful sub-picture data in respect of display space can be greatly reduced.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording medium for recording at least one sub-picture packet having a packet header and a packet data portion containing a sub-picture that is simultaneously reproducible with a main picture, said recording medium comprising:

packet header information disposed in said packet header;

sub-picture data representing a content of said sub-picture to be displayed;

display control sequence information that indicates an order of display control for said sub-picture;

sub-picture data unit header information including information identifying a size of a sub-picture data unit used to generate said sub-picture and which is defined by contents of said packet data portion of said at least one sub-picture packet add information identifying a recorded position of said display control sequence information in said sub-picture data unit; and playback time information for determining a playback time of said sub-picture, said playback time encoded into said at least one sub-picture pack, wherein said at least one sub-picture packet is prepared so as to include at least said packet header information in said packet header, and wherein said sub-picture data, said display control sequence information, and said sub-picture header information are provided in said packet data portion of said at least one sub-picture; packer.

2. A method for decoding a data stream read from a recording medium, said data stream being obtained by packing a plurality of sub-picture units representing a sub-picture into a sub-picture pack, each sub-picture unit including time stamp information indicating a playback start time of said sub-picture encoded in a plurality of sub-picture packets in said at least one sub-picture pack, a display control sequence table having control information for controlling display of the sub-picture, pixel data obtained by compressing the sub-picture, and sub-picture unit header containing size information identifying a size of the sub-picture data unit used to generate said sub-picture and location information identifying a location of said display control sequence table in said sub-picture data unit, said method comprising:

separating the sub-picture pack from the data stream;

disassembling the sub-picture pack;

extracting the time stamp information from the sub-picture pack if the time stamp information is recorded at the sub-picture pack; and comparing the time stamp information from the sub-picture pack with a system time information given by a system timer; and checking one or more contents of the display control sequence table when the time stamp information from the sub-picture pack matches the system time information given by the system timer.

3. The method of claim 2, further comprising:

comparing sub-picture display control time stamp information in said sub-picture unit with sub-system time information given by a sub-system timer; and determining the start of display processing of the sub-picture when said comparing step indicates that the sub-system time information of the sub-system timer corresponds to the sub-picture display control time stamp information.

4. An apparatus for decoding a data stream read from a recording medium, said data stream being obtained by packing a plurality of sub-picture units representing a sub-picture into a sub-picture pack, each sub-picture unit including time stamp information indicating a playback start time of said sub-picture encoded in a plurality of sub-picture packets in said at least one sub-picture pack, a display control sequence table having control information for controlling display of the sub-picture, pixel data obtained by compressing the sub-picture, and sub-picture unit header containing size information identifying a size of the sub-picture data unit used to generate said sub-picture and location information identifying a location of said display control sequence table in said sub-picture data unit, said apparatus comprising:

means for separating the sub-picture pack from the data stream;

means for disassembling the sub-picture pack;

means for extracting the time stamp information from the sub-picture pack if the time stamp information is recorded at the sub-picture pack;

first comparing means for comparing the time stamp information from the sub-picture pack with a system time information given by a system timer; and means for checking one or more contents of the display control sequence table when the time stamp information from the sub-picture pack matches the system time information given by the system timer.

5. The apparatus according to claim 4, further comprising:

second comparing means for comparing sub-picture display control time stamp information with sub-system time information given by a sub-system timer, said second comparing means outputting a comparison result; and means for determining the start of display processing of the sub-picture w hen the comparison result from said second comparing means indicates that the sub-system time information of the sub-system timer corresponds to the sub-picture display control time stamp information.

6. A method of recording data wherein a sub-picture simultaneously reproducible with a main picture is converted into a plurality of sub-picture packets, each having a packet header and a packet data portion, which are recorded as a sub-picture data block on a recording medium, said method comprising the steps of:

preparing packet header information for inclusion in said packet header;

preparing sub-picture data representing a content of said sub-picture to be displayed;

preparing display control sequence information that indicates an order of display control for said sub-picture;

preparing sub-picture data unit header information including information identifying a size of a sub-picture data unit used to generate said sub-picture and which is defined by contents of said packet data portion of a plurality of said sub-picture packets, and information identifying a recorded position of said display control sequence information in said sub-picture data unit;

preparing said plurality of sub-picture packets so as to include at least said packet header information in said packet header, such that said sub-picture data, said display control sequence information, and said sub-picture header information are provided in said packet data portions of said plurality of sub-picture packets; and preparing playback time information for said sub-picture encoded into said sub-picture packets in said sub-picture data block, and recording said playback time information only in a first one of said plurality of sub-picture packets in said sub-picture data block.

7. The method of claim 6, wherein said display control sequence information includes:
   display start and display stop time information of said sub-picture;
   record position information of said sub-picture data to be displayed; and
   a group of display control commands for said sub-picture data located at a position indicated by said record position information.

8. The method of claim 6, wherein said display control sequence information includes display start and display stop time information of said sub-picture, and wherein said display start and display stop time information indicate a display start time of said sub-picture and a display stop time of said sub-picture, respectively, which are defined as a relative time with respect to said playback start time of said sub-picture packets.

9. The method of claim 7, wherein display start control information for controlling a start of display of said sub-picture data based on said display start time information included in said display control sequence information pieces is recorded as said display control commands.

10. The method of claim 7, wherein display stop control information for controlling a stop of display of said sub-picture data based on said display stop time information included in said display control sequence information piece is recorded as said display control commands.

11. The method of claim 7, wherein color set information for setting a color of respective types of pixels constituting said sub-picture data is recorded as said display control commands.

12. The method of claim 7, wherein mixture ratio set information for setting a mixture ratio of said sub-picture data with respect to said main picture is recorded as said display control commands.

13. The method of claim 7, wherein display area set information for setting a display area of said sub-picture data on said main picture is recorded as said display control commands.

14. The method of claim 7, wherein use area set information for setting an area to be used for displaying a content of said sub-picture data is recorded as said display control commands.

15. The method of claim 7, wherein color/mixture ratio change set information for setting, in units of a pixel, a change in color of respective pixel types of said sub-picture data, and for setting, in units of a pixel, a change in a mixture ratio of said sub-picture data with respect to said main picture, is recorded as said display control commands.

16. The method of claim 7, wherein display control end set information for setting a termination of display control of said sub-picture data is recorded as said display control commands.

17. A method of encoding image information wherein a sub-picture simultaneously reproducible with a main picture is encoded into a plurality of sub-picture packets, each having a packet header and a packet data portion,
   (a) wherein, for a first one of said plurality of sub-picture packets, said method comprises the steps of:
      preparing a time stamp information which indicates a playback start time of said sub-picture encoded into said plurality of sub-picture packets;
      preparing sub-picture information which includes pixel data constituting said sub-picture and being compressed according to a predetermined compression technique;
      preparing display control sequence information which controls an order of display of said sub-picture based on said sub-picture information; and
      preparing sub-picture data unit header information including size information identifying a size of a sub-picture data unit used to generate said sub-picture and which is defined by contents of said packet data portion of a plurality of said sub-picture packets, and location information identifying a location of said display control sequence information in said sub-picture data unit, and
   (b) wherein, for a second and subsequent sub-picture packets in said plurality of sub-picture packets, said method comprises the steps of:
      preparing sub-picture information including pixel data constituting said sub-picture and being compressed according to a predetermined compression technique;
      preparing display control sequence information which controls an order of display of said sub-picture based on said sub-picture information; and
      preparing sub-picture data unit header information including size information identifying a size of a sub-picture data unit used to generate said sub-picture and which is defined by contents of said packet data portion of a plurality of said sub-picture packets, and location information identifying a location of said display control sequence information in said sub-picture data unit,
      wherein said step of preparing a time stamp which indicates a playback start time of said sub-picture encoded into said plurality of sub-picture packets is not performed with respect to said second and subsequent sub-picture packets in said plurality of sub-picture packets.

18. A recording medium for recording a plurality of sub-picture packets each having a packet header and a packet data portion containing a sub-picture that is simultaneously reproducible with a main picture, said recording medium comprising:
   time stamp information which indicates a playback start time of said sub-picture encoded only into a first sub-picture packet in said plurality of sub-picture packets;
   sub-picture data unit header information including size information identifying a size of a sub-picture data unit used to generate said sub-picture and which is defined by contents of said packet data portion of said at least one sub-picture packet;
   sub-picture information including pixel data constituting said sub-picture and being compressed according to a predetermined compression technique; and
   display control sequence information which controls an order of display of said sub-picture based on said sub-picture information.

19. A recording medium for recording a plurality of sub-picture packets each having a packet header and a packet data portion containing at least a portion of a sub-picture simultaneously reproducible with a main picture,
   (a) wherein, for a first one of said sub-picture packets in said plurality of said sub-picture packets, said recording medium comprises:
      time stamp information which indicates a playback start time of a sub-picture encoded into said plurality of sub-picture packets;
      sub-picture data unit header information including size information identifying a size of a sub-picture data unit used to generate said sub-picture and which is defined by contents of said packet data portion of a plurality of said sub-picture packets;

sub-picture information including pixel data constituting said sub-picture and being compressed according to a predetermined compression technique; and display control sequence information which controls an order of display of said sub-picture based on said sub-picture information, and (b) wherein, for a second and subsequent sub-picture packets in said plurality of sub-picture packets, said recording medium comprises:

sub-picture data unit header information including size information identifying a size of a sub-picture data unit used to generate said sub-picture and which is defined by contents of said packet data portion of a plurality of said sub-picture packets;

sub-picture information including pixel data constituting said sub-picture and being compressed according to a predetermined compression technique; and display control sequence information which controls an order of display of said sub-picture based on said sub-picture information, wherein said recording medium does not contain said time stamp information which indicates a playback start time of said sub-picture encoded into said plurality of sub-picture packets with respect to said second and said subsequent sub-picture packets in said plurality of sub-picture packets.

20. A method of encoding image information wherein a sub-picture simultaneously reproducible with a main picture is encoded into a plurality of one sub-picture packets each having a packet header and a packet data portion, said method comprising the steps of:

preparing time stamp information which indicates a playback start time of said sub-picture encoded into said plurality of sub-picture packets and recording said time stamp information only in a first sub-picture packet in said plurality of sub-picture packets;

preparing sub-picture data unit header information including size information identifying a size of a sub-picture data unit used to generate said sub-picture and which is defined by contents of said at least one sub-picture packet;

preparing sub-picture information including pixel data constituting said sub-picture and being compressed according to a predetermined compression technique; and preparing display control sequence information which controls an order of display of said sub-picture based on said sub-picture information.

21. A method of encoding image information wherein a sub-picture simultaneously reproducible with a main picture is encoded into a plurality of sub-picture packets, each having a packet header and a packet data portion, said method comprising the steps of:

(a) wherein, for a first sub-picture packet in said plurality of sub-picture packets, said method comprises the steps of:

preparing time stamp information which indicates a playback start time of said sub-picture encoded into said plurality of said sub-picture packets;

preparing sub-picture data unit header information including size information identifying a size of a sub-picture data unit used to generate said sub-picture and which is defined by contents of said packet data portion of a plurality of said sub-picture packets;

preparing sub-picture information including pixel data constituting said sub-picture and being compressed according to a predetermined compression technique; and preparing display control sequence information which controls an order of display of said sub-picture based on said sub-picture information, and (b) wherein, for a second and subsequent sub-picture packets in said plurality of sub-picture packets, said method comprises the steps of:

preparing sub-picture data unit header information including size information identifying a size of a sub-picture data unit used to generate said sub-picture and which is defined by contents of said packet data portion of a plurality of said sub-picture packets;

preparing sub-picture information including pixel data constituting said sub-picture and being compressed according to a predetermined compression technique; and preparing display control sequence information which controls an order of display of said sub-picture based on said sub-picture information, wherein said step of preparing said time stamp information which indicates a playback start time of said sub-picture encoded into said plurality of said sub-picture packets is not performed with respect to said second and said subsequent sub-picture packets in said plurality of sub-picture packets.

22. An apparatus of encoding image information wherein a sub-picture simultaneously reproducible with a main picture is encoded into a plurality of sub-picture packets, each having a packet header and a packet data portion, said apparatus comprising:

(a) first means for encoding a first sub-picture packet in said plurality of sub-picture packets so as to include:

time stamp information which indicates a playback start time of said sub-picture encoded into said plurality of said sub-picture packets;

sub-picture information including pixel data constituting said sub-picture and being compressed according to a predetermined compression technique;

display control sequence information which controls an order of display of said sub-picture based on said sub-picture information; and sub-picture data unit header information including size information identifying a size of a sub-picture data unit used to generate said sub-picture and which is defined by contents of said packet data portion of a plurality of said sub-picture packets and location information identifying a location of said display control sequence information in said sub-picture data unit, and (b) second means for encoding second and subsequent sub-picture packets in said plurality of sub-picture packets so as to include:

sub-picture information including pixel data constituting said sub-picture and being compressed according to a predetermined compression technique;

display control sequence information which controls an order of display of said sub-picture based on said sub-picture information; and sub-picture data unit header information including size information identifying a size of a sub-picture data unit used to generate said sub-picture and which is defined by contents of said packet data portion of a plurality of said sub-picture packets and location information identifying a location of said display control sequence information in said sub-picture data unit, wherein said recording medium does not contain said time stamp information which indicates a playback start time of said sub-picture encoded into said plurality of said sub-picture packets with respect to said second and s aid subsequent sub-picture packets in said plurality of sub-picture packets.

23. A method of encoding information wherein a sub-information simultaneously reproducible with a main information is encoded into a plurality of sub-information packets, each having a packet header and a packet data portion, (a) wherein, for a first sub-information packet in said plurality of said sub-information packets, said method comprises the steps of:

preparing time stamp information which indicates an operation start time of presentation of said sub-information encoded into said plurality of said sub-information packets;

preparing sub-information including pixel data constituting said sub-information and being compressed according to a predetermined compression technique;

preparing control sequence information which controls an order of use of said sub-information based on said sub-information; and preparing sub-information data unit header information including size information identifying a size of a sub-information data unit used to generate said sub-information and which is defined by contents of said packet data portion of a plurality of said sub-information packets and location information identifying a location of s aid control sequence information in said sub-information data unit, and (b) wherein, for a second and subsequent sub-information packets in said plurality of sub-information packets, said method comprises the steps of:

preparing sub-information including pixel data constituting said sub-information and being compressed according to a predetermined compression technique;

preparing control sequence information which controls an order of use of said sub-information based on said sub-information; and preparing sub-information data unit header information including size information identifying a size of a sub-information data unit used to generate said sub-information and which is defined by contents of said packet data portion of a plurality of said sub-information packets and location information identifying a location of said display control sequence information in said sub-information data unit, wherein said step of preparing time stamp information which indicates an operation start time of presentation of said plurality of said sub-information encoded into said sub-information packets is not performed with respect to said second and said subsequent sub-information packets in said plurality of sub-information packets.

24. A method of encoding information wherein a sub-information simultaneously reproducible with a main information is encoded into a plurality of sub-information packets, each having a packet header and a packet data portion, (a) wherein, for a first sub-information packet in said plurality of said sub-information packets, said method comprises the steps of:

preparing time stamp information which indicates an operation start time of presentation of said sub-information encoded into said plurality of said sub-information packets;

preparing sub-information including pixel data constituting said sub-information and being processed according to a predetermined processing technique;

preparing control sequence information which controls an order of use of said sub-information based on said sub-information; and preparing sub-information data unit header information including size information identifying a size of a sub-information data unit used to generate said sub-information and which is defined by contents of said packet data portion of a plurality of said sub-information packets and location information identifying a location of said control sequence information in said sub-information data unit, and (b) wherein, for a second and subsequent sub-information packets in said plurality of sub-information packets, said method comprises the steps of:

preparing sub-information including pixel data constituting said sub-information and being compressed according to a predetermined compression technique;

preparing control sequence information which controls an order of use of said sub-information based on said sub-information; and preparing sub-information data unit header information including size information identifying a size of a sub-information data unit used to generate said sub-information and which is defined by contents of said packet data portion of a plurality of said sub-information packets and location information identifying a location of said display control sequence information in said sub-information data unit, wherein said step of preparing time stamp information which indicates an operation start time of presentation of said plurality of said sub-information encoded into said sub-information packets is not performed with respect to said second and said subsequent sub-information packets in said plurality of sub-information packets.

25. A recording medium for recording a plurality of sub-information packets each having a packet header and a packet data portion containing a sub-information that is simultaneously reproducible with a main information, said recording medium comprising:

time stamp information which indicates an operation start time of presentation of said sub-information, said time stamp information being encoded only into a fist information packet in said plurality of sub-information packets;

sub-information data unit header information including size information identifying a size of a sub-picture data unit used to generate said sub-information and which is defined by contents of said packet data portion of said sub-information packets;

pixel data constituting said sub-information, said pixel data being compressed according to a predetermined compression technique; and control sequence information which controls an order of use of said sub-information based on said sub-information.

26. A recording medium for recording a plurality of sub-information packets each having a packet header and a packet data portion containing sub-information simultaneously reproducible with a main information, said recording medium comprising:

time stamp information which indicates an operation start time of presentation of said sub-information encoded only into a first sub-information packet in said plurality of sub-information packets;

sub-information data unit header information including size information identifying a size of a sub-information data unit used to generate said sub-information and which is defined by contents of said packet data portion of said at least one sub-picture packet;

pixel data constituting said sub-information and being processed according to a predetermined processing scheme; and control sequence information which controls an order of use of said sub-information based on said sub-information.

27. The method of claim 2, further comprising:

expanding the compressed pixel data to generate decompressed pixel data for display as a sub-picture; and displaying the decompressed pixel data according to the checked contents of the display control sequence table as said sub-picture.

28. The apparatus of claim 4, further comprising:

means for expanding the compressed pixel data to generate decompressed pixel data for display as a sub-picture; and means for displaying the decompreseed pixel data from the expanding means according to the checked contents of the display control sequence table as said sub-picture.

* * * * *